United States Patent
Mochizuki et al.

(10) Patent No.: US 11,167,377 B2
(45) Date of Patent: Nov. 9, 2021

(54) MACHINING CONDITION SETTING DEVICE AND 3D LASER MACHINING SYSTEM

(71) Applicant: FANUC CORPORATION, Yamanashi (JP)

(72) Inventors: Tatsuya Mochizuki, Yamanashi (JP); Hiroshi Takigawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 282 days.

(21) Appl. No.: 16/594,659

(22) Filed: Oct. 7, 2019

(65) Prior Publication Data
US 2020/0130107 A1  Apr. 30, 2020

(30) Foreign Application Priority Data

Oct. 30, 2018  (JP) .............................. JP2018-204157

(51) Int. Cl.
*B23K 26/70* (2014.01)
*G05B 13/02* (2006.01)
(Continued)

(52) U.S. Cl.
CPC ........ *B23K 26/702* (2015.10); *G05B 13/0265* (2013.01); *G05B 13/042* (2013.01);
(Continued)

(58) Field of Classification Search
CPC .. B23K 26/702; B23K 26/0884; B23K 26/36; B23K 26/38; B23K 26/21;
(Continued)

(56) References Cited

U.S. PATENT DOCUMENTS 5,777,294 A * 7/1998 Sugahara ............. B23K 26/702
219/121.67
5,808,432 A * 9/1998 Inoue .................. G05B 19/4097
318/561

(Continued)

FOREIGN PATENT DOCUMENTS

JP  H02-104490 A  4/1990
JP  H05-080831 A  4/1993

(Continued)

OTHER PUBLICATIONS

An Office Action; "Notice of Reasons for Refusal," mailed by the Japanese Patent Office dated Aug. 4, 2020, which corresponds to Japanese Patent Application No. 2018-204157 and is related to U.S. Appl. No. 16/594,659 with English language translation.

*Primary Examiner* — Ramesh B Patel
(74) *Attorney, Agent, or Firm* — Studebaker & Brackett PC

(57) ABSTRACT

A 3D laser machining system comprises: a move state simulation unit that simulates a move state of a machining head using 3D CAD data about a workpiece containing material information defining thermophysical properties and 3D CAD data about a machining head under a condition of moving the machining head relative to the workpiece while the machining head is maintained at a predetermined angle a predetermined distance along a machining line in virtual space; a thermal fluid simulation unit that conducts non-stationary thermal fluid simulation for obtaining a temperature distribution in a region covering the workpiece to be changed by the move of the machining head outputting a laser beam; and a machining condition setting unit that sets a laser machining condition containing a relative move (Continued)

condition for the machining head and a laser beam output condition before laser machining on the basis of results of the simulations.

16 Claims, 28 Drawing Sheets

(51) Int. Cl.
*G05B 13/04* (2006.01)
*G05B 19/4097* (2006.01)

(52) U.S. Cl.
CPC ............... *G05B 19/4097* (2013.01); *G05B 2219/35134* (2013.01); *G05B 2219/45165* (2013.01)

(58) Field of Classification Search
CPC .. B23K 26/0626; B23K 26/705; B23K 26/00; G05B 13/0265; G05B 19/4097; G05B 13/042; G05B 2219/35134; G05B 2219/45165; G05B 2219/40318; Y02P 90/02; B25J 9/1671
See application file for complete search history.

(56) References Cited

U.S. PATENT DOCUMENTS

| | | | | |
|---|---|---|---|---|
| 5,847,359 A * | 12/1998 | Sugahara | ........... | B23K 26/0861 219/121.72 |
| 5,969,335 A * | 10/1999 | Karasaki | ................ | B23K 26/03 219/121.62 |
| 6,680,459 B2 * | 1/2004 | Kanaya | .................. | B23K 26/04 219/121.67 |
| 8,134,098 B2 * | 3/2012 | Muratsubaki | ........ | B23K 26/146 219/121.67 |
| 10,058,953 B2 * | 8/2018 | Hesse | .................. | B23K 31/125 |
| 2011/0042363 A1 * | 2/2011 | Su | .......................... | B23K 26/40 219/121.72 |
| 2012/0188365 A1 * | 7/2012 | Stork | .................... | B23K 26/046 348/90 |
| 2017/0270434 A1 * | 9/2017 | Takigawa | ............... | B23K 26/21 |
| 2019/0291215 A1 * | 9/2019 | Izumi | ...................... | G06N 3/08 |
| 2019/0351512 A1 * | 11/2019 | Izumi | .................. | B23K 26/034 |
| 2020/0269359 A1 * | 8/2020 | Tanaka | ................. | B23K 31/006 |
| 2020/0301403 A1 * | 9/2020 | Izumi | ............... | G05B 19/41875 |
| 2021/0034798 A1 * | 2/2021 | Bruneel | ............... | B23K 26/382 |
| 2021/0162544 A1 * | 6/2021 | Fujii | .................... | B23K 31/125 |

FOREIGN PATENT DOCUMENTS

| | | |
|---|---|---|
| JP | H08-300171 A | 11/1996 |
| JP | 2000-117466 A | 4/2000 |
| JP | 2001-219341 A | 8/2001 |
| JP | 2005-329436 A | 12/2005 |
| JP | 2010-162548 A | 7/2010 |
| JP | 2014-018858 A | 2/2014 |
| JP | 2017-164801 A | 9/2017 |
| JP | 2017-191833 A | 10/2017 |
| JP | 2018-082045 A | 5/2018 |

* cited by examiner

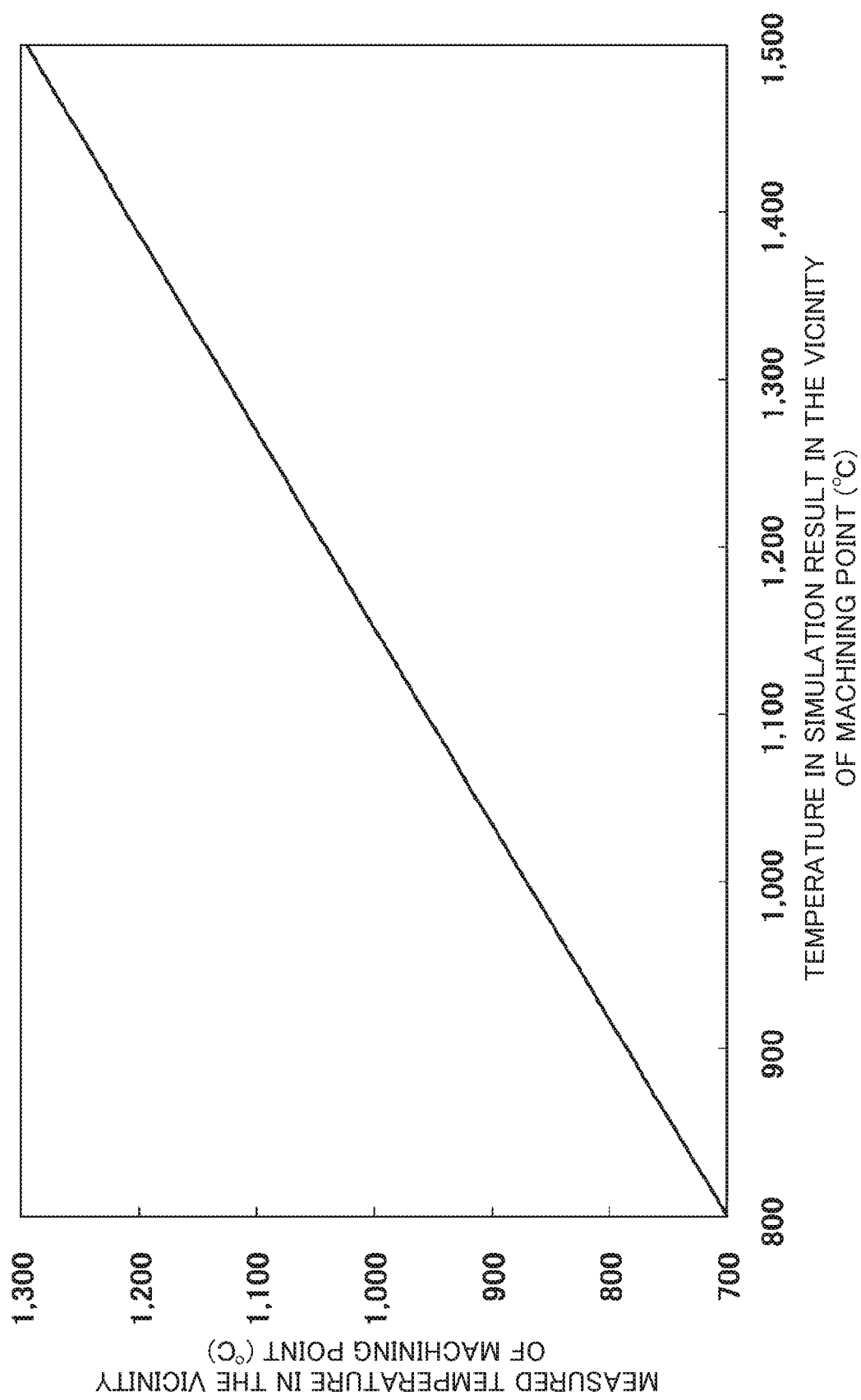

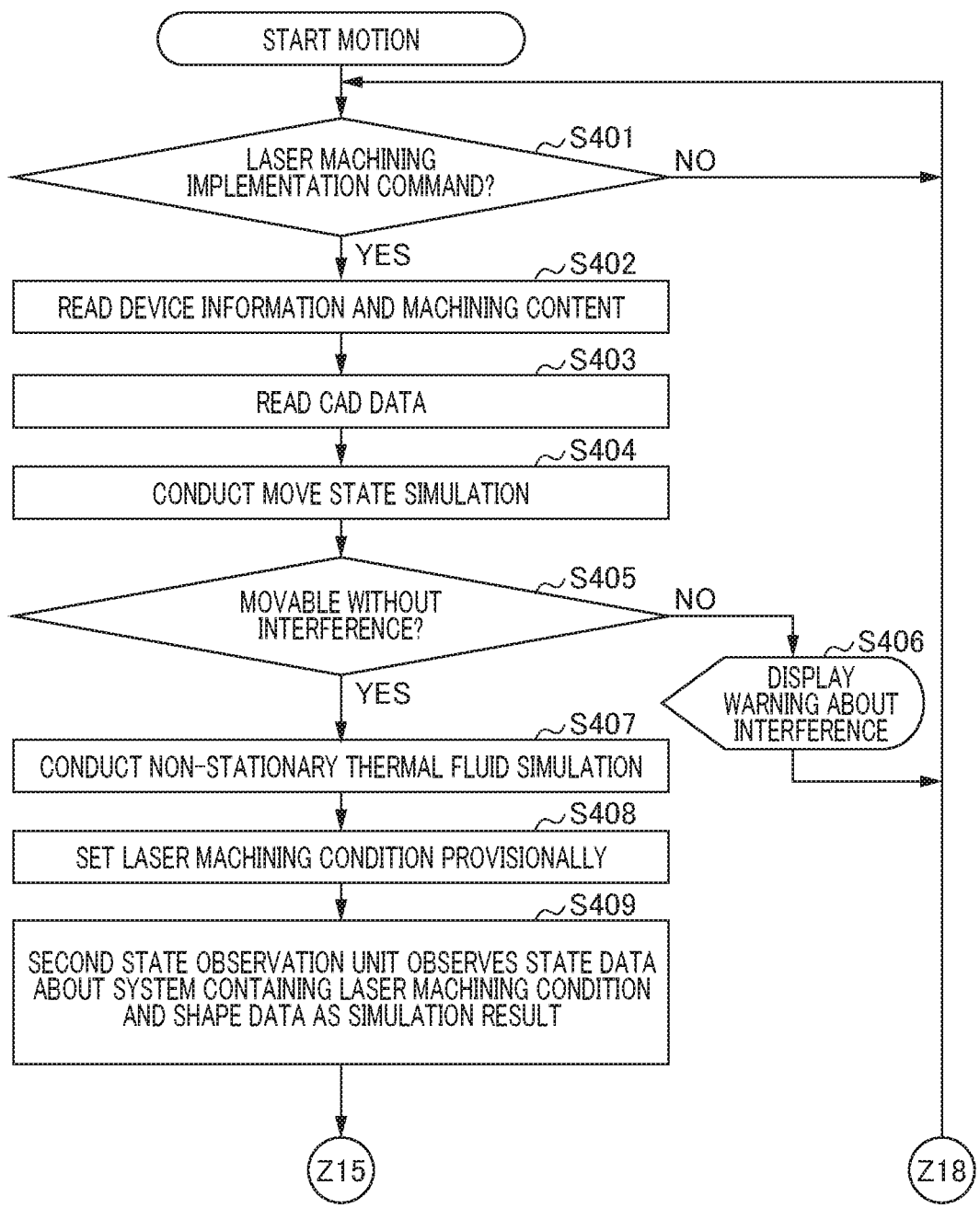

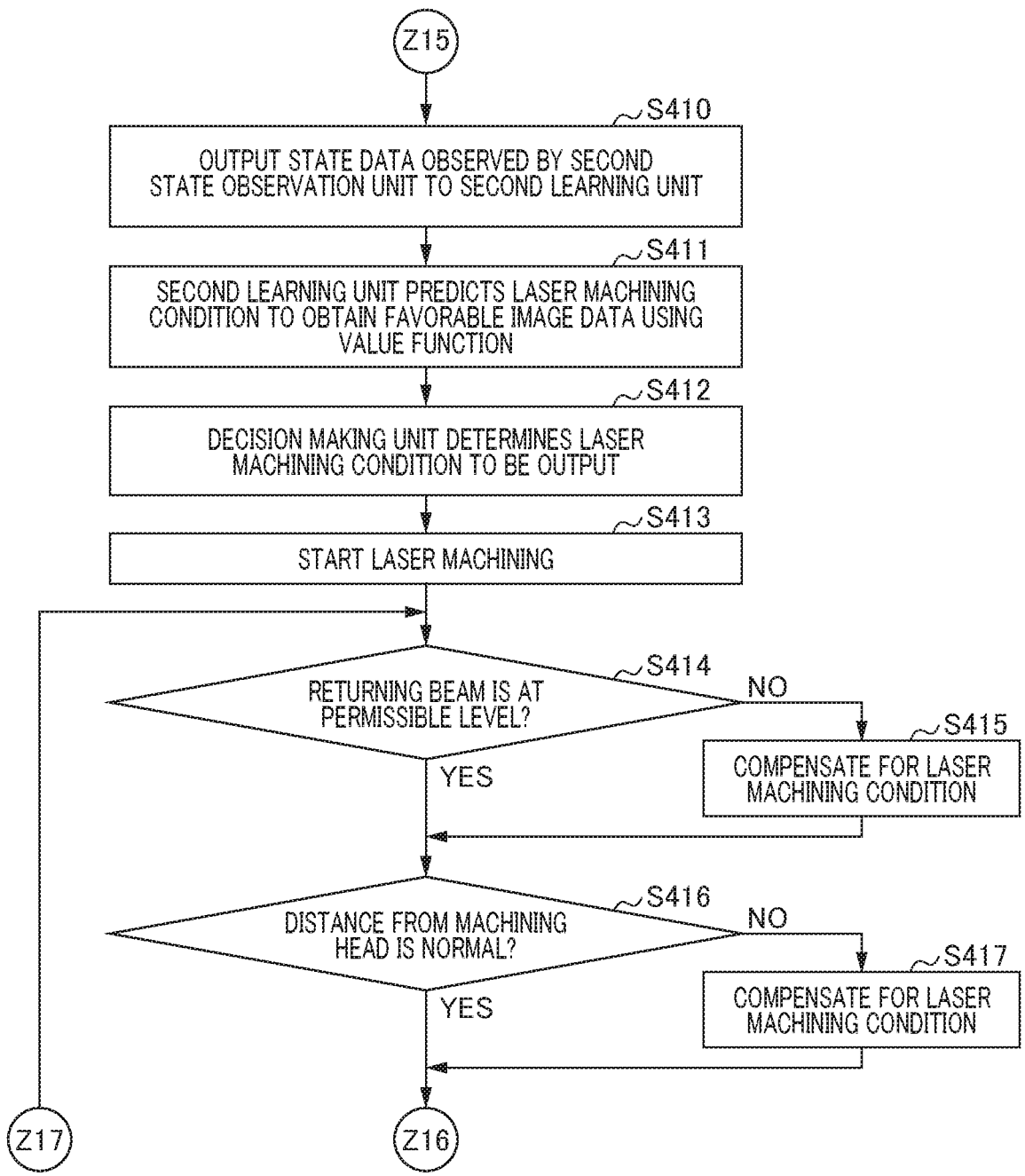

MACHINING CONDITION SETTING DEVICE AND 3D LASER MACHINING SYSTEM

This application is based on and claims the benefit of priority from Japanese Patent Application No. 2018-204157, filed on 30 Oct. 2018, the content of which is incorporated herein by reference.

BACKGROUND OF THE INVENTION

Field of the Invention

The present invention relates to a machining condition setting device and a 3D laser machining system. More specifically, regarding a laser machining system for performing machining such as welding or cutting on a machining target (workpiece) having a 3D shape, the present invention relates to a machining condition setting device that sets a laser machining condition before laser machining containing a relative move condition for a machining head relative to the workpiece and at least a laser beam output condition linked to the relative move of the machining head relative to the workpiece, and a 3D laser machining system that performs the laser machining on the basis of the set laser machining condition.

Related Art

For implementation of laser machining on a workpiece having a 3D shape, it is required to hold the tip of a machining head grasped with a robot hand, for example, at a predetermined distance (gap) from a machining surface of the workpiece, and to hold the axis of the machining head at a predetermined angle by changing the attitude of the machining head. A method originally employed for implementation of such laser machining is teaching conducted by actually moving the machining head, for example. However, this method involves a great deal of manpower in condition setting. In response to this, motion simulation has been conducted using CAD data about the workpiece or a laser machine to set a motion program.

For laser machining on the workpiece having a 3D shape, however, a relative move speed of the machining head relative to the workpiece changes in various ways including change in the attitude of the machining head, and a move speed of a machining point on the machining surface of the workpiece also changes in various ways. It is clear that not changing laser beam output, etc. in linking relationship with change in the move speed of the machining point on the machining surface of the workpiece results in a failure to obtain a proper machining result. Additionally, regarding the workpiece having a 3D shape, the workpiece is also changed in thickness, etc. in a manner that depends on the machining point. Namely, in a thick part of the workpiece, a laser machining result is influenced by a heat characteristic condition that a temperature at the machining point is prone to decrease for the reason that heat conduction of the workpiece itself causes diffusion and dissipation of heat input by laser beam irradiation. This makes it difficult to obtain a proper laser machining condition containing laser beam output by giving consideration to the relative move condition for the machining head relative to the workpiece and the heat characteristic condition such as the thickness of the workpiece or the heat conductivity of the workpiece, for example. This has necessitated accumulation of machining data resulting from several implementations of trial machining before actual machining, causing a problem of failing to perform laser machining efficiently, particularly on workpieces to be produced in a wide variety in small quantities.

Various types of conventional techniques have already been reported relating to a 3D laser machining system for laser machining on a workpiece having a 3D shape. For example, patent document 1 discloses a normal detection method implemented in a 3D laser machine provided with gap control means. In this 3D laser machine, a nozzle is provided at the tip of a machining head controlled in a rectangular coordinate system with an X axis, a Y axis, and a Z axis, and an a attitude axis and a Q attitude axis in such a manner as to be movable in an optical axis direction. The gap control means uses a gap sensor for detecting a gap amount between the tip of the nozzle and a workpiece to control a stroke of the nozzle so as to maintain the gap amount constantly. According to this normal detection method, the position of the nozzle tip of the machining head is determined to be pointed in a substantially normal direction to a teaching point on a workpiece surface, and three points surrounding the teaching point in the vicinity of the teaching point are calculated on the basis of X, Y, and Z coordinate data and a and a attitude data obtained at the time of the positioning. Then, the machining head is passed through the three points sequentially. At a position where a distance between the nozzle and the workpiece is maintained constantly at the time of the move, the coordinates of the three points on the workpiece surface in the vicinity of the teaching point are detected, a normal vector to a plane formed of these three points is obtained, attitude data about the machining head is calculated in such a manner as to match the attitude of the nozzle with the normal vector, and the attitude of the machining head at the teaching point is controlled on the basis of the calculated attitude data.

Patent document 2 discloses a teaching method implemented in a YAG laser machine before implementation of 3D laser machining on a workpiece using a laser machining head relatively movable in 3D directions and capable of being placed in an intended welding attitude. In this teaching method for the YAG laser machine, imaging means provided at the laser machining head captures images of the workpiece at least from an X-axis direction, a Y-axis direction, and a Z-axis direction, a 3D figure of the workpiece is generated, rough teaching points and a welding attitude are input to the 3D figure, a master JOB is generated from the 3D figure and the welding attitude, and a compensation JOB for compensating for the master JOB is generated using detailed data at each of the teaching points.

Patent document 3 discloses a teaching method for a 3D laser machine in which a detection head provided at a Z-axis column movable in an X-axis direction, a Y-axis direction, and a Z-axis direction perpendicular to each other is configured to be rotatable about an A axis parallel to the Z axis and rotatable about a B axis perpendicular to the A axis, and the detection head includes a plurality of position sensitive sensors arranged symmetrically on a light-receiving plane for receiving a reflected beam of a laser beam having passed through the axis of the detection head and having been applied to a workpiece. In this teaching method for the 3D laser machine, an X-axis teaching point and a Y-axis teaching point are designated based on X-axis data and Y-axis data from CAD data and the detection head is moved to these teaching points. The position sensitive sensors detect a reflected beam of a laser beam having passed through the axis of the detection head and having been applied to the workpiece at the teaching points. On the basis of detected values detected by these position sensitive sensors, a distance between the workpiece and the detection head and a tilt of the detection head from a surface of the workpiece are calculated. Coordinate data about each of the Z, A, and B axes is calculated by controlling the attitude of the detection head so as to make the calculated distance and tilt conform to corresponding optimum set values set in advance. On the basis of the X-axis data and the Y-axis data at the teaching points and the calculated Z-axis data, A-axis data, and the B-axis data, a machining program for a machining path is generated.

Patent document 4 discloses an off-line teaching method for a 3D laser machine employed in a system including: the 3D laser machine; a CAD system that accumulates data corresponding to a working target, displays the data on a graphic display, and conducts simulation of the motions of the 3D laser machine and the working target using a motion program already generated, means of converting the motion program generated by the CAD system to a program following a grammar in an intended NC language; and means of compensating for a deviation between position and attitude data about the working target on the CAD system and actual position and attitude of the working target. According to this method, arc-like motion data is generated for moving the focal point of a laser beam smoothly on the basis of information about the working target on the CAD system.

Patent document 5 discloses a sheet-metal working integration assist system not a 3D laser machining system. This sheet-metal working integration assist system is for management of sheet-metal working information containing working information as data for controlling a machine tool and working assist information relating to the working information. According to this sheet-metal working integration assist system, actual working information about actual working by a working side and/or peculiar attribute information as a basis for the actual working information are collected, and the collected actual working information and peculiar attribute information are fed back to the sheet-metal working information.

Patent document 6 discloses a laser machining method of performing machining on a workpiece having a 3D shape by applying a laser beam along the motion of a robot. According to this method, a path speed of the robot at a machining position on the workpiece is measured in advance or in real time, and output of the laser beam is controlled so as to conform to the measured path speed. Patent document 6 further discloses a method of manufacturing a resin structure as a specific method of controlling the output of the laser beam. According to this method, the laser beam is applied along an irradiation path set on a surface of the resin structure to partially melt the resin structure, and the resin structure is cured again thereafter. The output of the laser beam is controlled in proportion to the path speed of the laser beam along the irradiation path.

Patent Document 1: Japanese Unexamined Patent Application, Publication No. H08-300171
Patent Document 2: Japanese Unexamined Patent Application, Publication No. 2000-117466
Patent Document 3: Japanese Unexamined Patent Application, Publication No. H02-104490
Patent Document 4: Japanese Unexamined Patent Application, Publication No. H05-80831
Patent Document 5: Japanese Unexamined Patent Application, Publication No. 2001-219341
Patent Document 6: Japanese Unexamined Patent Application, Publication No. 2005-329436

SUMMARY OF THE INVENTION

However, the techniques disclosed in patent documents 1 to 6 have the following problems. According to the technique disclosed in patent document 1, teaching is given while the machining head is actually moved by determining the position of the nozzle tip of the machining head in such a manner as to point the nozzle tip in a substantially normal direction to a teaching point on the workpiece surface, for example. Hence, this causes a problem of involving a great deal of manpower for the teaching.

According to the technique disclosed in patent document 2, the master JOB is generated using the 3D figure of the workpiece obtained by imaging by the imaging means. Meanwhile, the master JOB is compensated for using the detailed data at each teaching point. This also causes a problem of involving a sufficient deal of manpower for the teaching.

The technique disclosed in patent document 3 uses the CAD data but the CAD data is used merely for designating a teaching point. According to this technique, the detection head is moved to the teaching point, and the position sensitive sensors detect a reflected beam of a laser beam having passed through the axis of the detection head and having been applied to the workpiece. Then, a distance between the workpiece and the detection head and a tilt of the detection head from the workpiece surface are calculated to generate the machining program for the machining path. Hence, this technique also causes a problem of involving a sufficient deal of manpower for the teaching.

According to the technique disclosed in patent document 4, simulation of the motions of the 3D laser machine and the working target is conducted by the CAD system. Further, a deviation between position and attitude data about the working target on the CAD system and actual position and attitude of the working target is compensated for. This technique is considered to allow reduction in time required for the teaching. However, this technique does not involve implementation of thermal fluid simulation, etc., so that setting laser beam output, etc. properly requires a trial-and-error method. Hence, this technique still has a problem of involving manpower in setting a laser machining condition entirely.

The technique disclosed in patent document 5 refers to machining simulation. However, this technique is intended for sheet-metal working corresponding mainly to bending. Further, laser machining described as preparatory machining is free from the problem that heat dissipation characteristics are changed by the change in the thickness of the workpiece, etc. depending on a machining point. Hence, thermal fluid simulation is missing from the statement of the machining simulation. For this reason, patent document 5 lacks a solution to the foregoing problem occurring in the 3D laser machining system that it is difficult to obtain a proper laser machining condition containing laser beam output by giving consideration to the relative move condition for the machining head relative to the workpiece and the heat characteristic condition such as the thickness of the workpiece, for example.

As described above, the technique disclosed in patent document 6 should involve setting of laser beam output by giving consideration to a heat characteristic condition such as the thickness of the workpiece, for example. Merely controlling the output of the laser beam in proportion to the path speed of the laser beam is insufficient for obtaining a proper machining result.

As described above, for 3D laser machining such as welding or cutting on a workpiece having a 3D shape, it is desirable to select a machining condition under which a machining point as a point of irradiation with a laser beam on a machining surface of the workpiece is moved as at a high speed as possible for shortening a machining duration within a condition range allowing implementation of the laser machining properly. Meanwhile, an attitude of move of the machining head and a direction of move of the machining head relative to a machining surface of the workpiece are required to be changed. Rapidly changing the attitude of move or the direction of move of the machining head inevitably necessitates reduction in a move speed of the machining head. This causes inconstant move speed of a machining point on the machining surface of the workpiece, so that changing the move speed of the machining point becomes unavoidable. The change in the move speed of the machining point on the machining surface of the workpiece causes change in laser beam output, for example, for obtaining a favorable machining result. Further, even if a machining point is irradiated with the same laser beam power, change in the thickness of the workpiece changes a temperature at the machining point resulting from the heat conduction of the workpiece itself, for example. This also causes change in laser beam output, for example, for obtaining a favorable machining result.

A distance between a workpiece surface and a machining head or the attitude of the machining head relative to the workpiece surface may be controlled by detecting the positions of the workpiece surface and the machining head relative to each other using a gap sensor and feeding back a result of the detection. Further, laser beam output may be controlled by detecting a temperature at a machining point using an infrared sensor, for example, and feeding back a result of the detection. If the machining point moves at a high speed on a machining surface of the workpiece and if the move speed changes, however, the normal feedback control causes a problem of failing to obtain a favorable machining result due to the occurrence of delay in the control.

In view of the foregoing situation, the present invention is intended to provide a machining condition setting device and a 3D laser machining system capable of setting an optimum laser machining condition containing a laser beam output condition by giving consideration to a move condition for a machining head to move relative to a workpiece having a 3D shape while the machining head is maintained at a predetermined angle and a predetermined gap from a machining surface of the workpiece, change in a move speed of a machining point on a workpiece surface accompanying speed change occurring during the move of the machining head, and change in a machining condition for obtaining a favorable machining result to be changed by change in a heat characteristic condition for the machining point such as the thickness of the workpiece accompanying move of the machining point.

According to the present invention, machining head move simulation and non-stationary thermal fluid simulation are conducted. In the machining head move simulation, by using 3D CAD data about a workpiece defining thermophysical properties such as heat conductivity, specific heat, and density, and 3D CAD data about the outer shape of a machining head, the machining head is moved relative to the workpiece along a machining line set by the 3D CAD data about the workpiece while the machining head is maintained at a predetermined angle and a predetermine gap from a machining surface of the workpiece. The non-stationary thermal fluid simulation is conducted for calculating change in a temperature distribution in a region covering the workpiece linked to the move of the machining head. On the basis of results of these simulations, a sequence of time-series laser machining conditions is set before implementation of actual laser machining.

To solve the foregoing problem, the present invention has the following means.

(1) A machining condition setting device according to the present invention (machining condition setting device 4 described later, for example) comprises: a move state simulation unit (move state simulation unit 16 described later, for example) that simulates a move state of a machining head (machining head 9 described later, for example) containing at least a relative position or a state of temporal change in a relative move speed of the machining head relative to a workpiece (workpiece 8 described later, for example) using 3D CAD data about the workpiece containing material information defining thermophysical properties including at least heat conductivity, specific heat, and density, and 3D CAD data about the machining head containing information at least about an outer shape of the machining head and about a relative position of the optical axis of a laser beam output from the machining head relative to the outer shape of the machining head, with an intersection point of a machining surface of the workpiece defined by the 3D CAD data about the workpiece and the optical axis of the machining head determined to be a machining point in virtual space, the simulation being conducted under a condition of moving the machining head relative to the workpiece along a machining line set as a path of the machining point determined when the machining head moves relative to the workpiece in the virtual space while the optical axis of the machining head is maintained at a predetermined angle from each of a normal vertical to the machining surface on which the machining point passes through and the machining line, and while a distance between an end surface of the machining head on a laser beam output side and the machining point is maintained at a predetermined distance; a thermal fluid simulation unit (thermal fluid simulation unit 17 described later, for example) that conducts non-stationary thermal fluid simulation for obtaining a temperature distribution in a region covering at least a part of the workpiece to be changed by the move of the machining head outputting a laser beam; and a machining condition setting unit (machining condition setting unit 18 described later, for example) that sets a laser machining condition in advance containing at least a relative move condition for the machining head and a laser beam output condition before implementation of actual laser machining on the basis of simulation results obtained by the move state simulation unit and the thermal fluid simulation unit.

In the foregoing configuration described in (1), the machining condition setting device can be provided capable of setting an optimum laser machining condition containing a laser beam output condition by giving consideration to a move condition for the machining head to move relative to the workpiece having a 3D shape while the machining head is maintained at a predetermined angle and a predetermined gap from the machining surface of the workpiece, change in a move speed of the machining point on a workpiece surface accompanying speed change occurring during the move of the machining head, and change in a machining condition for obtaining a favorable machining result to be changed by change in a heat characteristic condition for the machining point such as the thickness of the workpiece accompanying move of the machining point. More specifically, on the basis of the CAD data containing material information defining physical properties, both a machining head move condition containing speed change in the position or attitude of the machining head and a laser machining condition containing a laser output condition can be set automatically in advance, making it possible to prevent the occurrence of a defective part of machining due to control delay occurring in feedback control. The non-stationary thermal fluid simulation is required to be conducted repeatedly under changing laser output conditions, etc. so as to achieve an intended non-stationary thermal fluid simulation result, so that the non-stationary thermal fluid simulation is generally time consuming. In this regard, setting can be made in advance automatically without human intervention, thereby involving no manpower.

(2) A 3D laser machining system according to the present invention (3D laser machining system 1, 100, 200, 300, 400, 500 described later, for example) comprises: the machining condition setting device described in (1) (machining condition setting device 4 described later, for example); a laser device (laser device 2 described later, for example) comprising at least one laser oscillator (laser oscillator 5 described later, for example), a power supply unit (power supply unit 6 described later, for example) that supplies the laser oscillator with power for laser oscillation, a laser optical system (laser optical system 10 described later, for example) for propagation of a laser beam output from the laser oscillator to the machining head, at least one photodetection means (photodetection means 11 described later, for example) capable of detecting at least one of a laser output beam from the laser oscillator propagated in the laser optical system and a returning beam propagated in the laser optical system in an opposite direction to the laser output beam, and a control unit (control unit 12 described later, for example) that receives output signals from at least the machining condition setting unit and the photodetection means and outputs a control signal containing at least a power output command to the power supply unit; and a driver (driver 3 described later, for example) that receives the control signal from the control unit and moves the machining head relative to the workpiece.

In the foregoing configuration described in (2), the 3D laser machining system can be provided capable of setting an optimum laser machining condition containing a laser beam output condition by giving consideration to a move condition for the machining head to move relative to the workpiece having a 3D shape while the machining head is maintained at a predetermined angle and a predetermined gap from the machining surface of the workpiece, change in a move speed of the machining point on a workpiece surface accompanying speed change occurring during the move of the machining head, and change in a machining condition for obtaining a favorable machining result to be changed by change in a heat characteristic condition for the machining point such as the thickness of the workpiece accompanying move of the machining point. More specifically, on the basis of the CAD data containing material information defining physical properties, both a machining head move condition containing speed change in the position or attitude of the machining head and a laser machining condition containing a laser output condition can be set automatically in advance, making it possible to prevent the occurrence of a defective part due to control delay occurring in feedback control. The non-stationary thermal fluid simulation is required to be conducted repeatedly under changing laser output conditions, etc. so as to achieve an intended non-stationary thermal fluid simulation result, so that the non-stationary thermal fluid simulation is generally time consuming. In this regard, setting can be made in advance automatically without human intervention, thereby involving no manpower.

(3) In the 3D laser machining system described in (2), the 3D laser machining system may comprise the at least one photodetection means capable of detecting the returning beam. If the control unit determines that the quantity of the returning beam is required to be reduced on the basis of a result of detection of the returning beam obtained by the photodetection means, the control unit may output the control signal to the power supply unit and the driver so as to satisfy a condition allowing a temperature at the machining point or a temperature at the workpiece in the vicinity of the machining point to be maintained at a temperature close to an intended temperature by changing the laser machining condition set in advance by the machining condition setting unit at least temporarily and changing the laser machining condition containing both the laser beam output condition and the relative move speed of the machining head relative to the workpiece.

In the foregoing configuration described in (3), by employing a method such as changing laser beam output and at the same time, changing the relative move speed of the machining head to maintain a temperature at the machining point or in the vicinity of the machining point at a temperature close to the intended temperature, the possibility of the occurrence of a defective part can be reduced while damage on the laser optical system or the laser oscillator due to the returning beam is prevented.

(4) In the 3D laser machining system described in (2) or (3), the 3D laser machining system may further comprise ranging means (ranging means 25 described later, for example) capable of measuring a distance between the end surface of the machining head on the laser beam output side and the machining point. On the basis of a measurement result obtained by the ranging means during implementation of actual laser machining, the control unit may fulfill a function of compensating for at least the relative move condition for the machining head of the laser machining condition set in advance on the basis of a result of the machining head move simulation.

In the foregoing configuration described in (4), a deviation of a distance between the end surface of the machining head on the laser beam output side and the machining point from a predetermined distance can be compensated for to be caused by a slight difference between the 3D CAD data about the workpiece and an actual shape or an actual position of the workpiece resulting from the shape accuracy of the workpiece, the accuracy in holding the workpiece, thermal deformation of the workpiece, etc. during implementation of laser machining under the move condition for the machining head set in advance. A target of the compensation is a slight difference, so that a defective part due to delay in the compensation is not caused.

(5) In the 3D laser machining system described in any one of (2) to (4), the 3D laser machining system may further comprise temperature detection means (temperature detection means 26 described later, for example) capable of detecting at least one of a temperature at the machining point moving along the machining line during laser machining and a surface temperature of the workpiece in the vicinity of the machining point. If a temperature difference occurs between a detected temperature detected by the temperature detection means at a certain time point in laser machining on the workpiece performed under the laser machining condition set by the machining condition setting device and a predicted temperature predicted at a position of a time point corresponding to the certain time point contained in the simulation result obtained under the laser machining condition set by the machining condition setting device, the control unit may fulfill a function of compensating for at least a part of the laser machining condition set by the machining condition setting device in response to the temperature difference. The laser device may continue laser machining under the compensated laser machining condition.

In the foregoing configuration described in (5), while a temperature at the machining point or in the vicinity of the machining point deviates from an intended temperature under the laser machining condition set in advance due to an error in the non-stationary thermal fluid simulation, for example, such a temperature deviation can be reduced to stabilize laser machining quality.

(6) In the 3D laser machining system described in any one of (2) to (4), the thermal fluid simulation unit may limit effect of irradiation of the workpiece with a laser beam from the machining head to temperature increase at the workpiece achieved by heat input to the workpiece, and conduct the non-stationary thermal fluid simulation on the assumption that a phase transition of the workpiece does not occur.

In the foregoing configuration described in (6), during laser machining, a temperature at the workpiece increases at the machining point to change the phase of the workpiece from solid to liquid or gas, or further to plasma as ionized gas. Meanwhile, conducting the non-stationary thermal fluid simulation strictly by giving consideration to a flow of a liquid phase in a molten part, the occurrence of plasma, etc. involves a huge amount of calculation load. In this regard, conducting the non-stationary thermal fluid simulation on the assumption that a phase transition of the workpiece does not occur as a replacement makes it possible to obtain a simulation result comparatively easily.

(7) In the 3D laser machining system described in (6), for at least a part of a machining zone along the machining line, the machining condition setting device may set a laser machining condition to obtain a simulation result that at least one of a temperature at the machining point and a temperature in the vicinity of the machining point is at a predetermined temperature at any relative move speed of the machining head moving relative to the workpiece.

In the foregoing configuration described in (7), even if the surface of the workpiece is bent at a right angle and the machining point does not move when the attitude of the machining head is changed for laser machining on the outer surface of the workpiece, for example, a laser machining condition can still be set for controlling laser beam output in such a manner as to prevent excessive increase in the temperature at the machining point or in the vicinity of the machining point. Even the workpiece changing in thickness, etc. can be controlled in such a manner as to achieve a constant temperature at the machining point or in the vicinity of the machining point. During laser machining, by using a temperature in the vicinity of the machining point where a solid state is maintained instead of using a temperature at the machining point where a phase transition actually occurs as an index of laser machining condition setting, an error of the non-stationary thermal fluid simulation resulting from disregarding a phase transition can be reduced.

(8) In the 3D laser machining system described in (7), the thermal fluid simulation unit may contain correlation data indicating correlation between the temperature at the machining point or in the vicinity of the machining point contained in the simulation result obtained under the laser machining condition set by the machining condition setting unit and a temperature at a corresponding position measured during implementation of actual laser machining under the laser machining condition. The thermal fluid simulation unit may make reference to the correlation data to determine a predetermined replacement temperature intended in the non-stationary thermal fluid simulation as a replacement for the predetermined temperature intended during implementation of actual laser machining, and then conduct the non-stationary thermal fluid simulation.

In the foregoing configuration described in (8), in the approximated non-stationary thermal fluid simulation on the assumption that a phase transition of the workpiece does not occur, a certain degree of deviation is unavoidable between a temperature at the machining point or in the vicinity of the machining point calculated from the simulation and a corresponding temperature during implementation of actual laser machining. In this regard, by compensating for an intended temperature at the machining point or in the vicinity of the machining point using the collected correlation data, and then conducting the non-stationary thermal fluid simulation, the temperature at the machining point or in the vicinity of the machining point can be approximated to the intended temperature.

(9) In the 3D laser machining system described in (7), the machining condition setting device may further comprise a machining condition storage unit (machining condition storage unit 24 described later, for example). The machining condition storage unit may contain a substantially optimum acquired laser machining condition for a workpiece condition prepared for each type of laser machining and containing at least a material and a thickness about the workpiece having a plate-like shape. The substantially optimum acquired laser machining condition contains laser machining conditions including at least laser beam output, the relative move speed of the machining point relative to the plate-like workpiece, and a distance between the end surface of the machining head on the laser beam output side and the machining point. Regarding at least a partial particular zone of a zone in which the machining line set at the workpiece has a linear shape and the workpiece has a constant thickness along the machining line, the machining condition setting unit may sets, from among the optimum laser machining conditions stored in the machining condition storage unit, an approximately optimum laser machining condition with conforming or approximately conforming to a workpiece condition. Regarding at least a partial zone of the zone along the machining line other than the particular zone and at least adjacent to the particular zone, the machining condition setting unit may set a laser machining condition under which, with a temperature at the machining point or in the vicinity of the machining point obtained as the simulation result conducted under the approximately optimum laser machining condition set for the particular zone determined to be the predetermined temperature, a temperature at the machining point or in the vicinity of the machining point obtained by the non-stationary thermal fluid simulation becomes the same predetermined temperature as in the particular zone.

In the foregoing configuration described in (9), a laser machining condition required to be set for obtaining a favorable machining result contains a wide range of conditions including not only laser beam output, a distance between the end surface of the machining head on the laser beam output side and the machining point (positions of a laser beam focal point and a machining surface relative to each other), and the relative move speed of the machining head relative to the workpiece but also including a condition for shielding gas or assist gas, etc. Hence, determining an optimum laser machining condition is not easy. Meanwhile, for a limited workpiece condition that the workpiece has a constant thickness and has a flat surface and for a zone along the machining line satisfying a limited machining line shape condition that the machining line has straightness, a stored approximately optimum laser machining condition is applied for each type of laser machining such as cutting or welding, etc. and for each material of the workpiece. By doing so, it becomes possible to obtain a favorable machining result reliably. Further, a laser machining condition highly likely to result in a favorable machining result can be set easily for adjacent zones under close workpiece conditions.

(10) In the 3D laser machining system described in any one of (6) to (9), the 3D laser machining system may further comprise temperature detection means (temperature detection means 26 described later, for example) capable of detecting at least one of a temperature at the machining point moving along the machining line during laser machining and a surface temperature of the workpiece in the vicinity of the machining point. If a temperature difference occurs between a detected temperature detected by the temperature detection means at a certain time point in laser machining on the workpiece performed under the laser machining condition set by the machining condition setting device and a predicted temperature predicted at a position of a time point corresponding to the certain time point contained in the simulation result obtained under the laser machining condition set by the machining condition setting device, the control unit may fulfill a function of compensating for at least a part of the laser machining condition set by the machining condition setting device in response to the temperature difference. The laser device may continue laser machining under the compensated laser machining condition.

In the foregoing configuration described in (10), if an error in the non-stationary thermal fluid simulation causes a deviation of an actual temperature at the machining point or in the vicinity of the machining point from the predicted temperature contained in a result of the non-stationary thermal fluid simulation, in other words, from the intended temperature under the laser machining condition set in advance, this deviation in temperature can be reduced to limit reduction in laser machining quality.

(11) In the 3D laser machining system described in (6), the 3D laser machining system may further comprise temperature detection means (temperature detection means 26 described later, for example) and a first machine learning device (first machine learning device 28 described later, for example). The temperature detection means is capable of detecting at least one of a temperature at the machining point moving along the machining line during laser machining and a surface temperature of the workpiece in the vicinity of the machining point. The first machine learning device may comprise: a first state observation unit (first state observation unit 29 described later, for example) that receives state data about the 3D laser machining system as input data containing at least the laser machining condition set by the machining condition setting unit and the simulation result obtained under the set laser machining condition; a label acquisition unit (label acquisition unit 30 described later, for example) that acquires temporal change data about the temperature detected by the temperature detection means as a label corresponding to answer data; and a first learning unit (first learning unit 31 described later, for example) that receives a large number of pairs of the input data and the label to learn a relationship between the input data and the label. The first learning unit may predict the temporal change data about the temperature detected by the temperature detection means relative to input data newly input using a result of the learning. The machining condition setting device may refer to the temporal change data about the temperature predicted by the first learning unit to adjust the laser machining condition.

In the foregoing configuration described in (11), the first learning unit pursues learning through machine learning to allow accurate prediction of the temporal change data about the temperature detected by the temperature detection means under the laser machining condition set by the machining condition setting device. This allows the machining condition setting device to adjust the laser machining condition in such a manner that the temporal change data about the temperature conforms to intention. Thus, even the workpiece having a complicated shape can be subjected to laser machining while a temperature at the machining point or in the vicinity of the machining point is maintained at an intended temperature. Further, both the laser machining condition and a simulation result obtained under the laser machining condition are observed as state data. In this way, the simulation result is used as a hint. This makes it possible to pursue learning comparatively easily for prediction of temporal change data about a temperature detected by the temperature detection means under a new laser machining condition.

(12) In the 3D laser machining system described in (11), if a temperature difference between a detected temperature detected by the temperature detection means at a certain time point in laser machining on the workpiece performed under the laser machining condition adjusted with reference to the temporal change data about the temperature predicted by the first learning unit by the machining condition setting device and a predicted temperature predicted at a position of a time point corresponding to the certain time point contained in the simulation result obtained under the adjusted laser machining condition exceeds a predetermined temperature difference, the control unit may fulfill a function of compensating for at least a part of the laser machining condition adjusted by the machining condition setting device in response to the temperature difference. The laser device may continue laser machining under the compensated laser machining condition.

In the foregoing configuration described in (12), if learning by the first learning unit is insufficient, or if a peripheral state around the laser device or the driver changes during laser machining or if a surface state of the workpiece is nonuniform while the learning by the first learning unit has been pursued sufficiently, even machining under a laser machining condition adjusted and then determined by referring to the temporal change data about the predicted temperature input from the first learning unit still makes it likely that a temperature detected by the temperature detection means will differ from the predicted temperature. In this regard, compensating for the laser machining condition makes it possible to reduce the occurrence of a defective part.

(13) In the 3D laser machining system described in (11) or (12), the 3D laser machining system may further comprise a higher-order computer (higher-order computer 34 described later, for example), a higher-order network (higher-order network 35 described later, for example), and a lower-order network (lower-order network 36 described later, for example). The first machine learning device and a plurality of the laser devices may be connected through the lower-order network to form a manufacturing cell (manufacturing cell 37, 370 described later, for example). A plurality of the manufacturing cells and the higher-order computer may be connected through the higher-order network. The higher-order computer may function at least as the thermal fluid simulation unit of the machining condition setting device. The first state observation unit of the first machine learning device may receive at least the laser machining condition as a simulation condition for the non-stationary thermal fluid simulation by the thermal fluid simulation unit and at least temporal change data about a temperature expected to be detected by the temperature detection means as a part of a simulation result of the non-stationary thermal fluid simulation input through the higher-order network and the lower-order network. The temporal change data about the temperature detected by the temperature detection means may be input to the label acquisition unit of the first machine learning device through the lower-order network. A learning model may be shared between a plurality of the first learning units through the higher-order network and the lower-order network.

In the foregoing configuration described in (13), the first machine learning device, which is required to pursue learning by processing a label in real time as temporal change data about a temperature detected by the temperature detection means, is connected to the lower-order network also called a fog network to which several to several tens of laser devices are connected. The non-stationary thermal fluid simulation is simulation involving a huge amount of calculation load while real-time performance required for this simulation is not very high. By conducting this non-stationary thermal fluid simulation at the higher-order computer such as a cloud server connected to the higher-order network, both of required real-time performance of processing and required large-scale processing power can be achieved.

(14) In the 3D laser machining system described any one of (2) to (4), the 3D laser machining system may further comprise at least one in-line image monitoring device (in-line image monitoring device 38 described later, for example) and a second machine learning device (second machine learning device 39 described later, for example). The in-line image monitoring device is capable of acquiring image data indicating a 2D shape or a 3D shape at a surface of the workpiece or inside the workpiece in at least either a part of the workpiece being subjected to laser machining or a part of the workpiece immediately after the laser machining. The second machine learning device may comprise: a second state observation unit (second state observation unit 40 described later, for example) that observes a state inside the 3D laser machining system and a state outside the 3D laser machining system containing at least the laser machining condition set by the machining condition setting unit and shape data about the workpiece corresponding to the image data as the simulation result obtained under the set laser machining condition, and outputs the observed states as state data; a determination data acquisition unit (determination data acquisition unit 41 described later, for example) that acquires time-series image data obtained by the in-line image monitoring device, and outputs a result of comparison between the acquired image data and sample image data given a score stored in advance as determination data; a second learning unit (second learning unit 42 described later, for example) that receives the outputs from the second state observation unit and the determination data acquisition unit; and a decision making unit (decision making unit 43 described later, for example) that determines a laser machining condition to be output from the second learning unit on the basis of a value function as a result of learning by the second learning unit. The second learning unit may comprise: a reward calculation unit (reward calculation unit 44 described later, for example) that calculates a reward from the determination data; and a value function update unit (value function update unit 45 described later, for example) that updates value functions sequentially on the basis of the calculated reward. The second learning unit may associate the laser machining condition output from the decision making unit with the state data input from the second state observation unit and the determination data input from the determination data acquisition unit, and learn an optimum laser machining condition in each state in a trial-and-error method on the basis of the determination data.

In the foregoing configuration described in (14), as the second learning unit pursues learning through machine learning, it becomes possible to output a laser machining condition directly related to a favorable laser machining result under which time-series image data generated by imaging by the in-line image monitoring device conforms to sample image data given a high score. Further, by observing state data containing a laser machining condition and shape data about the workpiece corresponding to image data as a simulation result obtained under this laser machining condition, it becomes possible to give a hint from a simulation result indicating which condition of the laser machining condition is to be changed and how a workpiece shape during laser machining or immediately after the laser machining is to be changed by the change in the condition. In this way, learning of an optimum laser machining condition in each state can be pursued efficiently.

(15) In the 3D laser machining system described in (14), when the determination data acquisition unit compares the image data obtained by imaging by the in-line image monitoring device with the sample image data given a score and outputs determination data indicating that the score of the image data obtained by imaging by the in-line image monitoring device is lower than a predetermined point during laser machining on the workpiece under the laser machining condition output from the second machine learning device, the control unit may fulfill a function of compensating for at least a part of the laser machining condition originally output from the second machine learning device. The laser device may continue laser machining under the compensated laser machining condition.

In the foregoing configuration described in (15), if learning by the second learning unit is insufficient, or if a peripheral state around the laser device or the driver changes during laser machining or if a surface state of the workpiece is nonuniform while the learning by the second learning unit has been pursued sufficiently, it is likely that image data will be deviate slightly from sample image data given a high score during machining under the laser machining condition output from the second machine learning device. In this regard, by compensating for the laser machining condition, the occurrence of a defective part can be reduced.

(16) In the 3D laser machining system described in (14) or (15), the 3D laser machining system may further comprise a higher-order computer (higher-order computer 34 described later, for example), a higher-order network (higher-order network 35 described later, for example), and a lower-order network (lower-order network 36 described later, for example). The second machine learning device and a plurality of the laser devices may be connected through the lower-order network to form a manufacturing cell (manufacturing cell 37, 370 described later, for example). A plurality of the manufacturing cells and the higher-order computer may be connected through the higher-order network. The higher-order computer may function at least as the thermal fluid simulation unit of the machining condition setting device. The second state observation unit of the second machine learning device may receive at least the laser machining condition as a simulation condition for the non-stationary thermal fluid simulation by the thermal fluid simulation unit and at least the shape data about the workpiece corresponding to the image data as a part of a simulation result of the non-stationary thermal fluid simulation input through the higher-order network and the lower-order network. The image data obtained by imaging by the in-line image monitoring device may be input to the determination data acquisition unit of the second machine learning device through the lower-order network. The value function may be shared between a plurality of the second learning units through the higher-order network and the lower-order network.

In the foregoing configuration described in (16), the second machine learning device, which is required to pursue learning by comparing time-series image data acquired by the in-line image monitoring device and sample image data given a score in real time, outputting a result of the determination as determination data to the second learning unit, and making the second learning unit calculate a reward from the determination data in real time and update the value function, is connected to the lower-order network also called a fog network to which several to several tens of laser devices are connected. The non-stationary thermal fluid simulation is simulation involving a huge amount of calculation load while real-time performance required for this simulation is not very high. By conducting this non-stationary thermal fluid simulation at the higher-order computer such as a cloud server connected to the higher-order network, both of required real-time performance of processing and required large-scale processing power can be achieved.

The present invention can provide a machining condition setting device and a 3D laser machining system capable of setting an optimum laser machining condition containing a laser beam output condition by giving consideration to a move condition for a machining head to move relative to a workpiece having a 3D shape while the machining head is maintained at a predetermined angle and a predetermined gap from a machining surface of the workpiece, change in a move speed of a machining point on a workpiece surface accompanying speed change occurring during the move of the machining head, and change in a machining condition for obtaining a favorable machining result to be changed by change in a heat characteristic condition for the machining point such as the thickness of the workpiece accompanying move of the machining point.

BRIEF DESCRIPTION OF THE DRAWINGS

FIG. 11 is a graph showing an example of data about correlation between a simulation result temperature in the vicinity of a machining point and a measured temperature in the vicinity of the machining point used in the 3D laser machining system according to the first embodiment of the present invention;

FIG. 19A is a first flowchart showing an example of the motion of the 3D laser machining system according to the fifth embodiment of the present invention;

FIG. 19B is a second flowchart showing the example of the motion of the 3D laser machining system according to the fifth embodiment of the present invention;

DETAILED DESCRIPTION OF THE INVENTION

Figure 1:
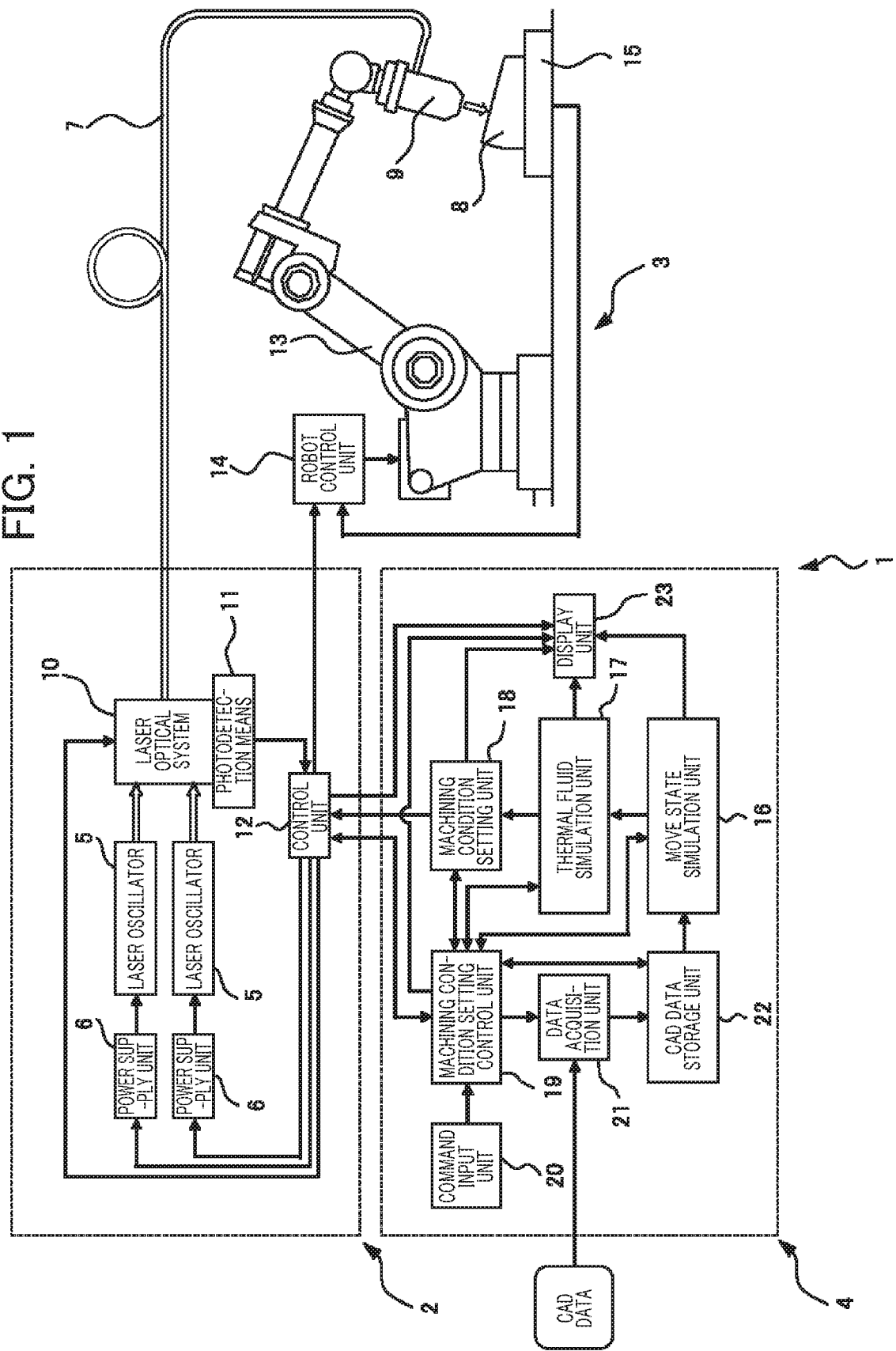
FIG. 1 is a block diagram showing a conceptual configuration of a 3D laser machining system according to a first embodiment of the present invention.

Embodiments of a 3D laser machining system according to the present invention will be described below by referring to the drawings. In the drawings, corresponding members are identified by the same reference sign. Members given the same reference sign in different drawings mean that these members are constituting elements having the same function. To facilitate illustrations of the drawings, the scales of the drawings are changed, where appropriate.

First Embodiment

FIG. 1 is a block diagram showing a conceptual configuration of a 3D laser machining system according to a first embodiment of the present invention. The configuration of a 3D laser machining system 1 of the first embodiment is roughly divided into three devices including a laser device 2, a driver 3, and a machining condition setting device 4.

The laser device 2 has a configuration comparable to that of a common laser device available alone. The laser device 2 includes at least one laser oscillator 5 that outputs a laser beam, a power supply unit 6 that supplies the laser oscillator 5 with power for laser oscillation, a laser optical system 10 including a machining head 9 for passing the laser beam output from the laser oscillator 5 through an optical fiber 7 and applying the laser beam to a workpiece 8 as a laser machining target; photodetection means 11 that detects the beam propagated through the laser optical system 10; and a control unit 12 that at least outputs a power output command corresponding to a light output command to the power supply unit 6 and receives a detection result by the photodetection means 11.

While an input unit for input of a laser output condition, etc. is required if the laser device 2 is used alone, such an input unit is not shown. In FIG. 1, the machining head 9 and the optical fiber 7 are shown together with the laser optical system 10. In the present specification, unless otherwise specified, the term "laser optical system" has a meaning including the machining head 9, the optical fiber 7, etc. Thus, the laser optical system described herein includes an optical combiner for combining laser beams from a plurality of the laser oscillators 5 like in the first embodiment, or a fiber coupler not shown in FIG. 1 for inputting a laser beam output from an end surface of one optical fiber to an end surface of a different optical fiber. In the case of a laser oscillator using a laser diode module as an excitation light source, the laser optical system includes an optical amplifying medium such as an amplifying optical fiber or an optical system for input of a laser beam to the optical amplifying medium. In the case of a laser oscillator using a laser diode module as a laser light source, the laser optical system includes an optical combiner, etc. for combining laser beams from the laser diode module.

The laser optical system 10 may be controlled in optical characteristics such as a focal length in response to a command from the control unit 12. In addition to photodetection means that detects a laser beam output from the laser oscillator 5, the photodetection means 11 desirably includes photodetection means that detects a returning beam propagated in the laser optical system 10 in an opposite direction to a laser beam output from the laser oscillator 5 such as a reflected beam of a laser beam output from the machining head 9 and reflected on a surface of the workpiece 8. In FIG. 1, blank arrows show laser beams in a simulated manner. Solid arrows show signal lines, etc. and directions of the signals in a simulated manner. This applies to the block diagrams subsequent to FIG. 1 and showing corresponding conceptual configurations.

The driver 3 used herein means a device for moving the position of the machining head 9 including the attitude of the machining head 9 relative to a machining surface of the workpiece 8. In the first embodiment, the driver 3 is composed of a robot 13 and a robot control unit 14. The machining head 9 is attached to a hand of the robot 13.

In response to a control signal from the robot control unit 14 having received a machining head drive command from the control unit 12, the robot 13 moves the machining head 9 to an attitude or a position responsive to the machining head drive command in synchronization with laser beam output from the machining head 9. The workpiece 8 is held on a holding mechanism unit 15. The holding mechanism unit 15 may be provided with a liner motor, for example, to share the role of the driver 3. To make the holding mechanism unit 15 share the role of the driver 3, a signal indicating a holding state of the workpiece 8 is output from the holding mechanism unit 15 to the robot control unit 14 or the control unit 12, and additionally, a holding mechanism unit drive command is output from the robot control unit 14 or the control unit 12 to the holding mechanism unit 15.

The machining condition setting device 4 includes a move state simulation unit 16, a thermal fluid simulation unit 17, a machining condition setting unit 18, a machining condition setting control unit 19, a command input unit 20, a data acquisition unit 21, a CAD data storage unit 22, and a display unit 23.

When a command to set a laser machining condition is input to the command input unit 20, the machining condition setting control unit 19 reads 3D CAD data on the data acquisition unit 21 in response to the command from the command input unit 20, and gives a command to store the read CAD data into the CAD data storage unit 22. The 3D CAD data contains 3D CAD data about the workpiece 8 defining thermophysical properties including at least heat conductivity, specific heat, and density, and 3D CAD data about the machining head 9. These pieces of 3D CAD data are read into the data acquisition unit 21 from the outside of the machining condition setting device 4.

Referring next to the move state simulation unit 16, in response to the command from the machining condition setting control unit 19, the move state simulation unit 16 simulates a move state of the machining head 9 using the 3D CAD data about the workpiece 8 and the 3D CAD data about the machining head 9 stored in the CAD data storage unit 22. The move state of the machining head 9 means move of the machining head 9 relative to the workpiece 8 along a machining line set in the foregoing 3D CAD data about the workpiece 8 while the machining head 9 is maintained at a predetermined angle and a predetermined gap from the machining surface of the workpiece 8. The machining line is a path of a machining point determined when the machining head 9 moves relative to the workpiece 8. The machining point means an intersection point of the machining surface of the workpiece 8 and the optical axis of the machining head 9.

The move state of the machining head 9 is desirably simulated by moving the machining head 9 relative to the workpiece 8 in virtual 3D space along the machining line of the workpiece 8 while maintaining the machining head 9 at a predetermined angle and a predetermined gap from the machining surface of the workpiece 8, while consideration is given to a settable range for a move speed of the machining head 9 including an assumable attitude of the machining head 9 or change in the attitude of the machining head 9 on the basis of the performance, specifications, etc. of the driver 3 for moving the position of the machining head 9.

Figure 2:
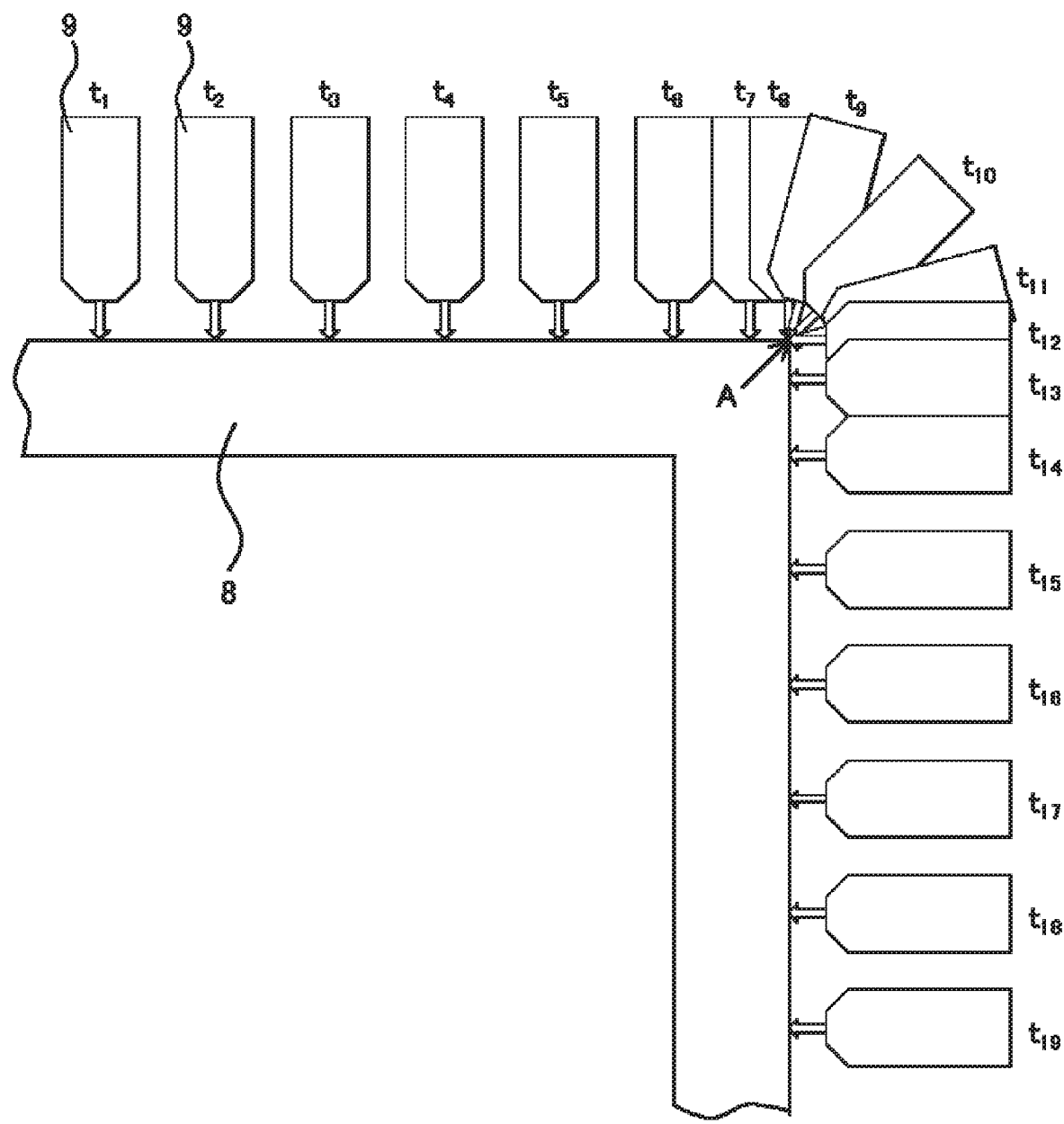
FIG. 2 shows simulated motion of a machining head illustrated as an example of a move state simulation result in the 3D laser machining system according to the first embodiment of the present invention.
Figure 3:
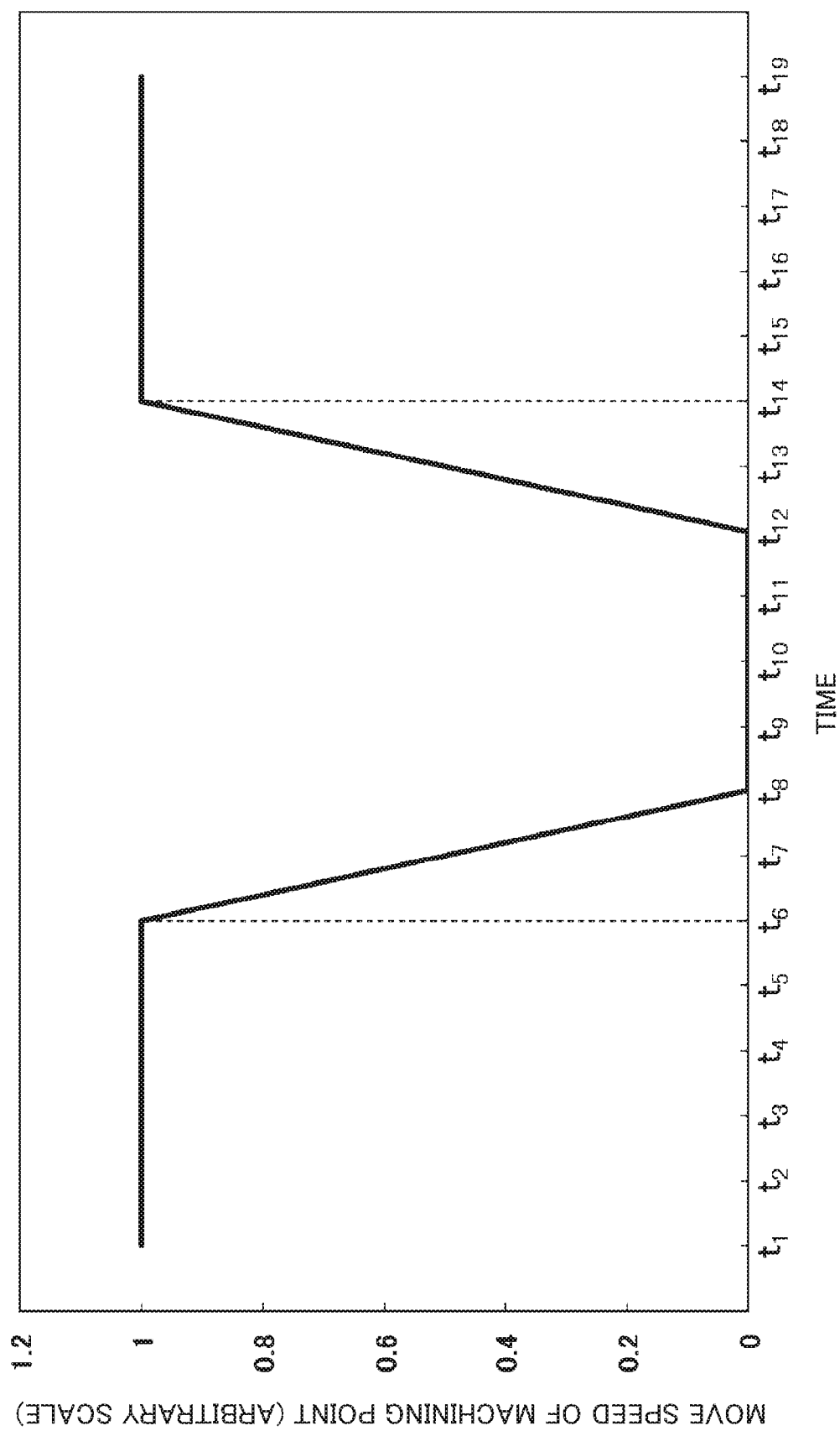
FIG. 3 is a graph showing temporal change in a move speed of a machining point illustrated as an example of a move state simulation result in the 3D laser machining system according to the first embodiment of the present invention.

FIGS. 2 and 3 show a specific example of a part of the move state simulation. In FIGS. 2 and 3, $t_1, t_2, t_3, \ldots t_{19}$ show evenly spaced time points of laser machining on the machining surface of the workpiece 8 with the machining head 9. As shown in FIG. 2, the machining surface of the workpiece 8 changes at a right angle. Like in this case, if the machining surface of the workpiece 8 changes steeply, a point on the machining surface of the workpiece 8 irradiated with a laser beam output from the machining head 9, namely, a machining point is at a standstill at a point A shown in FIG. 2 when the attitude of the machining head 9 is changed relative to the workpiece 8. Thus, as shown in FIG. 3, as the machining point approaches the point A, a move speed of the machining head 9 is required to be reduced from a certain position.

To minimize a machining duration, the move speed is desirably reduced after the machining point approaches the point A as close as possible within a range in which the position of the machining head 9 can be controlled stably. Thus, a position where the move speed of the machining head 9 starts to be reduced is determined by giving consideration to the performance of the driver 3, etc.

A speed at which the attitude of the machining head 9 relative to the workpiece 8 is changed is also desirably as high as possible within a range in which the attitude of the machining head 9 can be controlled stably. Thus, after changing the attitude of the machining head 9 relative to the workpiece 8 is finished, the move speed of the machining head 9 relative to the workpiece 8 is increased as much as possible within a range in which the position of the machining head 9 can be controlled stably.

An acceleration of the foregoing attitude change and an acceleration of the foregoing move of the machining head 9 are also determined by giving consideration to the performance of the driver 3, etc. In consideration of a range of laser beam output attainable by the laser device 2, however, excessively high move speed of the machining point may cause the risk of failing to obtain a favorable machining result. Thus, a result of the move state simulation is considered as an indication of an upper limit of a permissible speed and a permissible acceleration, and then a final move condition for the machining head 9 relative to the workpiece 8 is determined.

In the example of the move state simulation shown in FIGS. 2 and 3, the move speed of the machining head 9 in a horizontal direction starts to be reduced from when the machining point is at the time point $t_6$. The move speed of the machining point is zero in a period from the time point to when the machining point reaches the point A to the time point $t_{12}$ when tilting the attitude of the machining head 9 to 90° is finished. Further, the move speed of the machining head 9 in a vertical direction starts to be increased from when the machining point is at the time point $t_{12}$, and restores its original speed at the time point $t_{14}$.

The foregoing result of the move state simulation may be displayed on the display unit 23 as video of 3D images including the workpiece 8 and the machining head 9 in order to allow check of the simulation result. In this case, a speed or a viewpoint of reproduction of the video is desirably freely changeable in order for the simulation result to be checked easily. If a result of the move state simulation shows that the machining head 9 will interfere with the workpiece 8, for example, to permit implementation of intended laser machining, an indication that the laser machining is impossible due to interference by the machining head 9 may be displayed on the display unit 23.

When the machining head 9 moves relative to the workpiece 8 according to the move state simulation result obtained by the move state simulation unit 16, the thermal fluid simulation unit 17 conducts non-stationary thermal fluid simulation of calculating a temperature distribution in a region covering at least a part of the workpiece 8 to be changed by the move of the machining head 9.

It is assumed, for example, that the machining head 9 moves in the pattern shown in FIGS. 2 and 3, and the move speed of the machining head 9 is reduced for changing the attitude of the machining head 9 to reduce the move speed of the machining point moving along the machining line on the machining surface of the workpiece 8. In this case, under the condition that the same laser beam output is given from the machining head 9, laser energy applied to the machining point per unit time is increased to increase a temperature excessively at the machining point or at the workpiece 8 in the vicinity of the machining point. This unfortunately causes a deviation from an optimum laser machining condition. Hence, if a type of laser machining is cutting, for example, a defective part may occur such as failing to obtain a smooth cutting surface due to an excessively increased width of a molten part of a workpiece. Further, if a type of the laser machining is welding, a defective part such as increased porosity occurs.

Figure 4:
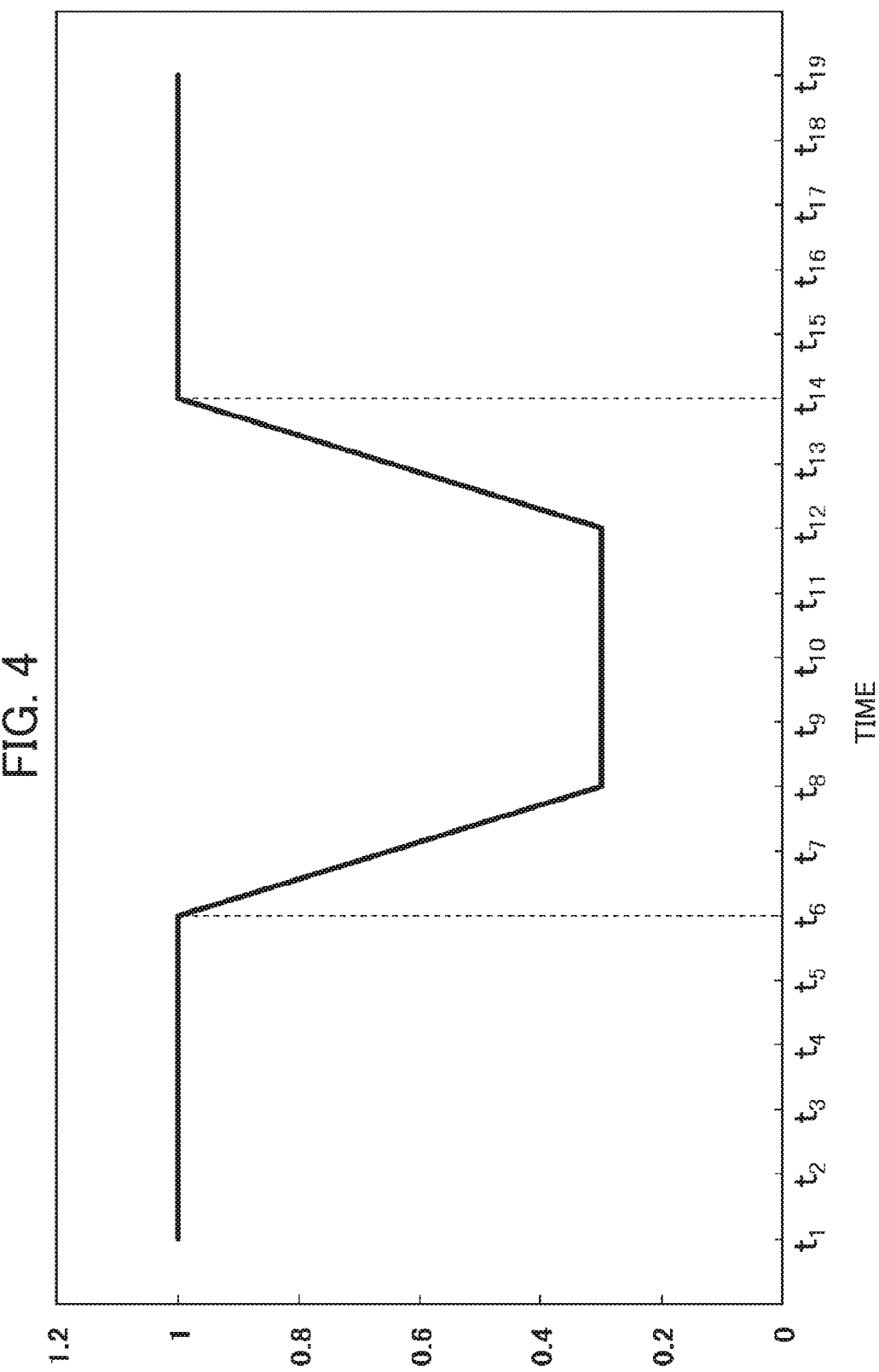
FIG. 4 is a graph showing temporal change in laser beam output illustrated as an example of a non-stationary thermal fluid simulation result in the 3D laser machining system according to the first embodiment of the present invention.

To prevent the occurrence of a defective part, as shown in FIG. 4, for example, laser beam output is required to be reduced in such a manner as to coincide with timing of reduction in the move speed of the machining point along the machining line. The non-stationary thermal fluid simulation is conducted to determine a way of controlling a laser machining condition conforming to the move state of the machining point along the machining line by determining a degree of reduction of the laser beam output, for example. Basically, the non-stationary thermal fluid simulation is repeated until a simulation result corresponding to a favorable laser machining result is obtained by feeding back simulation results and changing laser machining conditions. According to the conventionally reported control method of controlling laser beam output in proportion to the move speed of the machining point along the machining line, if the machining head 9 moves in the manner shown in FIG. 2 or 3, for example, the move speed of the machining point along the machining line is 0 (m/s) when the attitude of the machining head 9 is changed. In this case, it is clear that laser beam output is stopped and a temperature at the machining point is reduced to cause a defective part.

In the 3D laser machining system 1 of the first embodiment, on the basis of simulation results obtained by the move state simulation unit 16 and the thermal fluid simulation unit 17, the machining condition setting unit 18 sets a laser machining condition containing at least a relative move condition for the machining head 9 and a laser beam output condition in advance before implementation of actual laser machining, and then laser machining is started. However, if the control unit 12 determines that the quantity of a returning beam is required to be reduced on the basis of a result of detection of the returning beam obtained by the photodetection means 11, the laser machining condition set in advance by the machining condition setting unit 18 is desirably changed at least temporarily. More specifically, a laser machining condition containing both a laser beam output condition and a relative move speed of the machining head 9 relative to the workpiece 8 is changed to a laser machining condition under which the laser beam output is reduced and at the same time, the relative move speed of the machining head 9 is reduced, for example, to allow a temperature at a machining point or a temperature at the workpiece 8 in the vicinity of the machining point to be maintained at a temperature close to an intended temperature. By doing so, the possibility of the occurrence of a defective part can be reduced while damage on the laser optical system 10 or the laser oscillator 5 due to the returning beam is prevented.

While not shown in FIG. 1, it is desirable that ranging means be attached to the machining head 9, for example. During implementation of actual laser machining, on the basis of a result of measurement by the ranging means, the control unit 12 desirably compensates for at least a move condition for the machining head 9 belonging to a laser machining condition set in advance on the basis of a result of the machining head move simulation. The ranging means is means such as a laser range sensor capable of measuring a distance between an end surface of the machining head 9 on a laser beam output side and the machining point without contacting the workpiece 8. This makes it possible to compensate for a slight deviation of a distance between the end surface of the machining head 9 on the laser beam output side and the machining point from a predetermined distance caused by a slight difference between the 3D CAD data about the workpiece 8 and an actual shape or an actual position of the workpiece 8 resulting from the shape accuracy of the workpiece 8, the accuracy in holding the workpiece 8, thermal deformation of the workpiece 8, etc. As a result, the occurrence of a defective part can be prevented to be caused by the deviation of the distance between the end surface of the machining head 9 on the laser beam output side and the machining point from the predetermined distance. A target of the compensation is a slight difference, so that a defective part due to delay in the compensation is not caused.

While also not shown in FIG. 1, temperature detection means such as a thermography may be attached to the machining head 9, for example. This temperature detection means is capable of detecting at least one of a temperature at the machining point moving along the machining line during laser machining and a surface temperature of the workpiece 8 in the vicinity of the machining point without contacting the workpiece 8. In this case, if a temperature difference occurs between a detected temperature detected by the temperature detection means at a certain time point in the laser machining on the workpiece 8 performed under the laser machining condition set by the machining condition setting device 4 and a predicted temperature predicted at a position of a time point corresponding to the certain time point contained in a simulation result obtained under the laser machining condition set by the machining condition setting device 4, the control unit 12 preferably fulfills a function of compensating for at least a part of the laser machining condition set by the machining condition setting device 4 in response to the temperature difference. Then, the laser machining is continued under the compensated laser machining condition. By doing so, while a temperature at the machining point or a temperature in the vicinity of the machining point deviates from an intended temperature under the laser machining condition set in advance due to an error in the non-stationary thermal fluid simulation, for example, such a temperature deviation may be reduced to stabilize laser machining quality. If the detected temperature detected by the temperature detection means becomes lower than the predicted temperature or the intended temperature, for example, the control unit 12 may make compensation of increasing laser beam output. If the detected temperature becomes higher than the predicted temperature or the intended temperature, the control unit 12 may make compensation of reducing laser beam output.

Regarding the non-stationary thermal fluid simulation of calculating a temperature distribution in a region covering at least a part of the workpiece 8 to be changed by the move of the machining head 9, by laser irradiation of the workpiece 8, a laser beam is absorbed in an electron to increase a temperature at the electron. Coulomb collision thereafter occurs to cause lattice vibration of an atom or ion temperature increase. Then, complicated physical phenomena occur such as phase transitions of the workpiece 8 including melting, evaporation, transformation into plasma, and re-solidification, convection of a melt, and evaporation of the melt to cause flow of a gasified substance, for example. Thus, a simulation result containing a result of laser machining may be obtained by simulating all the phenomena faithfully. However, simulating all the phenomena faithfully causes a problem as it necessitates a tremendous amount of calculation load and a sufficiently accurate simulation result cannot be obtained. In this regard, to obtain a simulation result comparatively easily, an approximate simulation method may be employed. According to this simulation method, effect of irradiation of the workpiece 8 with a laser beam from the machining head 9 is limited to temperature increase at the workpiece 8 achieved by heat input to the workpiece 8. On the assumption that a phase transition of the workpiece 8 does not occur, non-stationary thermal fluid simulation is conducted.

For implementation of the non-stationary thermal fluid simulation on the assumption that the effect of irradiation with a laser beam is only temperature increase at the workpiece 8 achieved by heat input to the workpiece 8 and a phase transition of the workpiece 8 does not occur, the non-stationary thermal fluid simulation may be conducted by approximating the effect of irradiation of the workpiece 8 with a laser beam using only input energy of the laser beam to the workpiece 8, a spot diameter on a workpiece surface, reflectivity at a laser irradiated position on the workpiece 8, and a coefficient of absorption of the laser beam by the workpiece 8, as shown in the following formula 1.

$$Q(x,y,z,t)=(1-R)I_o(x,y,t)\exp(-\alpha z) \qquad [\text{Math. 1}]$$

In this formula, $Q(x, y, z, t)$ means the amount of heat input to the workpiece 8 by the laser irradiation, x and y mean coordinates at the machining point on the workpiece 8 in a plane including the machining surface, and z means a coordinate in a direction passing through the machining point on the workpiece 8 and vertical to the plane including the machining surface at the machining point. The coordinates of the machining point may be set as follows: x=y=z=0. In this formula, t means time, R means reflectivity, α means an absorption coefficient, and $I_o(x, y, t)$ means input beam intensity.

As shown in the following formula 2, the input beam intensity can be expressed by the product of a spatial function f(x, y) meaning an input heat profile on the machining surface of the workpiece 8 and peak input energy density $I_p(t)$ [W/m$^2$] of the input laser beam.

$$I_o(x,y,t)=f(x,y)I_p(t) \qquad \text{[Math. 2]}$$

Figure 5:
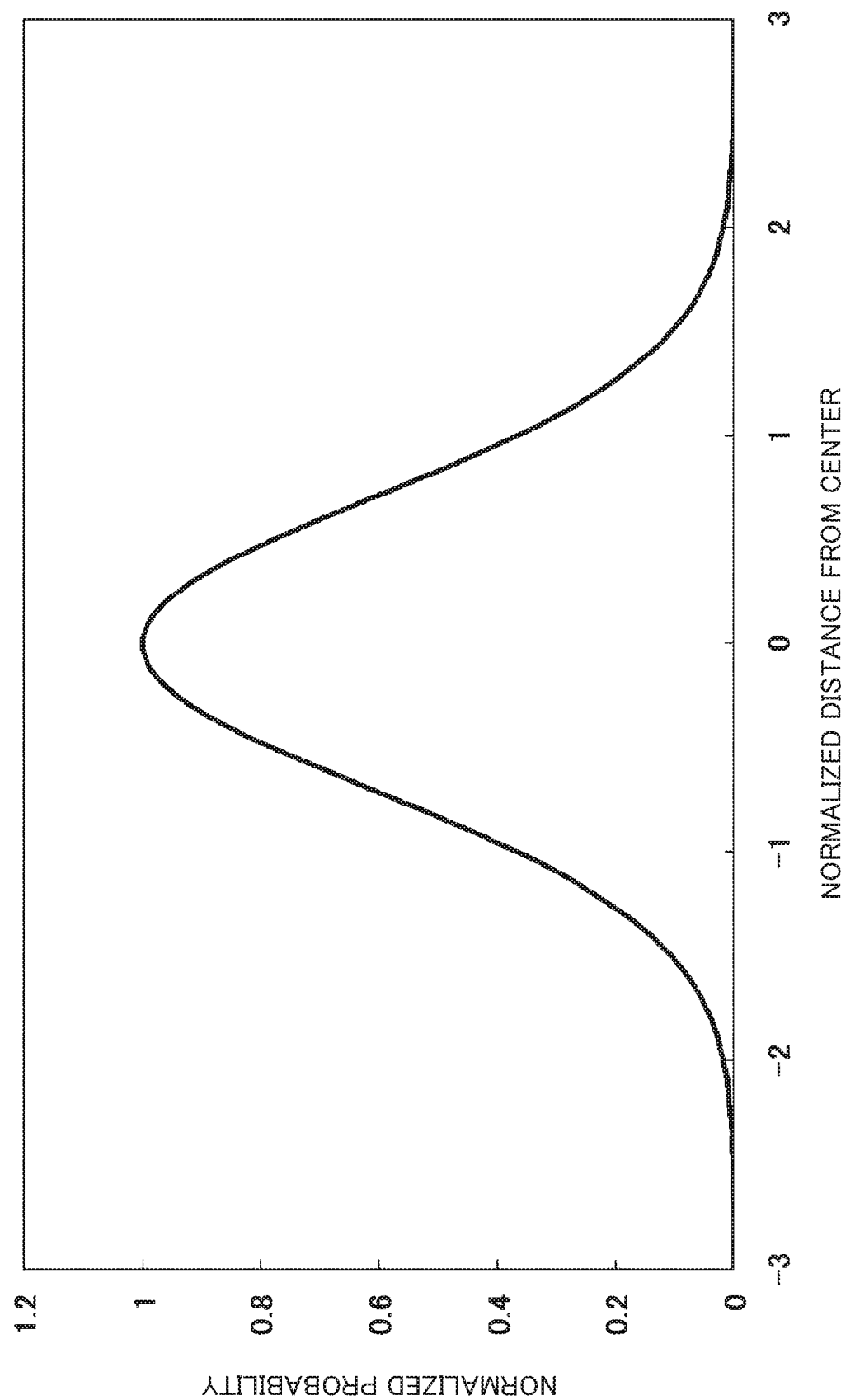
FIG. 5 is a graph showing an example of a spatial distribution of input energy density of a laser beam applied to a workpiece.

In this formula, the peak input energy density $I_p(t)$ [W/m$^2$] is a time function. If an input energy density distribution is a Gaussian distribution as shown in FIG. 5, the spatial function f(x, y) can be expressed by the following formula 3.

$$f(x, y) = \exp\left(-\frac{x^2 + y^2}{r^2}\right) \qquad \text{[Math. 3]}$$

Figure 6:
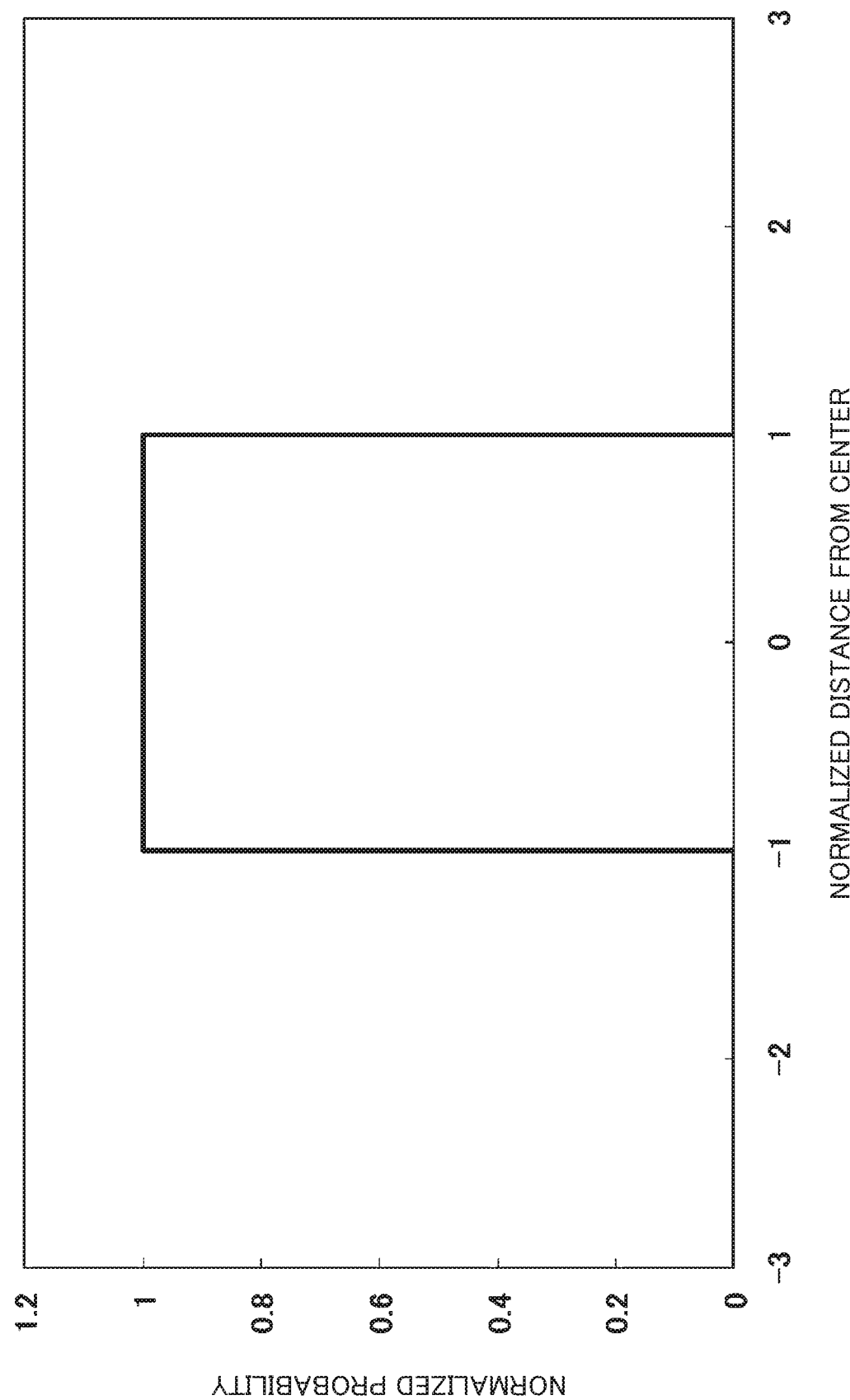
FIG. 6 is a graph showing another example of a spatial distribution of input energy density of a laser beam applied to the workpiece.

In this formula, r is a radius of irradiation of the input laser beam on the workpiece surface and corresponds to a half of a spot diameter. A shown in FIG. 6, if the input energy density distribution is a top hat distribution, the spatial function f(x, y) can be approximated and expressed by the following formula 4.

$$f(x, y) = 1 \ (\text{IF } x^2 + y^2 \leq r^2) \qquad \text{[Math. 4]}$$
$$\phantom{f(x, y)} = 0 \ (\text{IF } x^2 + y^2 > r^2)$$

As shown in the following formula 5, independently of whether the input energy density distribution is a Gaussian distribution or a top hat distribution, double integration of a formula with respect to x and y results in input energy $\pi r^2 I_p(t)$ [W] of the laser beam to the workpiece 8. The spatial function f(x, y) is not limited to the foregoing Gaussian distribution or top had distribution but may be a spatial function obtained by measuring an actual intensity distribution, for example.

$$\int_{-\infty}^{+\infty}\int_{-\infty}^{+\infty} f(x,y)I_p(t)dxdy = \pi r^2 I_p(t) \qquad \text{[Math. 5]}$$

As described above, the effect of irradiation of the workpiece 8 with a laser beam is approximated using only input energy of the laser beam to the workpiece 8, a spot diameter of the laser beam on the workpiece surface, reflectivity at a laser irradiated position on the workpiece 8, and a coefficient of absorption of the laser beam by the workpiece 8, while no consideration is given to phase transitions. By doing so, the non-stationary thermal fluid simulation can be conducted comparatively easily.

Meanwhile, like physical property values about the workpiece 8 such as heat conductivity, specific heat, and density, a coefficient of absorption of a laser beam by the workpiece 8 and reflectivity at the workpiece 8 are changed by temperature increase or phase change at the workpiece 8 occurring in response to heat input. Hence, it is difficult to obtain accurate physical property values. In response to this, the following methods can be employed in the non-stationary thermal fluid simulation: a physical property value at the highest temperature available for a solid phase is used; if temperature dependence on the solid phase is known, a physical property value giving consideration to temperature dependence extrapolated to a higher temperature is used; trial laser machining is performed on an experimental workpiece having a simple shape, and a physical property value conforming to a result of the experiment is used.

Reflectivity is desirably determined by giving consideration to input angle dependence. In the case of the workpiece 8 made of metal, as a coefficient of absorption of a laser beam by a solid is high, absorption of the laser beam may be approximated under the assumption that the laser beam is absorbed entirely on the surface of the workpiece 8.

Shielding gas or assist gas contained in a laser machining condition effectively cools a workpiece surface in addition to fulfilling its inherent function. There is a region in which the shielding gas or assist gas is blown at a high speed on the workpiece 8 and the gas is compressed considerably. Thus, to reflect the influence of such gas as correctly as possible, such gas is desirably used as compressible gas for implementation of the non-stationary thermal fluid simulation.

For implementation of the non-stationary thermal fluid simulation on the assumption that a phase transition of the workpiece 8 does not occur and on the basis of a result of the move state simulation by the move state simulation unit 16, an intended laser machining condition for at least a partial machining zone of the machining line can be set so as to obtain a simulation result that at least one of a temperature at a machining point and a temperature in the vicinity of the machining point is at a predetermined constant temperature at any relative move speed of the machining head 9 moving relative to the workpiece 8. During laser machining, using a temperature in the vicinity of the machining point where a solid state is maintained instead of using a temperature at the machining point where a phase transition actually occurs as an index of laser machining condition setting is considered to achieve greater reduction in error of the non-stationary thermal fluid simulation resulting from disregarding a phase transition. The term being the vicinity of the machining point used in each case in the present specification has a meaning as a particular point or position separated by a predetermined distance in a predetermined direction from the machining point.

If an intended laser machining condition to be set is to place at least one of a temperature at the machining point and a temperature in the vicinity of the machining point at a predetermined constant temperature, the thermal fluid simulation unit 17 repeats the non-stationary thermal fluid simulation by considering a result of the move state simulation by the move state simulation unit 16 to derive a laser machining condition under which the temperature at the machining point or the temperature in the vicinity of the machining point is assumed to be at the foregoing predetermined temperature. In other words, the non-stationary thermal fluid simulation is repeated until a difference between a temperature obtained in a simulation result and the foregoing predetermined temperature becomes a predetermined value or less through an entire machining zone.

In this way, before implementation of actual laser machining, the machining condition setting unit 18 sets a laser machining condition in advance containing a move condition for the machining head 9 on the basis of simulation results obtained by the move state simulation unit 16 and the thermal fluid simulation unit 17, and outputs the set laser machining condition to the control unit 12. The control unit 12 outputs a light output command or a machining head drive command, for example, conforming to the laser machining condition to each unit in the laser device 2 or each unit in the driver 3 to perform the laser machining.

As described above, laser machining is performed under a laser machining condition under which a temperature at the machining point or in the vicinity of the machining point is assumed to become a predetermined temperature. By doing so, even in the case such as that shown in FIG. 2 where the surface of the workpiece 8 is bent at a right angle and the machining point does not move when the attitude of the machining head 9 is changed for laser machining on the outer surface of the workpiece 8, for example, a laser machining condition can still be set for controlling laser beam output in such a manner as to prevent excessive increase in the temperature at the machining point or in the vicinity of the machining point.

By the implementation of machining under the laser machining condition derived from the non-stationary thermal fluid simulation under which a temperature at the machining point is assumed to be at the predetermined temperature, even the workpiece 8 changing in thickness, etc. can be controlled in such a manner as to achieve a constant temperature at the machining point or in the vicinity of the machining point. If the workpiece 8 is changed from the workpiece 8 shown in FIG. 2 to workpieces 8 shown in FIGS. 7 and 8 having changing thicknesses, for example, a result of the move state simulation shown in FIG. 3 is not changed. Meanwhile, temporal changes in laser beam output derived as results of the non-stationary thermal fluid simulation change from the one shown in FIG. 4 to those shown in FIGS. 9 and 10 respectively.

Figure 7:
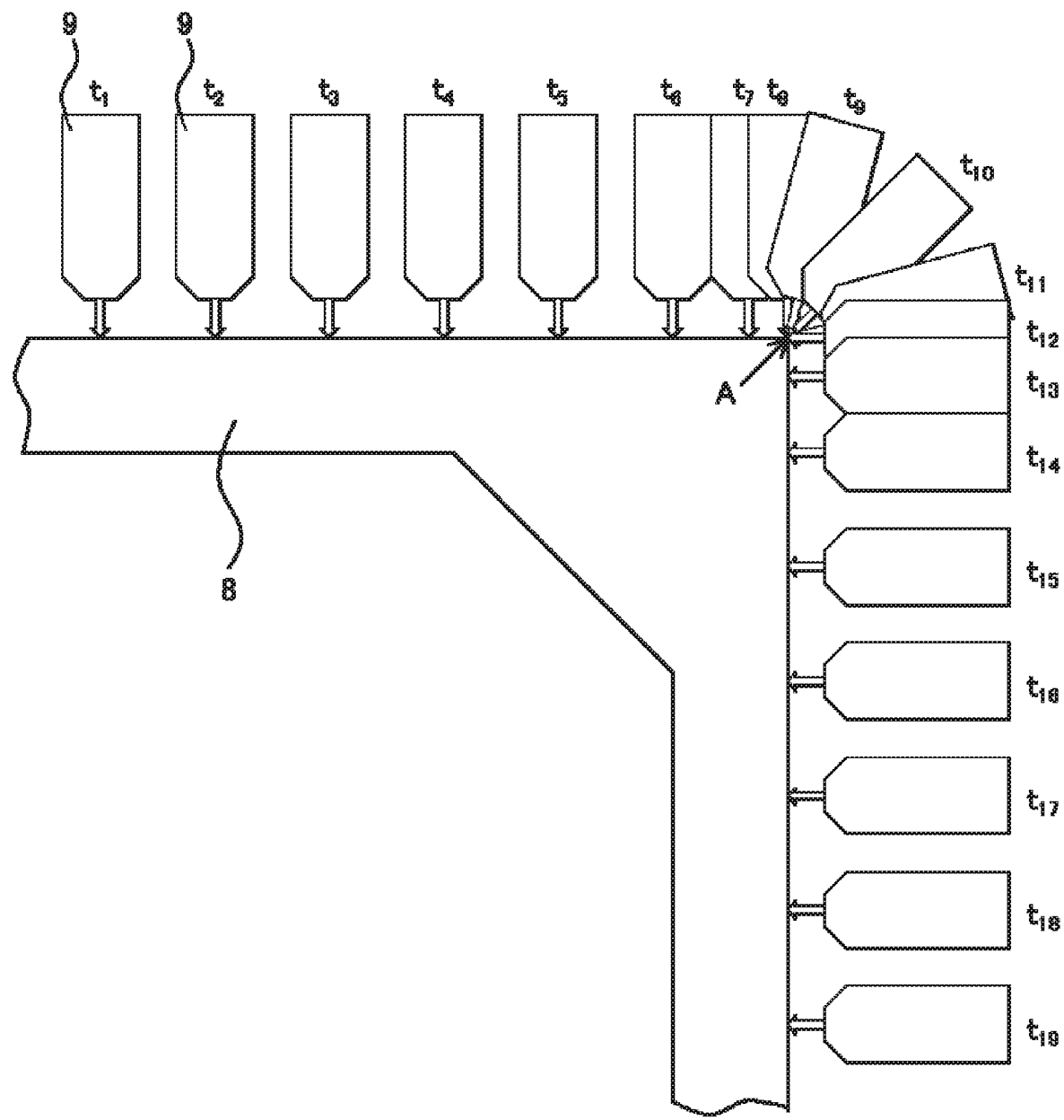
FIG. 7 shows simulated motion of the machining head illustrated as another example of a move state simulation result in the 3D laser machining system according to the first embodiment of the present invention.
Figure 10:
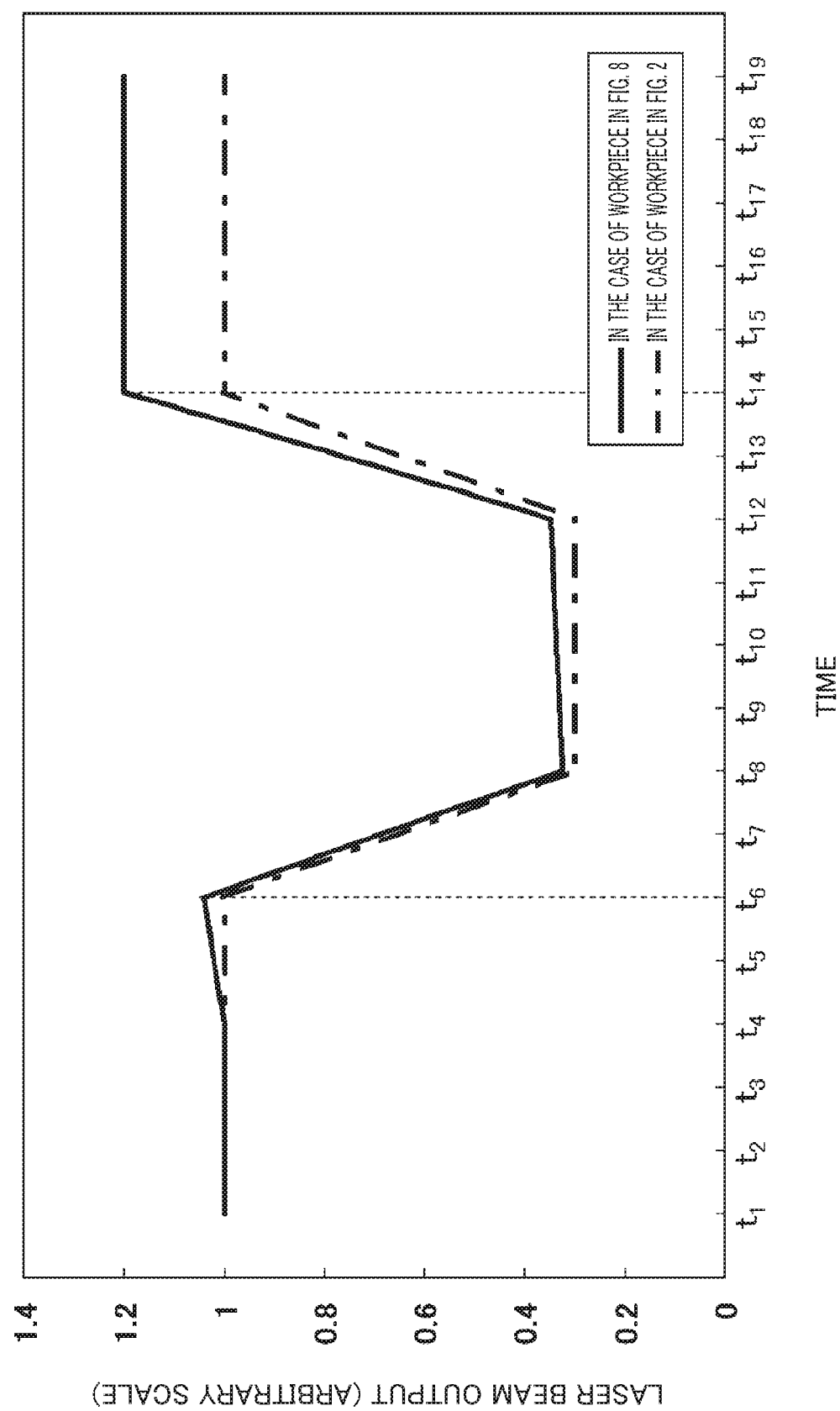
FIG. 10 is a graph showing temporal change in laser beam output illustrated as still another example of a non-stationary thermal fluid simulation result in the 3D laser machining system according to the first embodiment of the present invention.

More specifically, in the case of the workpiece 8 shown in FIG. 7, as the machining point approaches the point A, heat of a greater quantity is dissipated from the machining point by the heat conduction of the workpiece 8 than the quantity of heat dissipation in the case of the workpiece 8 shown in FIG. 2. Thus, a laser machining condition is set to increase laser beam output in order to maintain a temperature at the machining point at a predetermined temperature. The case of the workpiece 8 shown in FIG. 8 will be described in comparison to the workpiece 8 shown in FIG. 2. As shown in FIG. 10, heat of a greater quantity starts to be dissipated by the heat conduction of a thick part of the workpiece 8 from when the machining point approaches the point A. After the machining point has moved to a position corresponding to the thick part of the workpiece 8, a state of the increased quantity of heat dissipation continues. In this case, a laser machining condition is set in such a manner that laser beam output starts to be increased from a time point around $t_4$ and a state of the increased laser beam output continues after this time point for maintaining a temperature at the machining point at the predetermined temperature.

As described above, by performing the none-stationary thermal fluid simulation using the thermal fluid simulation unit 17 according to a result of the move state situation by the move state simulation unit 16, even if the machining point does not move when the attitude of the machining head 9 is changed during laser machining on the outer surface of the workpiece 8 having a surface bent at a right angle, for example, a laser machining condition can still be set for controlling laser beam output in such a manner as to prevent excessive increase in a temperature at the machining point. Additionally, even for the workpiece 8 changing in thickness, for example, laser beam output can still be controlled to achieve a stable temperature at the machining point.

Laser beam output may be changed by changing a duty of pulse output and changing average laser beam output instead of changing a peak value of laser beam output. Alternatively, both a peak value of laser beam output and a duty of pulse output may certainly be changed. If increasing laser beam output is prohibited by the performance of the laser device 2, etc., the move speed of the machining point may be reduced instead of increasing laser beam output. Meanwhile, if a sequence of a plurality of time-series laser machining conditions are settable, a laser machining condition resulting in a minimum machining duration is desirably selected and set.

Figure 8:
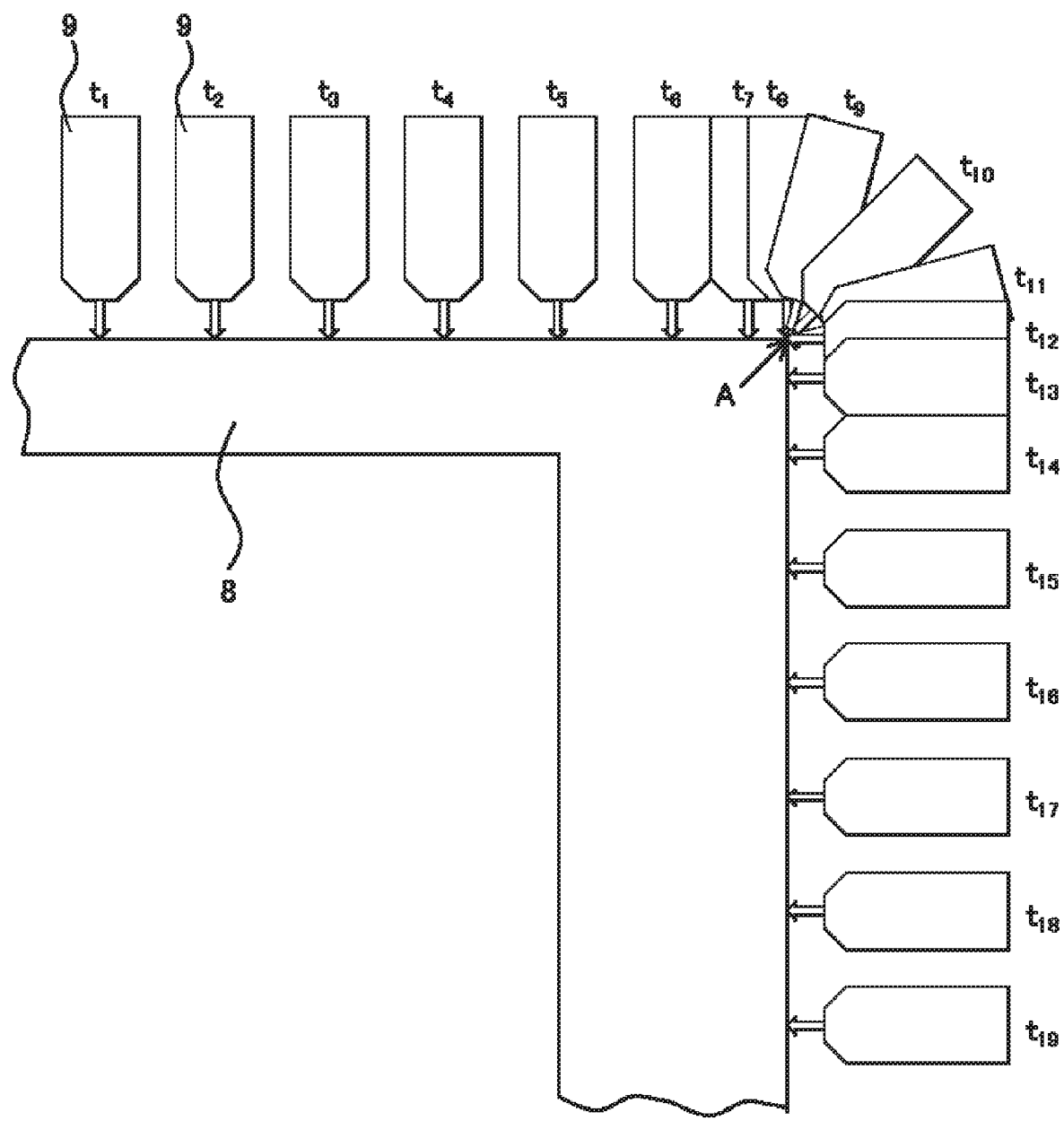
FIG. 8 shows simulated motion of the machining head illustrated as still another example of a move state simulation result in the 3D laser machining system according to the first embodiment of the present invention.
Figure 9:
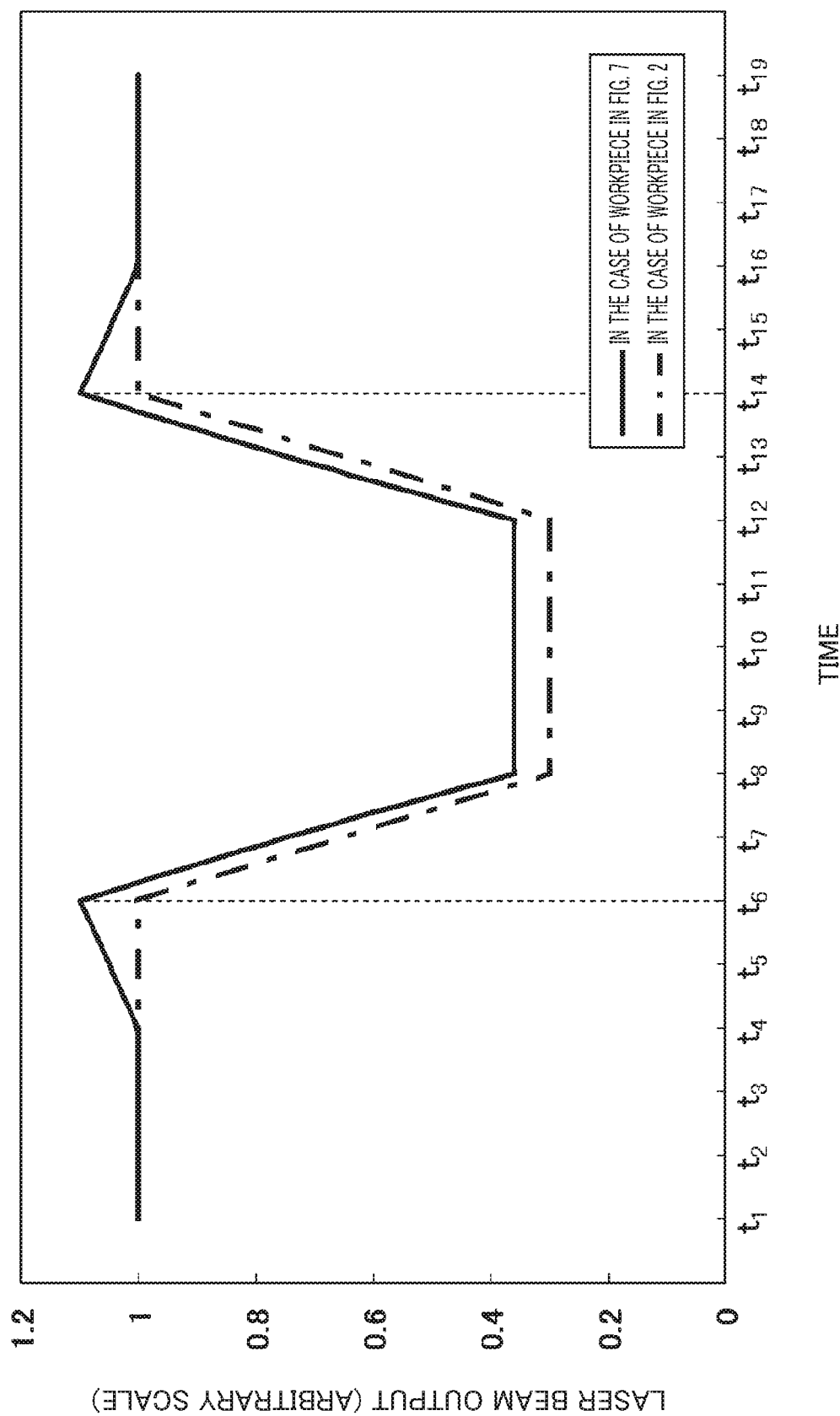
FIG. 9 is a graph showing temporal change in laser beam output illustrated as another example of a non-stationary thermal fluid simulation result in the 3D laser machining system according to the first embodiment of the present invention.

Only a part of the workpiece 8 is shown in each of FIGS. 2, 7, and 8, and a region containing at least a part of the workpiece 8 has been described as a subject of the non-stationary thermal fluid simulation. Alternatively, this region may cover the workpiece 8 entirely. In order to give consideration to thermal energy flowing from the workpiece 8 to the holding mechanism unit 15, etc., the foregoing region may cover at least a part of the holding mechanism unit 15, although this increases calculation load. In this case, 3D CAD data defining the thermophysical properties of the holding mechanism unit 15 at least within this region is desirably acquired by the data acquisition unit 21, and the acquired 3D CAD data is desirably used in the non-stationary thermal fluid simulation.

As described above, performing the non-stationary thermal fluid simulation is effective. Meanwhile, a physical property value giving consideration to temperature dependence extrapolated to a high temperature is used as a physical property value about the workpiece 8 used in the non-stationary thermal fluid simulation, and no consideration is given to a phase transition of the workpiece 8. This inevitably causes a certain degree of deviation between a temperature at the machining point or in the vicinity of the machining point calculated from the non-stationary thermal fluid simulation and a temperature at the machining point or in the vicinity of the machining point during implementation of actual laser machining. In this regard, to approximate the temperature at the machining point or in the vicinity of the machining point during implementation of actual laser machining to an intended temperature, the thermal fluid simulation unit 17 may make reference to correlation data such as that shown in FIG. 11 to determine a predetermined replacement temperature intended in the non-stationary thermal fluid simulation as a replacement for an intended predetermined temperature during implementation of actual laser machining. Then, the non-stationary thermal fluid simulation may be performed. The correlation data shown in FIG. 11 is a collection of data about each material of the workpiece 8 indicating correlation between a temperature at the machining point or in the vicinity of the machining point contained in a simulation result obtained under a laser machining condition set by the machining condition setting unit 18 and a temperature at a corresponding position measured during implementation of actual laser machining under the laser machining condition. This correlation data is stored in advance in the thermal fluid simulation unit 17.

While not shown, a temperature sensor used for measuring a temperature at the machining point or in the vicinity of the machining point during laser machining for collecting the correlation data may be the foregoing temperature detection means such as a thermography attached to the machining head 9. Alternatively, the temperature sensor may be temperature detection means such as a fixed thermography or may be a temperature sensor such a thermistor thermally contacting the workpiece 8.

A result of the foregoing non-stationary thermal fluid simulation or a result of setting by the machining condition setting unit 18 may be displayed as 3D images or video on the display unit 23 to allow check of the simulation result or the set laser machining condition. In this case, a temperature distribution of the workpiece 8 and the machining line may be displayed together with color bars and recognized by the color differences.

Figure 12A:
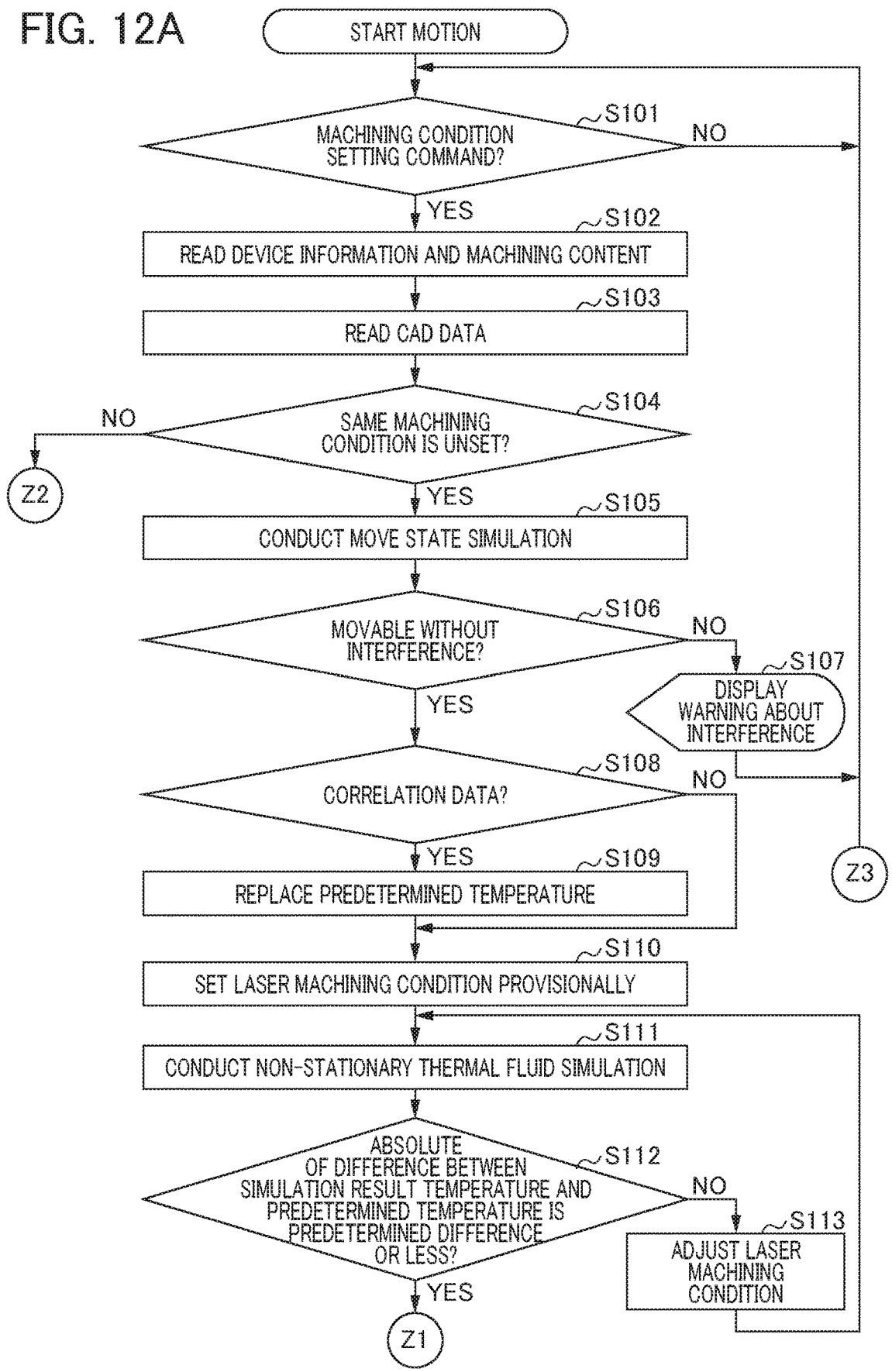
FIG. 12A is a first flowchart showing an example of the motion of the 3D laser machining system according to the first embodiment of the present invention.
Figure 12B:
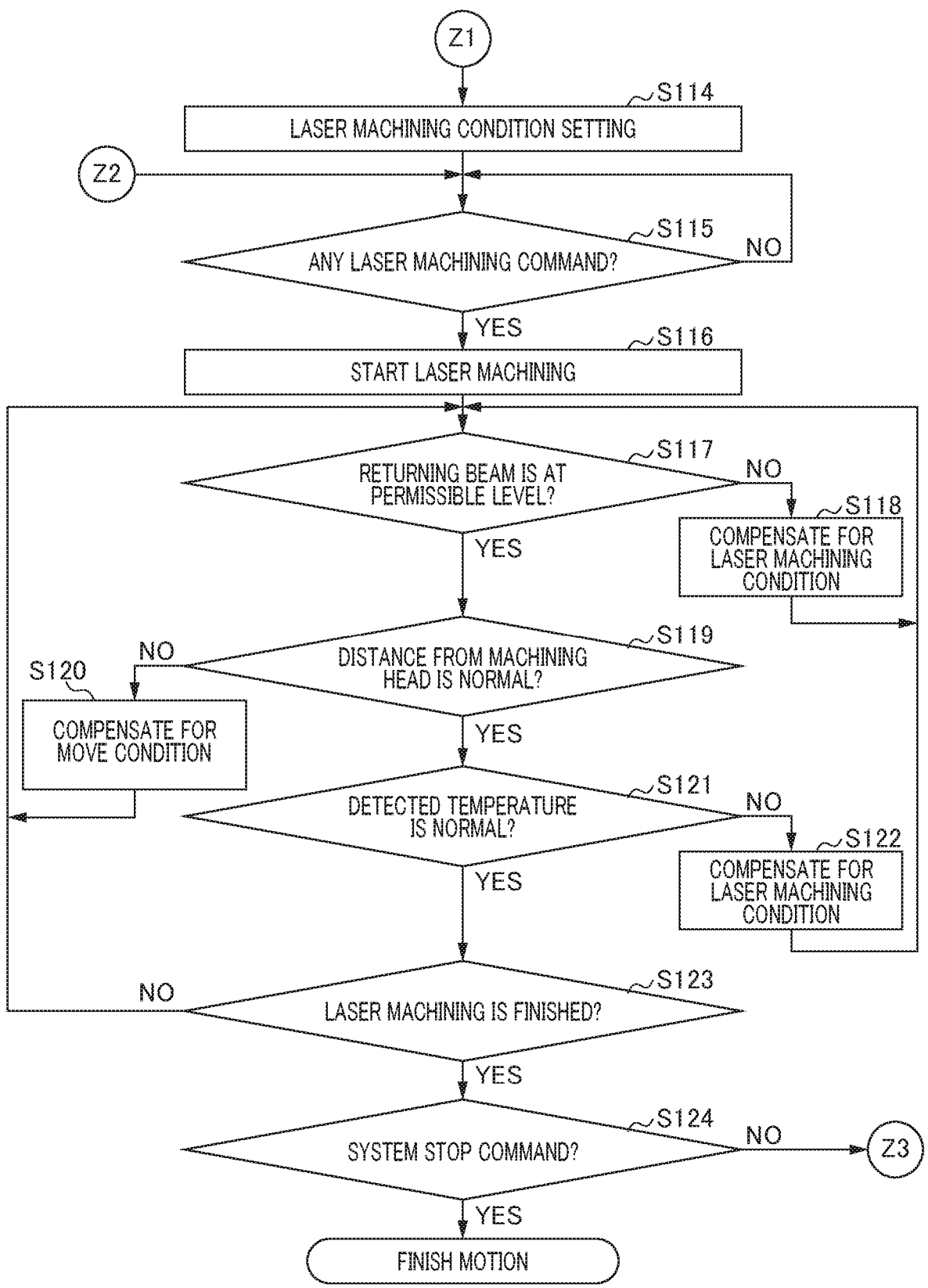
FIG. 12B is a second flowchart showing the example of the motion of the 3D laser machining system according to the first embodiment of the present invention.

An example of a specific motion of the 3D laser machining system 1 according to the first embodiment will be described next using FIGS. 12A and 12B. FIGS. 12A and 12B are flowcharts showing an example of the motion of the 3D laser machining system 1 according to the first embodiment of the present invention. First, when the 3D laser machining system 1 shown in FIG. 1 is started to start the motion of the 3D laser machining system 1, the 3D laser machining system 1 determines whether a laser machining condition setting command is present at the command input unit 20 of the machining condition setting device 4 (step S101).

If there is a laser machining condition setting command, device information such as the performance, specifications, etc. of the laser device 2 as a target of setting of a laser machining condition and the driver 3 is read to the machining condition setting control unit 19 mainly from the control unit 12 of the laser device 2. Further, a laser machining content commanded from the command input unit 20 is read (step S102). Next, in response to a command from the machining condition setting control unit 19, the 3D CAD data about the workpiece 8 defining the thermophysical properties of a material and the 3D CAD data about the machining head 9 are read from the data acquisition unit 21 into the CAD data storage unit 22 (step S103).

On the basis of the read device information, the laser machining content, and the 3D CAD data stored in the CAD data storage unit 22, the machining condition setting control unit 19 determines whether there is a laser machining condition already set and stored previously containing exactly the same conditions for a device, a workpiece, and a laser machining content (step S104). If such a laser machining condition has not been set, in response to a command from the machining condition setting control unit 19, the move state simulation unit 16 first conducts simulation of the move state of the machining head 9 relative to the workpiece 8 using the device information read by the machining condition setting control unit 19, the laser machining content, and the 3D CAD data stored in the CAD data storage unit 22 to obtain a relative move condition for the machining head 9 under which laser machining can be finished within a minimum period of time (step S105).

Next, the machining condition setting control unit 19 determines as a result of the move state simulation whether the machining head 9 can move without interfering with the workpiece 8 (step S106). If the interference is to occur, the machining condition setting control unit 19 displays a warning on the display unit 23 indicating that the possible interference by the machining head 9 with the workpiece 8 will disable implementation of commanded laser machining (step S107). Then, the flow returns to step S101 to be placed on standby until a new laser machining condition setting command is input.

If the machining head 9 is determined to be capable of moving without interfering with the workpiece 8 in step S106, the machining condition setting control unit 19 determines whether the thermal fluid simulation unit 17 stores correlation data about a corresponding material of the workpiece 8 indicating correlation between a temperature at the machining point or in the vicinity of the machining point measured during implementation of actual laser machining under a certain laser machining condition and a temperature at a corresponding position obtained as a result of the non-stationary thermal fluid simulation conducted under the same laser machining condition (step S108).

If the correlation data is determined to be stored in step S108, the thermal fluid simulation unit 17 refers to this correlation data to replace a predetermined temperature intended in implementation of actual laser machining with a predetermined temperature intended in the non-stationary thermal fluid simulation (predetermined replacement temperature) (step S109). Then, the thermal fluid simulation unit 17 provisionally sets a laser machining condition by giving consideration to the relative move condition obtained by the move state simulation unit 16 (step S110), and conducts the non-stationary thermal fluid simulation (step S111). Meanwhile, if it is determined in step S108 that there is no stored correlation data, the flow directly goes to step S110.

As a result of the non-stationary thermal fluid simulation in step S111, the machining condition setting control unit 19 determines whether a difference between a temperature in the simulation result and the predetermined temperature is a predetermined difference or less through an entire machining zone (step S112). If this difference is determined not to fall below the predetermined difference, the machining condition setting control unit 19 adjusts the laser machining condition by increasing laser beam output or reducing the relative move speed of the machining head 9 relative to the workpiece 8 for a machining zone in which a temperature in the simulation result is lower than the predetermined temperature, for example (step S113). Then, the flow returns to step S111.

If the difference between the temperature in the simulation result and the predetermined temperature is determined to be the predetermined difference or less through the entire machining zone in step S112, the machining condition setting unit 18 sets a laser machining condition in advance containing a move condition for the machining head 9 on the basis of the simulation results obtained by the move state simulation unit 16 and the thermal fluid simulation unit 17 (step S114). The control unit 12 determines whether there is a command to start laser machining (step S115). If it is determined in step S104 performed previously that there is a laser machining condition already set and stored previously containing exactly the same conditions for a device, a workpiece, and a laser machining content, the flow directly goes to step S115.

If it is determined in step S115 that there is a command to start laser machining, the control unit 12 reads the machining condition set in advance from the machining condition setting unit 18, and output a command to each unit in the laser device 2 or each unit in the driver 3 on the basis of the read laser machining condition. In response to this, the laser device 2 starts laser machining (step S116). When laser machining is started, the control unit 12 checks to determine whether the quantity of a returning beam is required to be reduced on the basis of a result of detection of the returning beam obtained by the photodetection means 11 (step S117).

If it is determined in step S117 that the quantity of the returning beam exceeds a permissible level, the control unit 12 reduces laser beam output and further reduces the relative move speed of the machining head 9 relative to the workpiece 8 for reducing the quantity of the returning beam to maintain a temperature at the machining point or in the vicinity of the machining point as close as possible to the predetermined temperature, for example. In this way, the control unit 12 compensates for the laser machining condition (step S118). Then, the flow returns to step S117.

Meanwhile, if it is determined in step S117 that the quantity of the returning beam does not exceed the permissible level, the control unit 12 determines whether a distance from the end surface of the machining head 9 on the laser beam output side and the machining point measured by the ranging means is normal in terms of the laser machining condition set in advance (step S119). If the distance is determined not to be normal in step S119, the control unit 12 compensates for the relative move condition for the machining head 9 on the basis of the measurement result obtained by the ranging means so as to achieve a predetermined distance (step S120). Then, the flow returns to step S117. If the distance is determined to be normal in step S119, the control unit 12 determines whether a temperature at the machining point or a surface temperature in the vicinity of the machining point detected by the temperature detection means does not deviate from a temperature predicted at a corresponding position contained in the simulation result obtained under the laser machining condition set in advance, namely from the predetermined temperature and thus the detected temperature is normal (step S121).

If the detected temperature is determined not to be normal in step S121, and if the detected temperature is lower than the predetermined temperature, for example, the control unit 12 increases laser beam output or reduces the relative move speed of the machining head 9 relative to the workpiece 8, for example. In this way, the control unit 12 compensates for at least a part of the laser machining condition set in advance (step S122). Then, the flow returns to step S117.

If the detected temperature is determined to be normal in step S121, the control unit 12 determines whether the commanded laser machining is finished (step S123). If the laser machining is determined not to be finished, the control unit 12 returns to step S117 and continues the laser machining. Meanwhile, if the laser machining is determined to be finished, the control unit 12 determines whether a command to stop motion of the 3D laser machining system 1 has been issued (step S124). If the stop command has not been issued, the control unit 12 returns to step S101 and waits for input of a laser machining condition setting command. If the stop command has been issued, the control unit 12 finishes the motion of the 3D laser machining system 1.

As described above, in response to the motion of the 3D laser machining system 1 of the first embodiment according to the steps S101 to S124, a laser machining condition expected to achieve a favorable machining result can be set without human intervention and the 3D laser machining system 1 can be realized even for the workpiece 8 having a complicated 3D structure.

Second Embodiment

Figure 13:
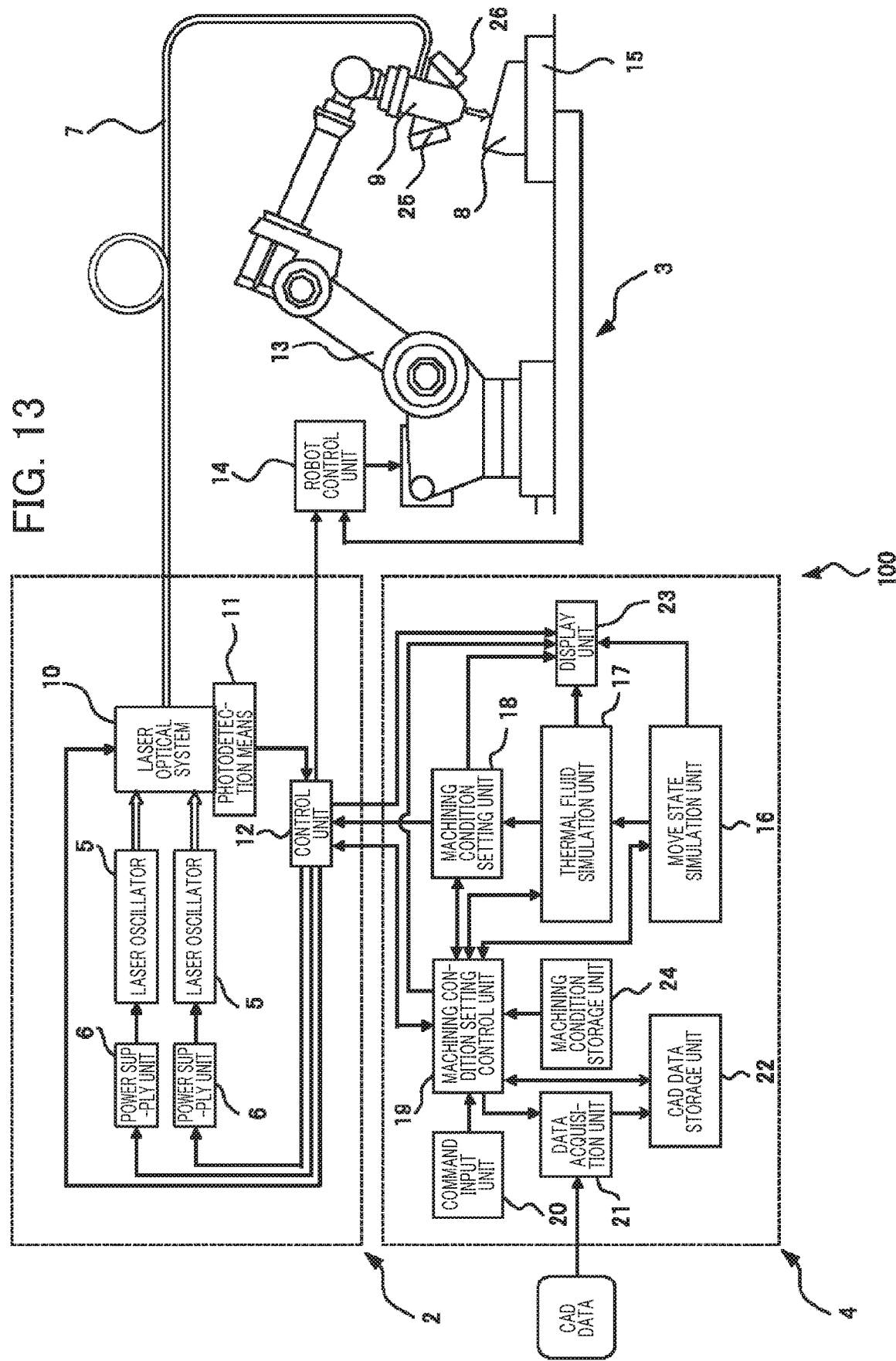
FIG. 13 is a block diagram showing a conceptual configuration of a 3D laser machining system according to a second embodiment of the present invention.

FIG. 13 is a block diagram showing a conceptual configuration of a 3D laser machining system according to a second embodiment of the present invention. A 3D laser machining system 100 of the second embodiment shown in FIG. 13 differs from the 3D laser machining system 1 of the first embodiment shown in FIG. 1 in that the 3D laser machining system 100 additionally includes a machining condition storage unit 24, and that ranging means 25 and temperature detection means 26 not shown in FIG. 1 are shown to be attached to the machining head 9.

The machining condition storage unit 24 stores an optimum acquired laser machining condition substantially optimum for a workpiece condition prepared for each type of laser machining and containing at least a material and a thickness about a plate-like workpiece. The optimum acquired laser machining condition contains laser machining conditions including at least laser beam output, relative move speed of a machining point relative to the plate-like workpiece, and a distance between an end surface of the machining head 9 on a laser beam output side and a machining point.

As described above, the ranging means 25 comprise, for example, a laser range sensor capable of measuring a distance between the end surface of the machining head 9 on the laser beam output side and the machining point without contacting the workpiece 8, for example. As described above, the temperature detection means 26 comprise, for example, a thermography capable of detecting at least one of a temperature at the machining point moving along a machining line during laser machining and a surface temperature of the workpiece 8 in the vicinity of the machining point without contacting the workpiece 8, for example.

Numerous parameters are concerned with laser machining. These parameters include: parameters for a laser oscillation condition such as wavelength, output, a mode, beam quality, an output waveform, a frequency, and a duty for pulse oscillation; parameters for an irradiation condition such as an F value of a focusing optical system, positions of a laser beam focal point and a machining surface relative to each other, an angle of irradiation of the machining surface with a laser beam, power density, a power density distribution, a condition for blowing assist gas or shielding gas; parameters for a machining condition such as machining speed, machining atmosphere, and a workpiece material; and parameters for a type, method, etc. of laser machining such as a workpiece, cutting, welding, quenching, cladding, brazing, piercing, and marking. Thus, using only the correlation data, etc. for setting a laser machining condition like in the 3D laser machining system 1 of the first embodiment may make it difficult to optimize all parameters.

In this regard, in the second embodiment, the machining condition storage unit 24 stores a laser machining condition under which substantially all parameters are optimized for different thicknesses of plate-like workpieces for each type of laser machining and for respective materials of the plate-like workpieces. Regarding at least a partial particular zone of a zone in which a machining line set at the workpiece 8 has a linear shape and the workpiece 8 has a constant thickness along the machining line, the machining condition setting unit 18 sets, from among the optimum laser machining conditions stored in the machining condition storage unit 24, an optimum laser machining condition with conforming type of laser machining and a workpiece condition. This allows the machining condition setting unit 18 to set an already known optimum laser machining condition for at least a corresponding particular zone.

In the absence of an optimum laser machining condition with completely conforming conditions, such as in cases where the thickness of the workpiece 8 differs from the laser machining conditions stored in the machining condition storage unit 24, an approximately optimum laser machining condition may be determined by an interpolation method or an extrapolation method from two closest optimum laser machining conditions belonging to stored optimum laser machining conditions, and laser machining may be performed on the particular zone using the approximately optimum laser machining condition.

Regarding a zone of the machining line other than the particular zone, the non-stationary thermal fluid simulation is repeated using a predetermined temperature which is a temperature at the machining point or in the vicinity of the machining point obtained as a result of implementation of the non-stationary thermal fluid simulation under the condition where laser machining was implemented under the optimum laser machining condition or the approximately optimum laser machining condition set for the particular zone. By doing so, a laser machining condition to provide a simulation result that the temperature at the machining point or in the vicinity of the machining point is at the predetermined temperature is determined, and by setting the determined laser machining condition, a favorable laser machining result is expected even in the zones other than the particular zone. If there is a plurality of particular zones of different optimum machining conditions, a laser machining condition for a zone between two particular zones may be set to change continuously along with move of the machining point from an optimum laser machining condition for one of the particular zones to an optimum laser machining condition for the other particular zone.

In the second embodiment, the temperature detection means 26 is also provided that is capable of detecting at least one of a temperature at the machining point moving along a machining line during laser machining and a surface temperature of the workpiece 8 in the vicinity of the machining point without contacting the workpiece 8, for example. If a temperature difference equal to or exceeding a predetermined difference occurs between a detected temperature detected by the temperature detection means 26 at a certain time point in laser machining on the workpiece 8 performed under a laser machining condition set by the machining condition setting device 4 and a predicted temperature, in the second embodiment, a predetermined temperature, predicted at a corresponding position contained in a simulation result obtained under the set laser machining condition, the laser machining may be continued under a laser machining condition prepared by compensating for at least a part of the laser machining condition set by the machining condition setting device 4 under a command from the control unit 12 in response to the temperature difference having occurred.

Figure 14A:
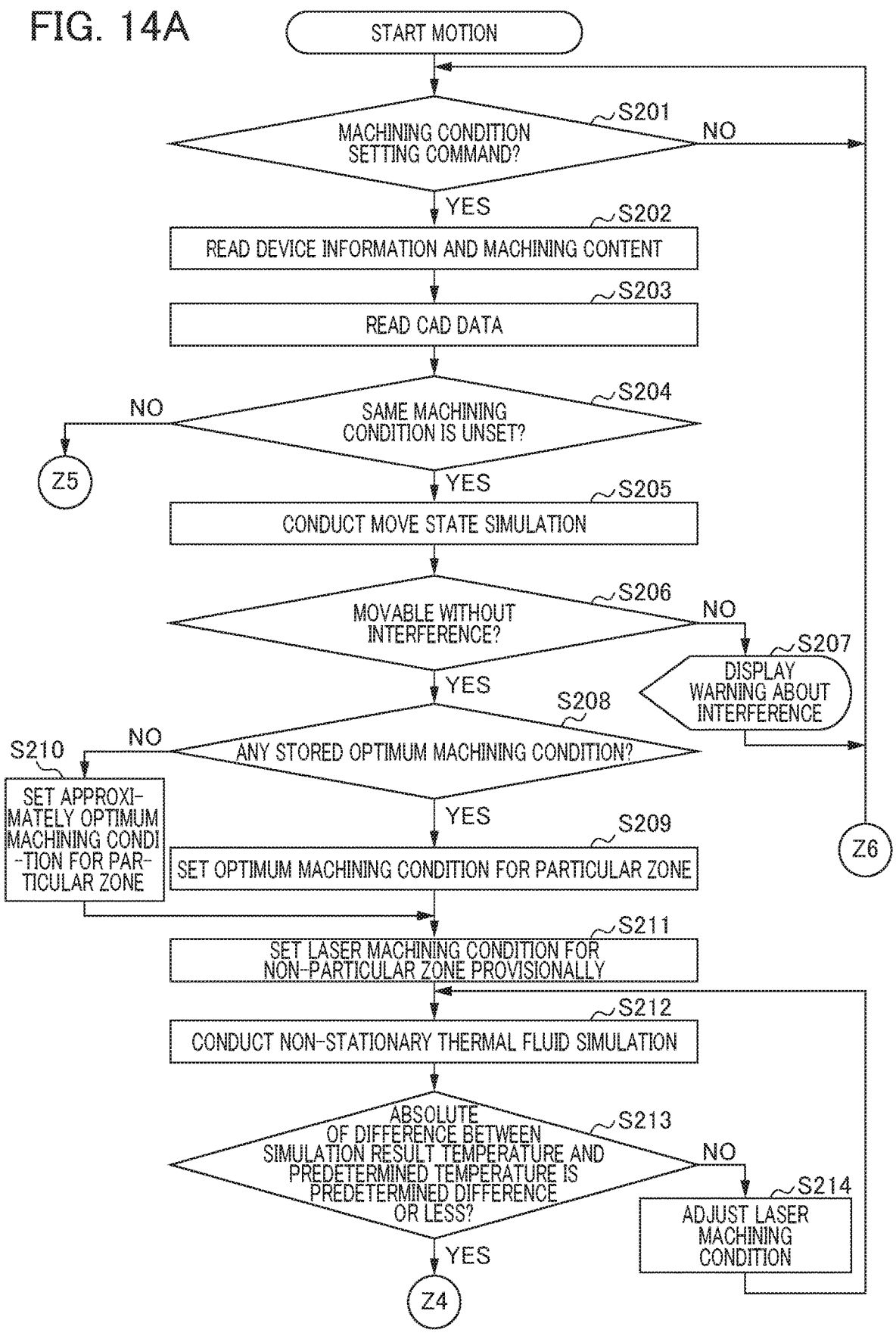
FIG. 14A is a first flowchart showing an example of the motion of the 3D laser machining system according to the second embodiment of the present invention.
Figure 14B:
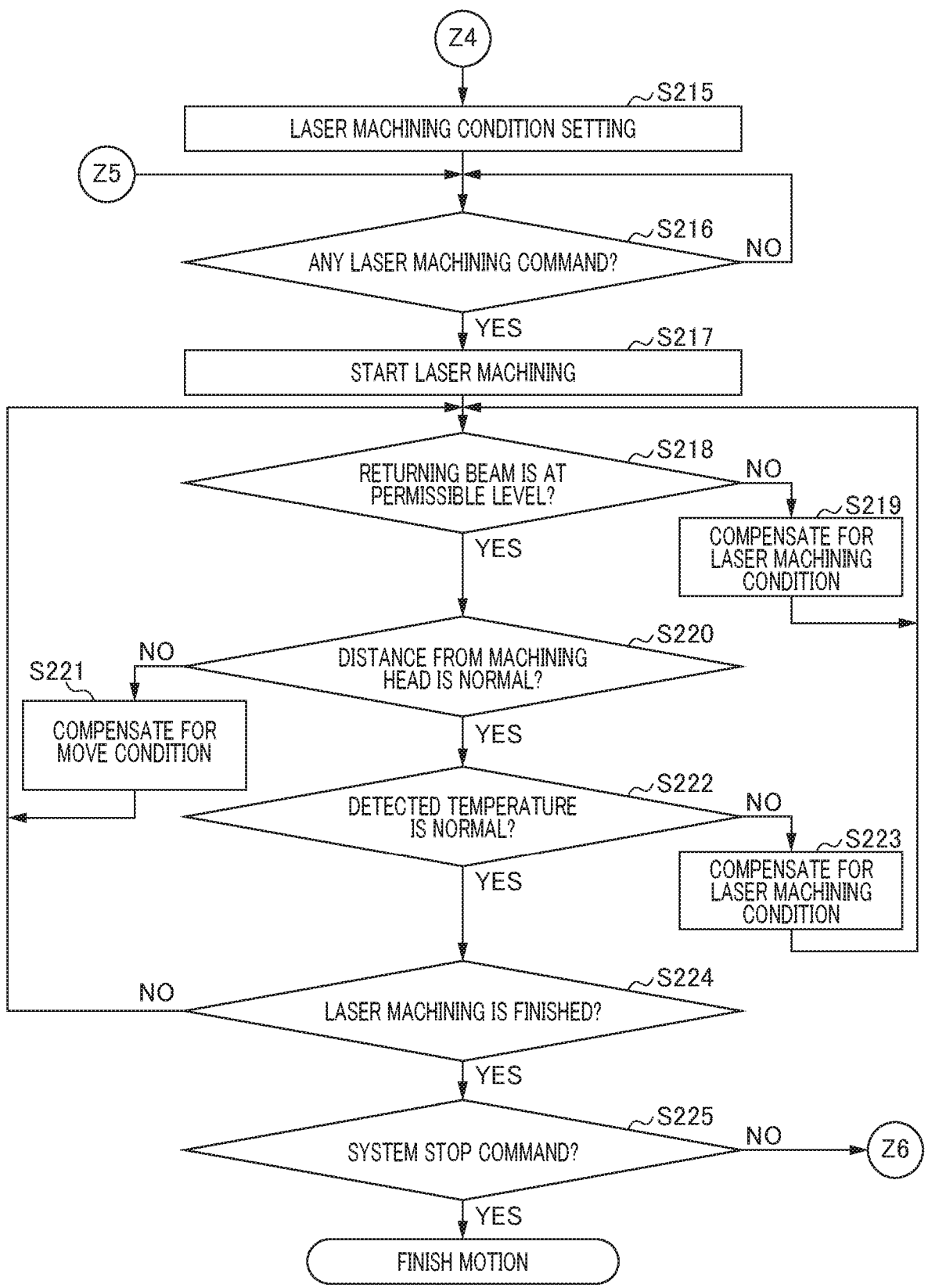
FIG. 14B is a second flowchart showing the example of the motion of the 3D laser machining system according to the second embodiment of the present invention.

An example of a specific motion of the 3D laser machining system 100 according to the second embodiment will be described next using FIGS. 14A and 14B. FIGS. 14A and 14B are flowcharts showing an example of the motion of the 3D laser machining system 100 according to the second embodiment of the present invention. The flowcharts shown in FIGS. 14A and 14B differ from the flowcharts shown in FIGS. 12A and 12B in that the steps S108 to S110 in the flowchart of FIG. 12A is replaced with steps S208 to S211 in FIG. 14A. Thus, steps S201 to S207 and steps S212 to S225 in FIGS. 14A and 14B are the same as the steps S101 to S107 and the steps S111 to S124 in FIGS. 12A and 12B.

The motions from step S108 to step S110 in the flowchart of FIG. 12A are as follows. The machining condition setting control unit 19 determines whether the thermal fluid simulation unit 17 stores correlation data (step S108). If the correlation data is stored, the machining condition setting control unit 19 refers to the correlation data to replace a predetermined temperature intended in implementation of actual laser machining with a predetermined temperature intended in the non-stationary thermal fluid simulation (predetermined replacement temperature) (step S109). Then, a laser machining condition is provisionally set by giving consideration to the relative move condition obtained by the move state simulation unit 16 (step S110). If it is determined in step S108 that there is no stored correlation data, the flow directly goes to step S110.

By contrast, motions from step S208 to step S211 in the flowchart of FIG. 14A are as follows. First, the machining condition setting control unit 19 determines whether the machining condition storage unit 24 contains an optimum laser machining condition defining conforming conditions in terms of both a type of laser machining and a workpiece condition (step S208). If the optimum laser machining condition defining these conforming conditions is determined to be stored, the machining condition setting control unit 19 sets the optimum laser machining condition defining the conforming type of laser machining and the conforming workpiece condition for a particular zone (step S209), and provisionally sets a laser machining condition for a non-particular zone for which a laser machining condition has not been set (step S211). Meanwhile, if the optimum laser machining condition defining the foregoing conforming conditions is determined not to be stored in step S208, the machining condition setting control unit 19 sets an approximately optimum laser machining condition for the particular zone (step S210). As described above, this approximately optimum laser machining condition is determined by an interpolation method or an extrapolation method from two closest optimum laser machining conditions belonging to stored optimum laser machining conditions. Then, the flow goes to step S211.

In response to the motion of the 3D laser machining system 100 of the second embodiment according to the steps S201 to S225, the following effect is achieved in addition to the effect achieved by the 3D laser machining system 1 of the first embodiment. Regarding a condition conforming to a condition in an optimum laser machining condition stored in the machining condition storage unit 24, a favorable machining result can be achieved more reliably. For a neighboring zone under a close workpiece condition, a laser machining condition highly likely to achieve a favorable machining result can be set easily.

Third Embodiment

Figure 15:
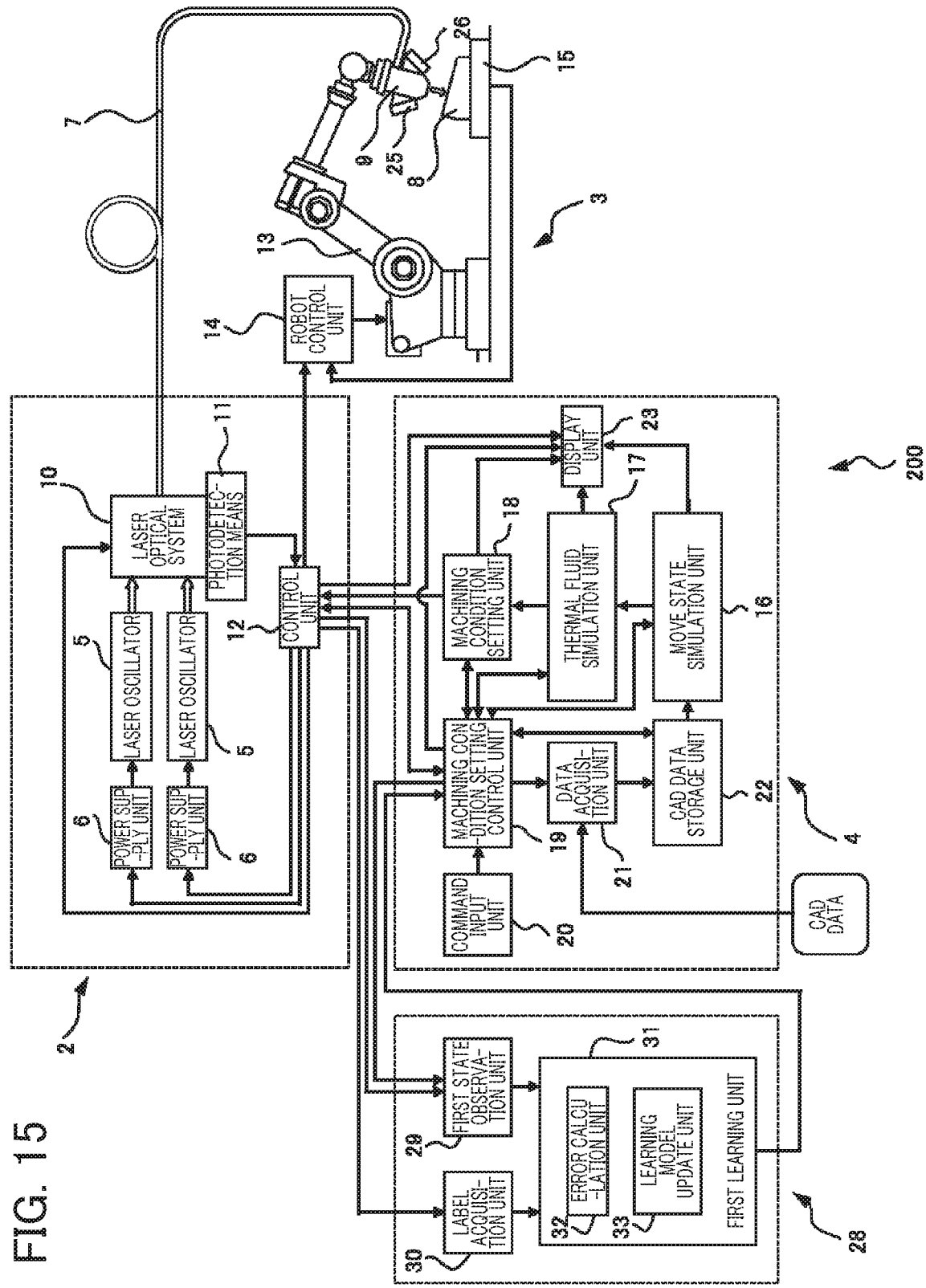
FIG. 15 is a block diagram showing a conceptual configuration of a 3D laser machining system according to a third embodiment of the present invention.
Figure 16A:
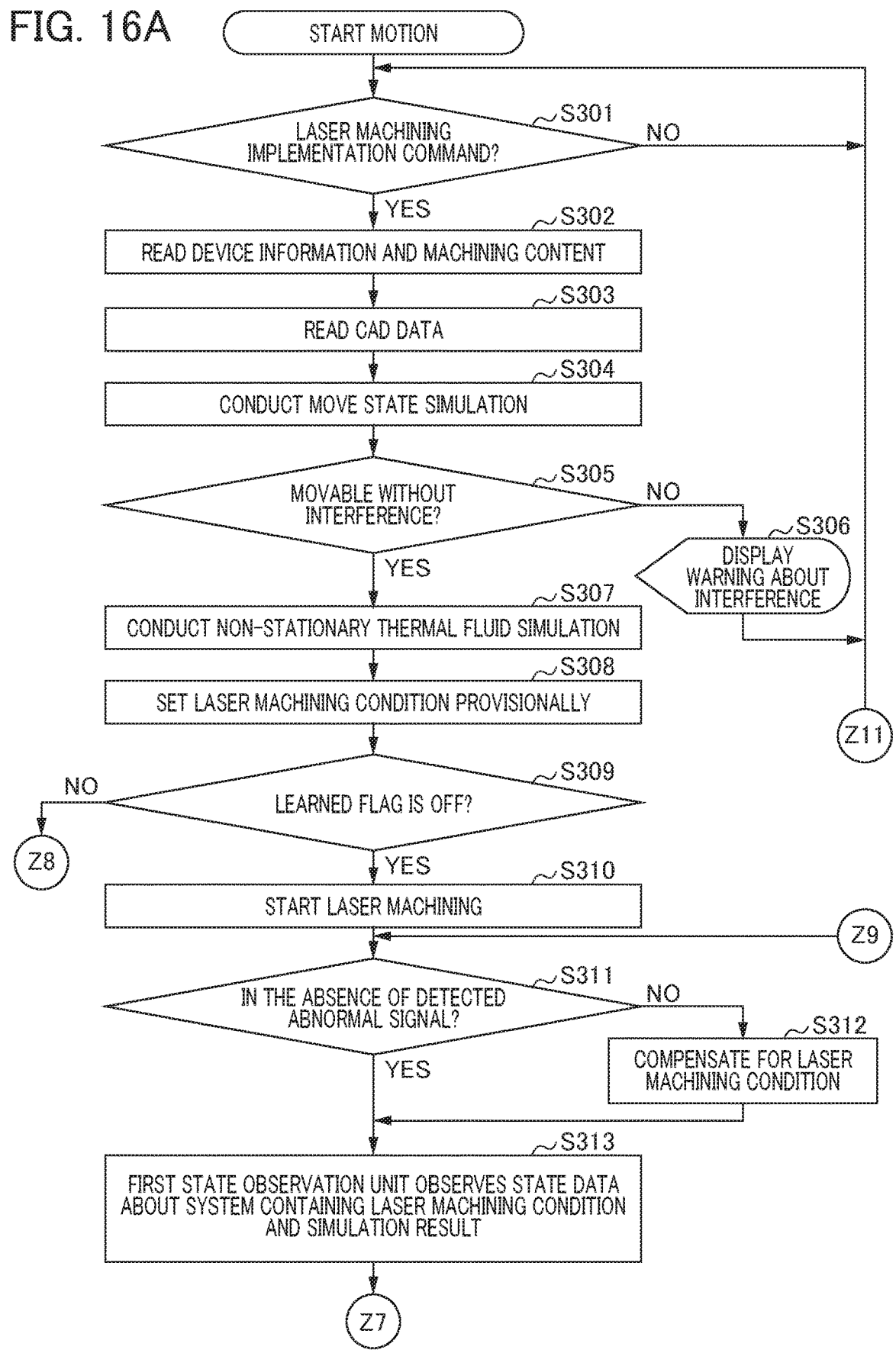
FIG. 16A is a first flowchart showing an example of the motion of the 3D laser machining system according to the third embodiment of the present invention.
Figure 16B:
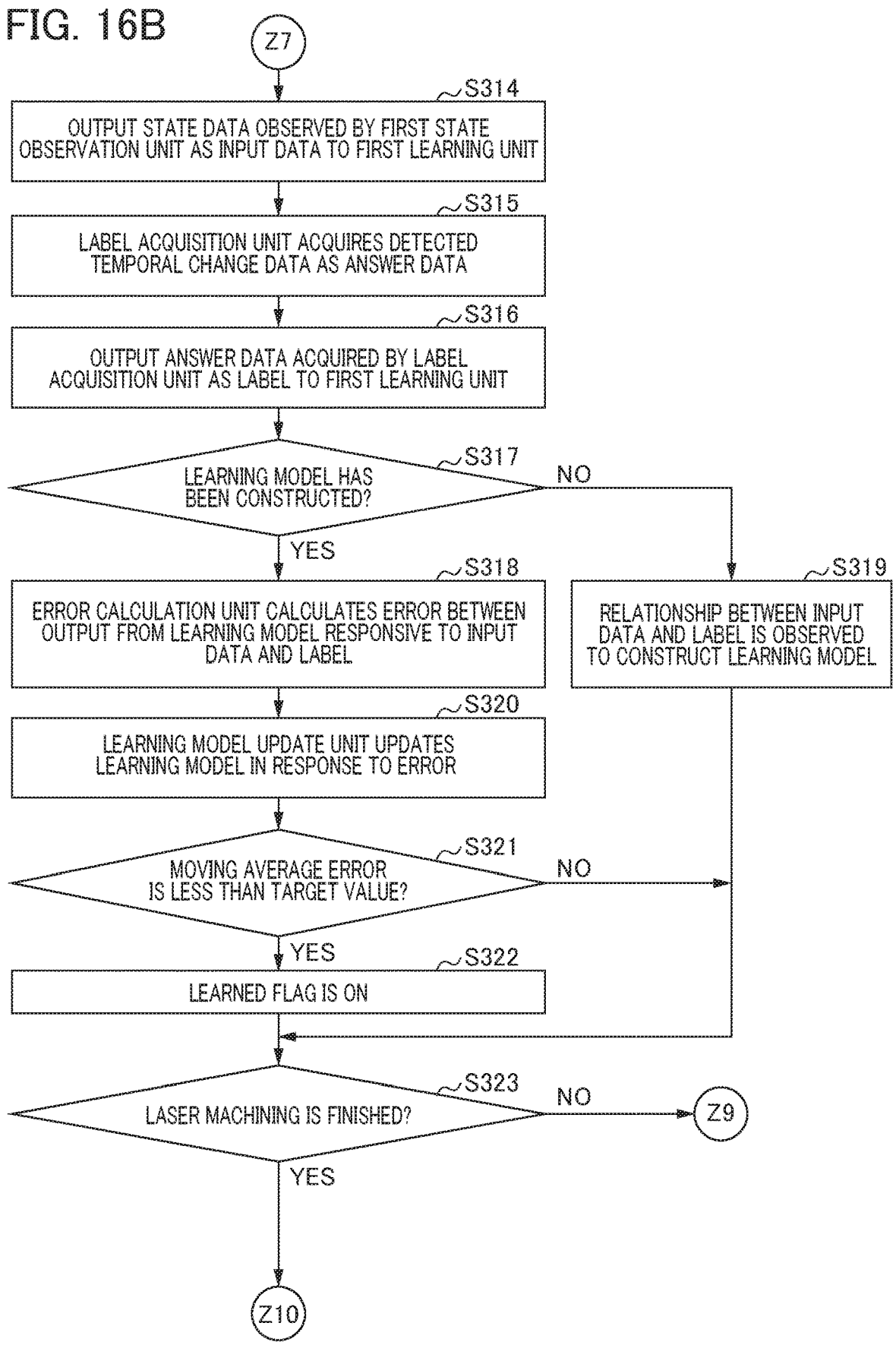
FIG. 16B is a second flowchart showing the example of the motion of the 3D laser machining system according to the third embodiment of the present invention.
Figure 16C:
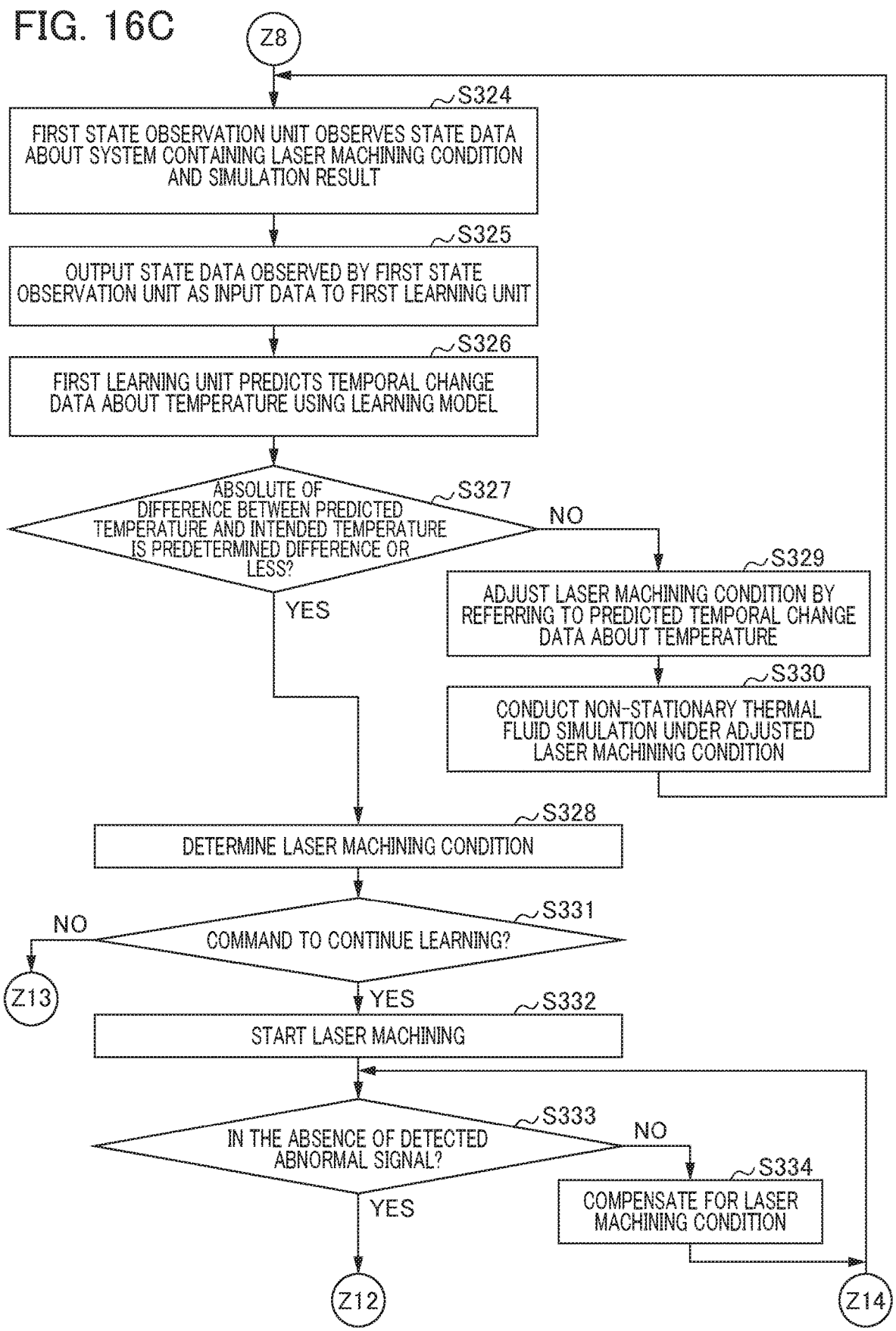
FIG. 16C is a third flowchart showing the example of the motion of the 3D laser machining system according to the third embodiment of the present invention.
Figure 16D:
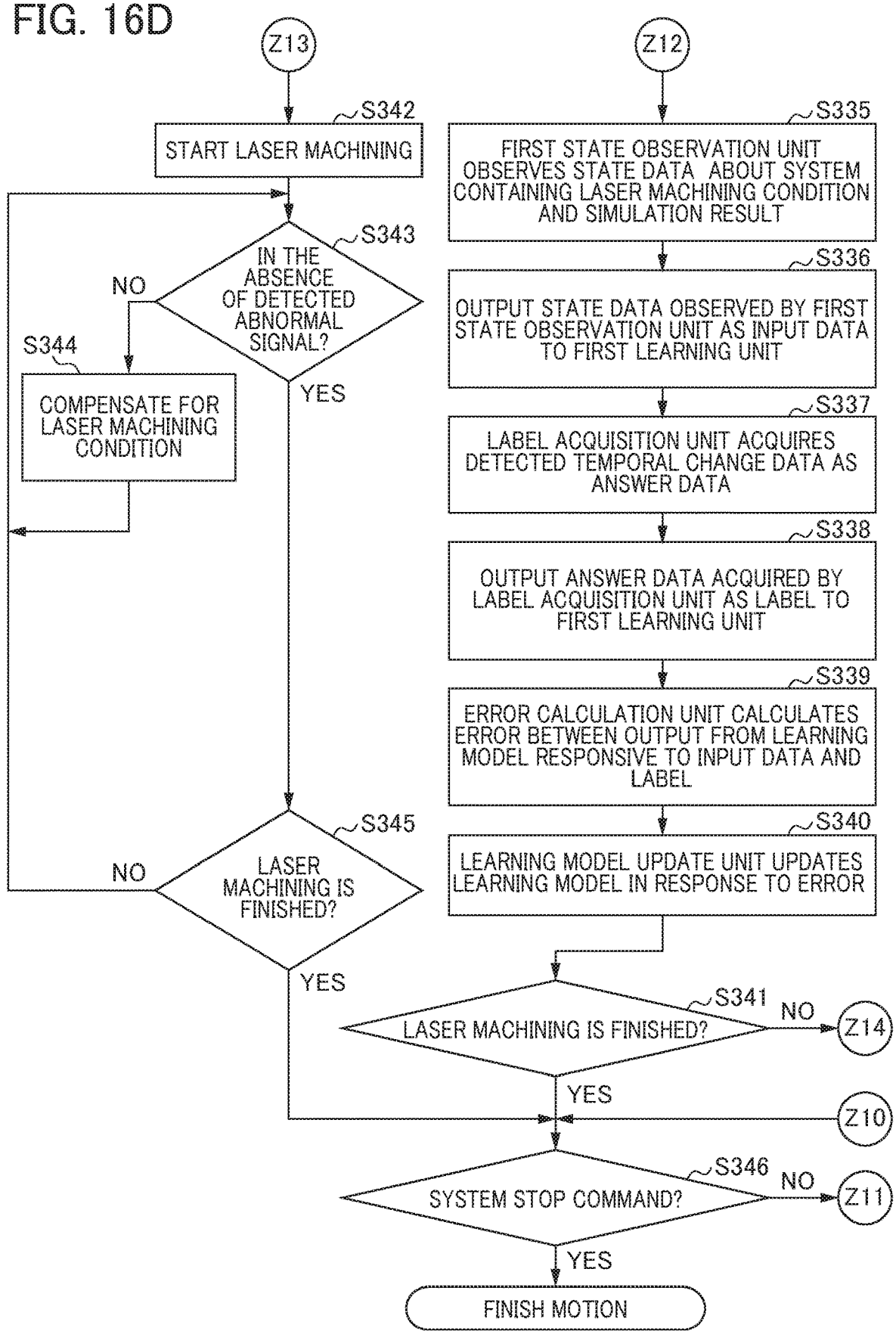
FIG. 16D is a fourth flowchart showing the example of the motion of the 3D laser machining system according to the third embodiment of the present invention.

FIG. 15 is a block diagram showing a conceptual configuration of a 3D laser machining system according to a third embodiment of the present invention. In comparison to the 3D laser machining system 1 of the first embodiment shown in FIG. 1, a 3D laser machining system 200 of the third embodiment further includes ranging means 25, temperature detection means 26, and a first machine learning device 28.

As described above, the ranging means 25 comprise, for example, a laser range sensor capable of measuring a distance between the end surface of the machining head 9 on the laser beam output side and the machining point without contacting the workpiece 8, for example. As described above, the temperature detection means 26 comprise, for example, a thermography capable of detecting at least one of a temperature at the machining point moving along a machining line during laser machining and a surface temperature of the workpiece 8 in the vicinity of the machining point without contacting the workpiece 8, for example.

The first machine learning device 28 includes at least a first state observation unit 29, a label acquisition unit 30, and a first learning unit 31. The first state observation unit 29 receives state data about the 3D laser machining system 200 as input data containing a laser machining condition set by the machining condition setting unit 18 and a simulation result obtained under the set laser machining condition. The label acquisition unit 30 acquires temporal change data about a temperature detected by the temperature detection means 26 as a label corresponding to answer data. The first learning unit 31 receives a large number of pairs of the input data and the label to learn a relationship between the input data and the label.

The first learning unit 31 includes an error calculation unit 32 and a learning model update unit 33, for example. The error calculation unit 32 calculates an error between output from a learning model responsive to the input data and the foregoing label. The learning model update unit 33 updates the learning model in response to the error calculated by the error calculation unit 32. In this way, the first learning unit 31 is allowed to pursue learning. As the learning is pursued, the first learning unit 31 becomes capable of predicting temporal change data about a temperature detected by the temperature detection means 26 relative to input data newly input using a result of the learning. The temporal change data about a temperature predicted by the first learning unit 31 is input to the machining condition setting control unit 19 of the machining condition setting device 4. Then, the machining condition setting device 4 refers to the temporal change data about a temperature predicted by the first learning unit 31 to adjust the laser machining condition.

An example of a specific motion of the 3D laser machining system 200 according to the third embodiment will be described next using FIGS. 16A to 16D. FIGS. 16A to 16D are flowcharts showing an example of the motion of the 3D laser machining system 200 shown in FIG. 15. When the 3D laser machining system 200 is started, the machining condition setting control unit 19 determines whether a command to implement laser machining has been issued (step S301). If the laser machining implementation command has been issued, the machining condition setting control unit 19 reads device information such as the performance, specifications, etc. of the laser device 2 as a target of setting of a laser machining condition and the driver 3 mainly from the control unit 12 of the laser device 2. Further, the machining condition setting control unit 19 reads a laser machining content commanded from the command input unit 20 (step S302).

In response to a command from the machining condition setting control unit 19, the 3D CAD data about the workpiece 8 defining the thermophysical properties of a material and the 3D CAD data about the machining head 9 are read from the data acquisition unit 21 into the CAD data storage unit 22 (step S303). Next, in response to a command from the machining condition setting control unit 19, the move state simulation unit 16 first conducts simulation of the move state of the machining head 9 relative to the workpiece 8 using the device information and the laser machining content read into the machining condition setting control unit 19, and the 3D CAD data about the workpiece 8 and the machining head 9 stored in the CAD data storage unit 22 to obtain a relative move condition for the machining head 9 under which laser machining can be finished within a minimum period of time (step S304).

The machining condition setting control unit 19 determines as a result of the move state simulation whether the machining head 9 can move without interfering with the workpiece 8 (step S305). If the machining head 9 is determined to interfere with the workpiece 8 in step S305, the machining condition setting control unit 19 displays an indication on the display unit 23 indicating that the possible interference by the machining head 9 with the workpiece 8 will disable implementation of commanded laser machining (step S306). Then, the flow returns to step S301 to be placed on standby until a new laser machining implementation command is input.

If the machining head 9 is determined to be capable of moving without interfering with the workpiece 8 in step S305, the thermal fluid simulation unit 17 conducts the non-stationary thermal fluid simulation (step S307). The thermal fluid simulation unit 17 repeats the non-stationary thermal fluid simulation until a laser machining condition is obtained under which temporal change in a temperature detected by the temperature detection means 26 becomes intended temperature change during implementation of laser machining, namely, in the third embodiment, until a simulation result is obtained indicating that a temperature detected by the temperature detection means 26 is close to a predetermined temperature in the respective machining zones during implementation of the laser machining, thereby provisionally determining a laser machining condition (step S308).

Next, the machining condition setting control unit 19 determines whether a learned flag stored in the machining condition setting control unit 19 is OFF, thereby determining whether learning by the first learning unit 31 has been pursued sufficiently (step S309). The learned flag being OFF means that the learning by the first learning unit 31 has not been pursued sufficiently yet. In this case, in response to a command from the control unit 12, the laser device 2 starts laser machining under the laser machining condition provisionally determined by the machining condition setting unit 18 on the basis of the simulation result (step S310).

During implementation of the laser machining, a constant check is implemented to determine whether there is a detected abnormal signal using the photodetection means 11, for example (step S311). If an abnormal signal is detected, the control unit 12 compensates for the laser machining condition (step S312), and continues the laser machining. The details of step S311 and step S312 correspond to those of steps S117 to S122 in the flowchart of FIG. 12B or those of steps S218 to S223 in the flowchart of FIG. 14B. However, in the flowcharts of FIGS. 16A to 16D, similar motions are made three stages (step S311 and step S312, step S333 and step S334, and step S343 and step S344). Thus, these motions are described briefly as two steps.

During implementation of the laser machining, the first state observation unit 29 observes state data about the 3D laser machining system 200 containing the laser machining condition set by the machining condition setting unit 18 and a simulation result obtained under the set laser machining condition (step S313). Next, the first state observation unit 29 outputs the observed state data as input data to the first learning unit 31 (step S314). The label acquisition unit 30 acquires temporal change data about a temperature detected by the temperature detection means 26 as answer data (step S315). Further, the label acquisition unit 30 outputs the answer data as a label to the first learning unit 31 (step S316).

Next, the first learning unit 31 determines whether a learning model, which is a function for expressing a label from the input data, has already been constructed (step S317). If the learning model is determined to have already been constructed, the error calculation unit 32 calculates an error between output from the learning model responsive to the input data and the label for the respective machining zones, for example (step S318). Then, the learning model update unit 33 updates the learning model in response to the error calculated by the error calculation unit 32 (step S320).

Next, the machining condition setting control unit 19 determines whether a moving average of the errors calculated by the error calculation unit 32 is less than an intended value (step S321). If the moving average of the errors is determined to be less than the intended value, the learning by the first learning unit 31 is determined to have been pursued sufficiently, and the machining condition setting control unit 19 switches the stored learned flag to ON (step S322). Next, the control unit 12 determines whether the commanded laser machining is finished (step S323). If the laser machining is not finished, the flow returns to step S311 to continue the laser machining. If the laser machining is finished, the control unit 12 determines whether a motion stop command has been issued for the 3D laser machining system 200 (step S346). If the motion stop command has been issued, the control unit 12 finishes the motion of the 3D laser machining system 200. If the motion stop command has not been issued yet, the flow returns to step S301 to be placed on standby until a new laser machining implementation command is input to the command input unit 20.

If the learning model is determined not to have already been constructed in step S317, the first learning unit 31 observes a relationship between the input data and the label to construct an initial model for the learning model (step S319). Then, the flow goes to step S323. If the moving average of the errors calculated by the error calculation unit 32 is determined to exceed the intended value in step S321, the flow still goes to step S323 directly.

As described above, the motions from step S301 to step S321 are repeated until the learned flag is turned ON. The first learning unit 31 pursues the learning by repeating these motions.

If the learning flag is determined to be ON in step S309, the flow goes to a process of predicting answer data to input data newly input using a result of the learning. The first state observation unit 29 observes state data about the 3D laser machining system 200 containing the laser machining condition set by the machining condition setting unit 18 and a simulation result obtained under the set laser machining condition (step S324). Next, the first state observation unit 29 outputs the observed state data as input data to the first learning unit 31 (step S325).

The first learning unit 31 predicts temporal change data about a temperature detected by the temperature detection means 26 when laser machining is performed under the laser machining condition using the learning model as a learning result (step S326). The machining condition setting control unit 19 compares the temporal change data about a temperature predicated by the first learning unit 31 and temporal change data about an intended temperature for obtaining a favorable laser machining result for the respective machining zones, and determines whether a difference between the predicted temperature and the intended temperature is less than a predetermined difference (step S327).

If the differences between the predicted temperatures and the intended temperature are determined to be less than the predetermined difference in all machining zones, the machining condition setting control unit 19 determines the laser machining condition set by the machining condition setting unit 18 to be a laser machining condition to be actually employed for laser machining (step S328). If the presence of a machining zone is determined in which the difference between the predicted temperature and the intended temperature exceeds the predetermined difference, the machining condition setting control unit 19 refers to the temporal change data about a temperature predicted by the first learning unit 31 to adjust the laser machining condition (step S329). The thermal fluid simulation unit 17 conducts the non-stationary thermal fluid simulation under the adjusted laser machining condition (step S330). Then, the flow returns to step S324. In this way, the laser machining condition can be set under which the differences between the predicted temperatures and the intended temperature are less than the predetermined difference in all the machining zones.

After the laser machining condition is determined in step S328, the presence or absence of a command to continue learning for improving prediction accuracy at the first learning unit 31 is determined (step S331). If the command to continue learning is determined to have been issued, by implementing the motions from step S332 to step S334 by the control unit 12 as well as the motions from step S335 to step S340 by the first machine learning device 28, a laser machining condition can be determined using a result of the learning by the first learning unit 31 and the first learning unit 31 can continue the learning while the laser machining is being performed. The motions from step S332 to step S340 correspond to the motions from step S310 to step S320 performed previously, with only the exception that step S317 and step S319 relating to construction of a learning model are omitted.

After the learning model update unit 33 updates the learning model in step S340 in response to the error calculated by the error calculation unit 32, the control unit 12 determines whether the commanded laser machining is finished (step S341). If the laser machining is determined not to be finished, the flow returns to step S333 to continue the laser machining. If the laser machining is determined to be finished, the control unit 12 determines whether a motion stop command has been issued for the 3D laser machining system 200 (step S346). If the motion stop command is determined to have been issued, the motion is finished. If the motion stop command is determined not to have been issued, the flow returns to step S301 to be placed on standby until a new laser machining implementation command is input to the command input unit 20.

If the command to continue the learning is determined not to have been issued in step S331, the laser device 2 starts laser machining in response to a command from the control unit 12 (step S342). After the laser machining is started, a constant check is implemented to determine whether there is a detected abnormal signal using the photodetection means 11, for example (step S343). If an abnormal signal is detected, the laser machining condition is compensated for (step S344). Until the commanded laser machining is determined to be finished in step S345, the flow returns to step S343 and the laser machining is continued. If an abnormal signal is not detected in step S343, after the commanded laser machining is determined to be finished in subsequent step S345, the control unit 12 determines whether a motion stop command has been issued for the 3D laser machining system 200 (step S346). If the motion stop command has been issued, the control unit 12 finishes the motion of the 3D laser machining system 200. If the motion stop command has not been issued yet, the flow returns to step S301 to be placed on standby until a new laser machining implementation command is input to the command input unit 20.

As described above, the non-stationary thermal fluid simulation is repeated until the differences between the predicted temperatures and the intended temperature become less than the predetermined difference in all the machining zones in step S327. This allows the machining condition setting device 4 to adjust the laser machining condition in such a manner that temporal change data about a temperature conforms to intention. Thus, the 3D laser machining system 200 of the third embodiment becomes capable of performing laser machining even on the workpiece 8 having a complicated shape while maintaining a temperature at the machining point or in the vicinity of the machining point at an intended temperature. The first machine learning device 28 of the third embodiment observes both a laser machining condition and a simulation result obtained under the laser machining condition as state data. In this way, the simulation result is used as a hint. This makes it possible to pursue learning comparatively easily for prediction of temporal change data about a temperature detected by the temperature detection means 26 under a new laser machining condition, compared to a case where the simulation result is not observed as state data.

In the third embodiment, as described above, the motion of compensating for a laser machining condition in response to detection of an abnormal signal (step S311 and step S312, step S333 and step S334, and step S343 and step S344) is explained briefly. Meanwhile, like the motions from step S117 to step S122 in the flowchart of FIG. 12B or those from step S218 to step S223 in the flowchart of FIG. 14B, if it is determined that the quantity of a returning beam detected by the photodetection means 11 exceeds a permissible level, if a distance between the machining head 9 and the machining point measured by the ranging means 25 deviates from a predetermined distance, or if a temperature at the machining point or a surface temperature in the vicinity of the machining point detected by the temperature detection means 26 deviates from a temperature predicted from a simulation result during laser machining, it is also desirable in the third embodiment that a laser machining condition set in advance is compensated for at least partially and laser machining is continued under the compensated laser machining condition.

Even if machining is performed under a laser machining condition adjusted and then determined by referring to temporal change data about a temperature predicted by the first learning unit 31, a temperature at the machining point or a surface temperature in the vicinity of the machining point detected by the temperature detection means 26 is still likely to differ from the predicted temperature. This occurs if learning by the first learning unit 31 is insufficient. Even if the learning by the first learning unit 31 has been pursued sufficiently, this still occurs if a peripheral state around the laser device 2 or the driver 3 changes during laser machining, or if a surface state of the workpiece 8 is nonuniform, for example. Even if the temperature at the machining point or the surface temperature in the vicinity of the machining point differs from the predicted temperature, however, the 3D laser machining system 200 of the third embodiment can still reduce the occurrence of a defective part by compensating for a laser machining condition. Meanwhile, if the laser machining condition is compensated for during learning by the first learning unit 31, the compensated laser machining condition is also desirably observed as state data for pursuing learning.

As clearly understood from the flowcharts from FIGS. 16A to 16D, if the learned flag is set ON in step S309 and continuing learning becomes unnecessary, there is no longer a need to acquire a label from the label acquisition unit 30. Thus, the label acquisition unit 30 can be removed.

Fourth Embodiment

Figure 17:
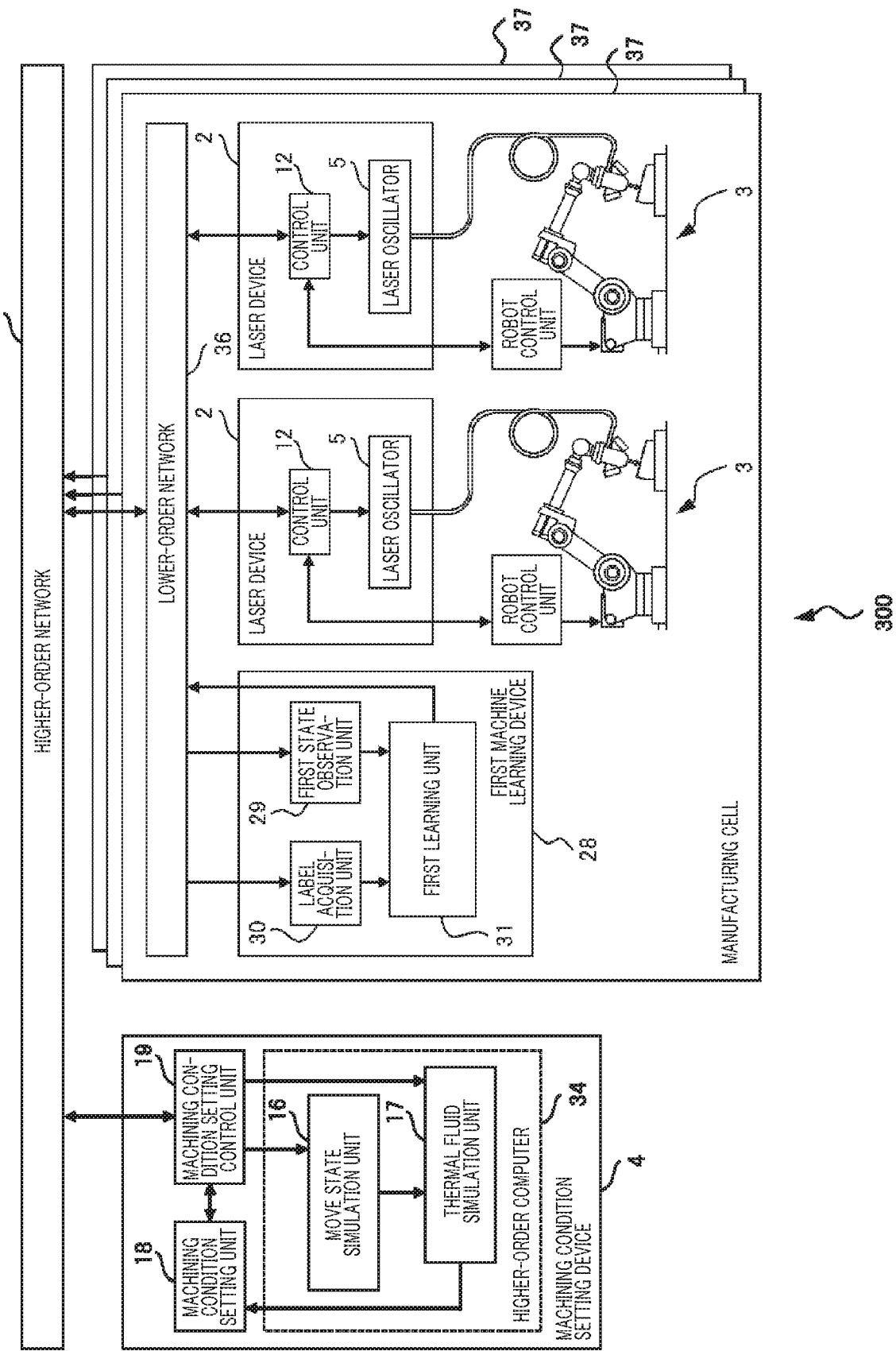
FIG. 17 is a block diagram showing a conceptual configuration of a 3D laser machining system according to a fourth embodiment of the present invention.

FIG. 17 is a block diagram showing a conceptual configuration of a 3D laser machining system according to a fourth embodiment of the present invention. In comparison to the 3D laser machining system 200 of the third embodiment, a 3D laser machining system 300 of the fourth embodiment further includes a higher-order computer 34, a higher-order network 35, and a lower-order network 36. A plurality of the laser devices 2, a plurality of the drivers 3, and plurality of the first machine learning devices 28 are provided. One first machine learning device 28 and a plurality of the laser devices 2 are connected through the lower-order network 36 to form one manufacturing cell 37. Each of the laser devices 2 includes at least one laser oscillator 5, the control unit 12, and at least one machining head for providing laser output from the laser oscillator 5.

A plurality of the manufacturing cells 37 and the higher-order computer 34 are connected through the higher-order network 35. The higher-order computer 34 functions at least as the thermal fluid simulation unit 17 of the machining condition setting device 4. The first state observation unit 29 of the first machine learning device 28 receives at least a laser machining condition as a simulation condition for the non-stationary thermal fluid simulation by the thermal fluid simulation unit 17 and at least temporal change data about a temperature expected to be detected by temperature detection means as a part of a simulation result of the non-stationary thermal fluid simulation input through the higher-order network 35 and the lower-order network 36. In the fourth embodiment, the higher-order computer 34 is configured to fulfill the functions of the thermal fluid simulation unit 17 and the move state simulation unit 16.

The temporal change data about a temperature detected by the temperature detection means is input to the label acquisition unit 30 of the first machine learning device 28 through the lower-order network 36. In this way, a learning model is shared between a plurality of the first learning units 31 through the higher-order network 35 and the lower-order network 36.

To avoid complication of FIG. 17, functional blocks of the laser device 2 other than the control unit 12 and the laser oscillator 5 are omitted from FIG. 17. Regarding the machining condition setting device 4, functional blocks other than the machining condition setting control unit 19, the move state simulation unit 16, the thermal fluid simulation unit 17, and the machining condition setting unit 18 are also omitted.

The first machine learning device 28, which is required to pursue learning by processing a label in real time as temporal change data about a temperature detected by the temperature detection means, is connected to the lower-order network 36 also called a fog network to which several to several tens of laser devices 2 are connected. The non-stationary thermal fluid simulation is simulation involving a huge amount of calculation load while real-time performance required for this simulation is not very high. By conducting this non-stationary thermal fluid simulation at the higher-order computer 34 such as a cloud server connected to the higher-order network 35, both of required real-time performance of processing and required large-scale processing power can be achieved.

Fifth Embodiment

Figure 18:
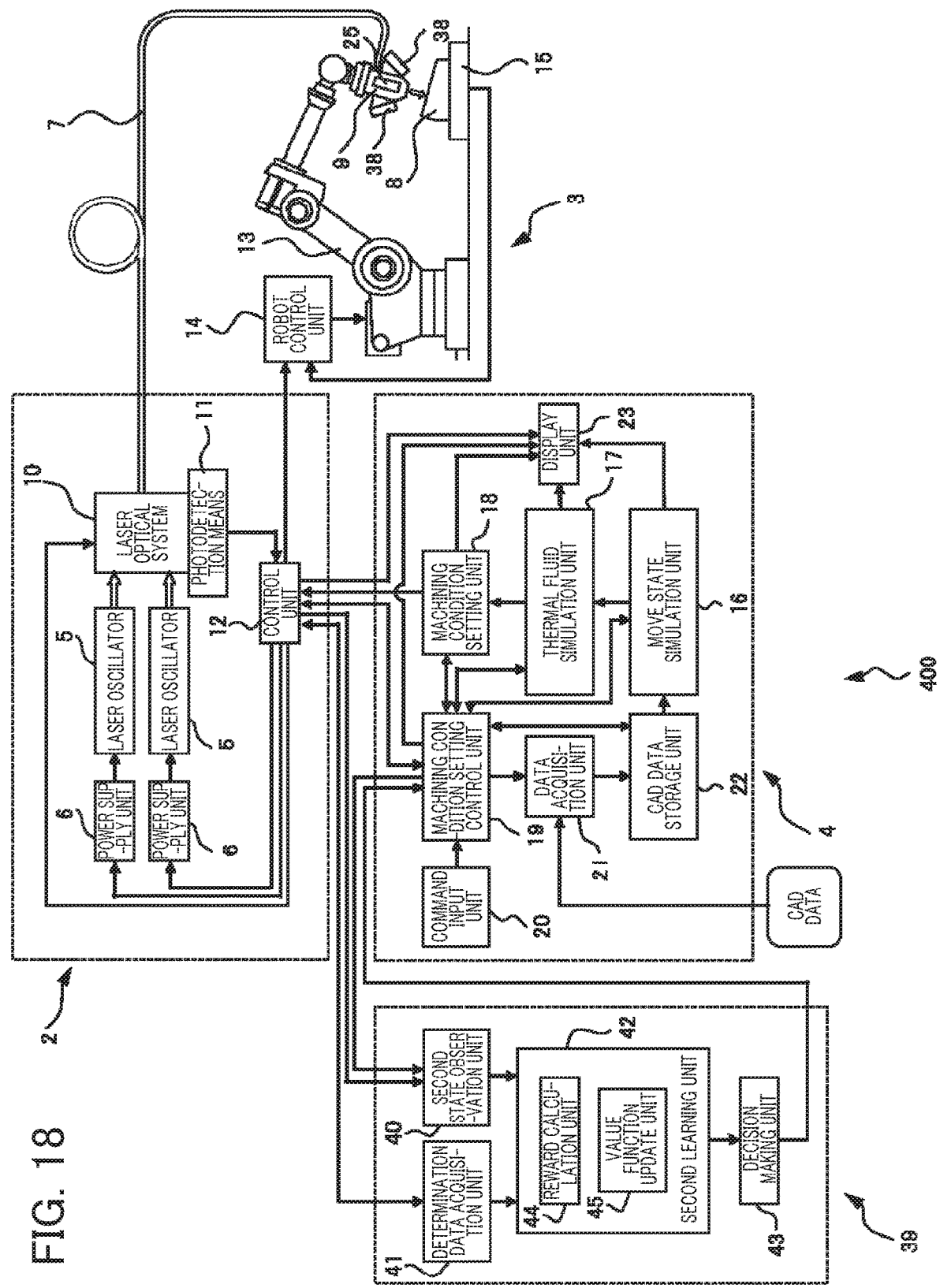
FIG. 18 is a block diagram showing a conceptual configuration of a 3D laser machining system according to a fifth embodiment of the present invention.
Figure 19C:
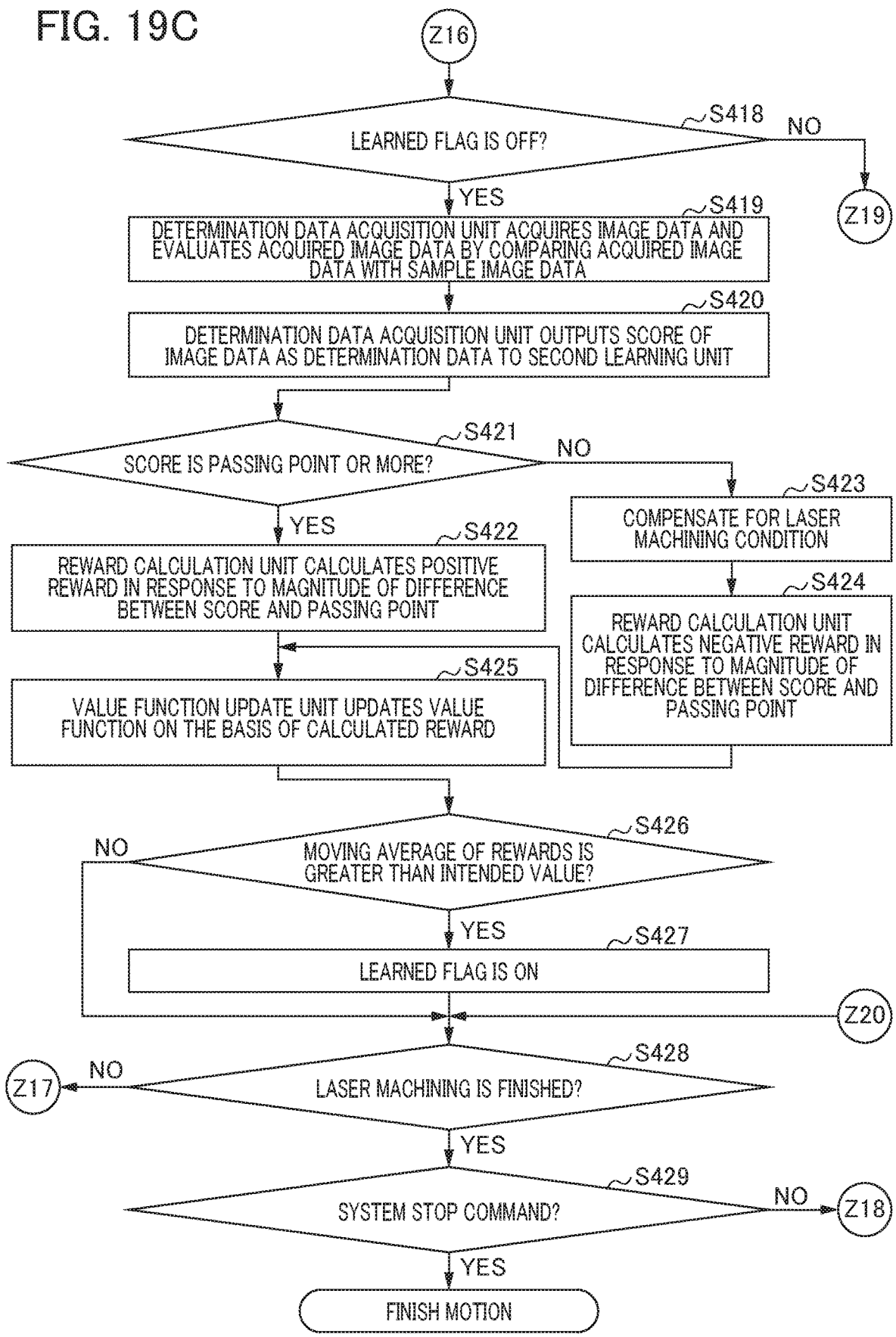
FIG. 19C is a third flowchart showing the example of the motion of the 3D laser machining system according to the fifth embodiment of the present invention.
Figure 19D:
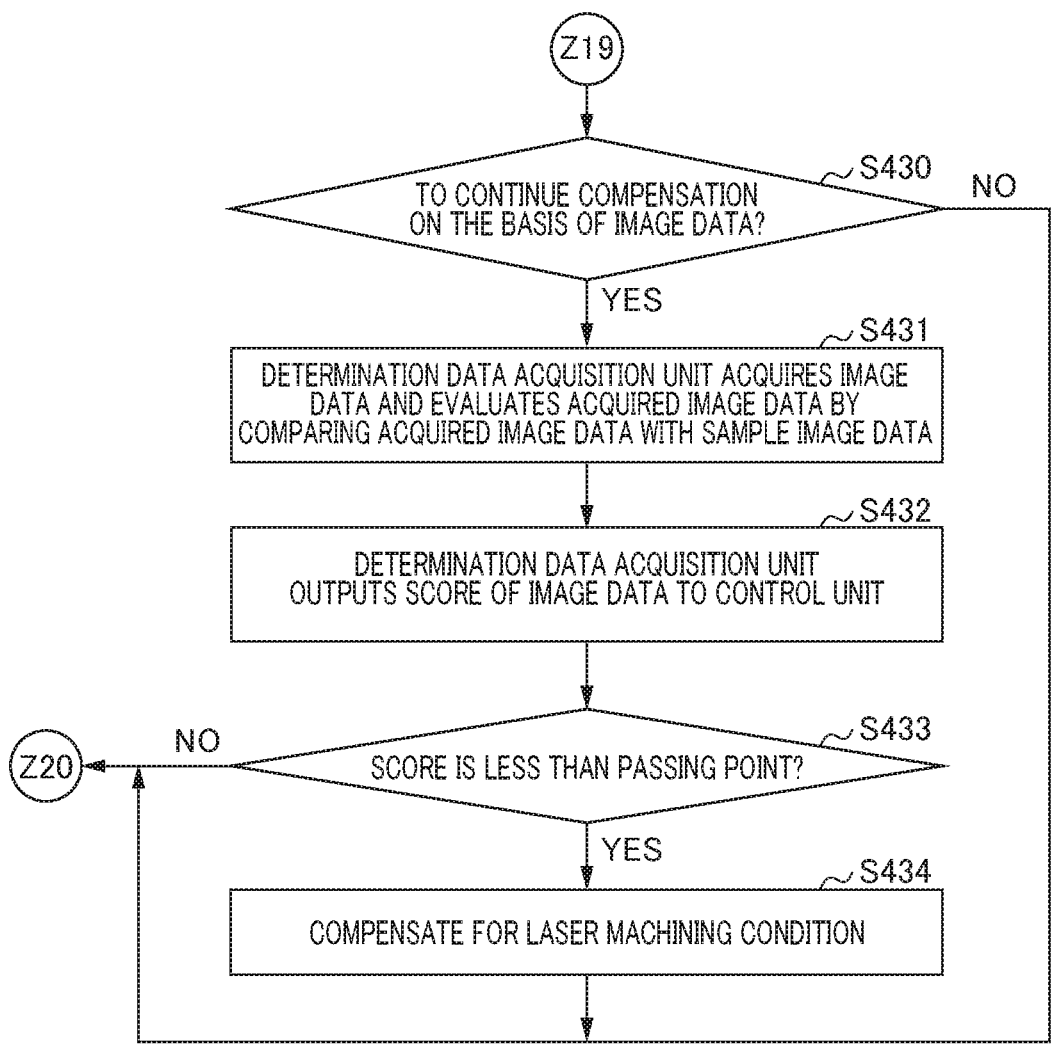
FIG. 19D is a fourth flowchart showing the example of the motion of the 3D laser machining system according to the fifth embodiment of the present invention.

FIG. 18 is a block diagram showing a conceptual configuration of a 3D laser machining system according to a fifth embodiment of the present invention. In comparison to the 3D laser machining system 1 of the first embodiment shown in FIG. 1, a 3D laser machining system 400 of the fifth embodiment further includes an in-line image monitoring device 38 and a second machine learning device 39. The 3D laser machining system 400 further includes the ranging means 25 provided to the machining head 9 and not shown in FIG. 1.

The in-line image monitoring device 38 is a device capable of acquiring image data about the workpiece 8. The image data about the workpiece 8 means image data indicating a 2D shape or a 3D shape at a surface of the workpiece 8 or inside the workpiece 8 in at least either a part of the workpiece 8 being subjected to laser machining or a part of the workpiece 8 immediately after the laser machining.

More specifically, the in-line image monitoring device 38 may be a digital 2D imaging device, a CCD measuring microscope, a white light interferometer, a laser microscope (geometry measuring microscope), a non-contact 3D measuring device, a photoexcitation nondestructive inspection device composed of a light source and an infrared camera, an ultrasonic flaw inspection device, an induction heating nondestructive inspection device, an X-ray transmission imaging device, a radiation transmission imaging device, or an acoustic emission inspection device, for example. The in-line image monitoring device 38 monitors the shape of a weld pool (solid-liquid interface between a molten part and a solid part), air bubbles in the weld pool, a keyhole, a laser-induced plume, laser-induced plasma, etc. in real time generated by laser irradiation during laser machining.

If a type of laser machining is cutting, the in-line image monitoring device 38 is also used for monitoring a shape indicating a result of laser machining such as smoothness or roughness of a cutting plane formed with a laser, the volume of a beaded adherent (dross) per unit cut length on front and rear surfaces near a cut part, the amount of sputtered adherent per unit area on the rear surface, color density of a scale (oxide) on the cutting plane, cutting dimension and shape accuracy, or a degree of verticality of the cutting plane, for example. If a type of laser machining is welding, the in-line image monitoring device 28 is used for monitoring a shape indicating a result of laser machining such as a crack at a welded part resulting from a laser, porosity, a blowhole, a pinhole, a defective penetration, fusion failure, undercut or overlap, or humping, for example.

The second machine learning device 39 includes a second state observation unit 40, a determination data acquisition unit 41, a second learning unit 42, and a decision making unit 43. The second state observation unit 40 observes a state inside the 3D laser machining system 400 and a state outside the 3D laser machining system 400 containing at least a laser machining condition set by the machining condition setting unit 18 and shape data about the workpiece 8 corresponding to image data as a simulation result obtained under the set laser machining condition, and outputs the observed states as state data. The determination data acquisition unit 41 acquires time-series image data obtained by the in-line image monitoring device 38, and outputs a result of comparison between the acquired image data and sample image data given a score stored in advance as determination data. The second learning unit 42 receives the outputs from the second state observation unit 40 and the determination data acquisition unit 41. The decision making unit 43 determines a laser machining condition to be output from the second learning unit 42 on the basis of a value function as a result of learning by the second learning unit 42.

The second learning unit 42 includes a reward calculation unit 44 that calculates a reward from the determination data, and a value function update unit 45 that updates value functions sequentially on the basis of the calculated reward. The second learning unit 42 associates the laser machining condition output from the decision making unit 43 with the state data input from the second state observation unit 40 and the determination data input from the determination data acquisition unit 41, and learns an optimum laser machining condition in each state in a trial-and-error method on the basis of the determination data.

An example of a specific motion of the 3D laser machining system 400 according to the fifth embodiment will be described next using FIGS. 19A to 19D. FIGS. 19A to 19D are flowcharts showing an example of the motion of the 3D laser machining system 400 of the fifth embodiment. When the 3D laser machining system 400 is started, the machining condition setting control unit 19 determines whether a command to implement laser machining has been issued (step S401). If the laser machining implementation command has been issued, the machining condition setting control unit 19 reads device information such as the performance, specifications, etc. of the laser device 2 as a target of setting of a laser machining condition and the driver 3 mainly from the control unit 12 of the laser device 2. Further, the machining condition setting control unit 19 reads a laser machining content commanded from the command input unit 20 (step S402).

Next, in response to a command from the machining condition setting control unit 19, the 3D CAD data about the workpiece 8 defining the thermophysical properties of a material and the 3D CAD data about the machining head 9 are read from the data acquisition unit 21 into the CAD data storage unit 22 (step S403). Next, in response to a command from the machining condition setting control unit 19, the move state simulation unit 16 first conducts simulation of the move state of the machining head 9 relative to the workpiece 8 using the device information and the laser machining content read by the machining condition setting control unit 19, and the 3D CAD data about the workpiece 8 and the machining head 9 stored in the CAD data storage unit 22 to obtain a relative move condition for the machining head 9 under which laser machining can be finished within a minimum period of time (step S404).

The machining condition setting control unit 19 determines as a result of the move state simulation whether the machining head 9 can move without interfering with the workpiece 8 (step S405). If the machining head 9 is determined to interfere with the workpiece 8, the machining condition setting control unit 19 displays an indication on the display unit 23 indicating that the possible interference by the machining head 9 with the workpiece 8 will disable implementation of commanded laser machining (step S406). Then, the flow returns to step S401 to be placed on standby until a new laser machining implementation command is input. If the machining head 9 is determined to be capable of moving without interfering with the workpiece 8 in step S405, the thermal fluid simulation unit 17 conducts the non-stationary thermal fluid simulation under a laser machining condition set provisionally by the machining condition setting control unit 19 (step S407). The laser machining condition used for the non-stationary thermal fluid simulation is determined provisionally to be a laser machining condition (step S408).

Like the 3D laser machining system 100 of the second embodiment, the 3D laser machining system 400 of the fifth embodiment may include a machining condition storage unit, for provisional setting of a laser machining condition by the machining condition setting control unit 19. The machining condition storage unit stores a substantially optimum acquired laser machining condition for a workpiece condition prepared for each type of laser machining and containing a material and a thickness about a plate-like workpiece. The optimum acquired laser machining condition stored in the machining condition storage unit may be referred to.

Next, the second state observation unit 40 observes a state inside the 3D laser machining system 400 and a state outside the 3D laser machining system 400 containing the laser machining condition provisionally determined by the machining condition setting unit 18 and shape data about the workpiece 8 corresponding to image data as a simulation result obtained under the provisionally determined laser machining condition (step S409). The state data observed by the second state observation unit 40 is output to the second learning unit 42 (step S410). On the basis of a value function as a result of the learning by the second learning unit 42 and by referring to sample image given a score stored in advance, the second learning unit 42 predicts a laser machining condition under which time-series image data obtained by the in-line image monitoring device 38 is assumed to be image data given a high score for the state data input from the second state observation unit 40 (step S411). Then, the decision making unit 43 determines a laser machining condition to be output, and outputs the determined laser machining condition to the control unit 12 through the machining condition setting control unit 19 (step S412). Then, laser machining is started (step S413).

When the laser machining is started, the control unit 12 checks to determine whether the quantity of a returning beam should be reduced on the basis of a result of detection of the returning beam obtained by the photodetection means 11. If it is determined in step S414 that the quantity of the returning beam exceeds a permissible level, laser beam output is reduced and the relative move speed of the machining head 9 relative to the workpiece 8 is also reduced for reducing the quantity of the returning beam in response to a command from the control unit 12, for example, to maintain a temperature at the machining point or in the vicinity of the machining point as close as possible to a predetermined temperature, etc. In this way, the laser machining condition is compensated for (step S415). Then, the flow goes to step S416.

If it is determined in step S414 that the quantity of the returning beam does not exceed the permissible level, the flow goes to step S416 directly. In step S416, the control unit 12 determines whether a distance from the end surface of the machining head 9 on the laser beam output side and a machining point measured by the ranging means 25 is normal in terms of the laser machining condition set in advance. If the distance is determined not to be normal, the control unit 12 compensates for the relative move condition for the machining head 9 on the basis of the measurement result obtained by the ranging means 25 so as to achieve a predetermined distance between the end surface of the machining head 9 on the laser beam output side and the machining point (step S417). Then, the flow goes to step S418. If the distance is determined to be normal in step S416, the flow goes to step S418 directly.

In step S418, the machining condition setting control unit 19 determines whether a learned flag stored in the machining condition setting control unit 19 is OFF. The learning flag being OFF means that the second machine learning device 39 is still learning. In this case, the determination data acquisition unit 41 acquires time-series image data obtained by the in-line image monitoring device 38 during the laser machining, and evaluates the acquired image data by comparing the acquired image data with the sample image data given a score stored in advance (step S419). Then, the determination data acquisition unit 41 outputs as determination data scores given to the time-series image data acquired in step S419 to the second learning unit 42 (step S420).

Next, the second learning unit 42 determines whether the score of the image data input as the determination data to the second learning unit 42 is higher than a passing point set in advance (step S421). If the score is determined to be higher than the passing point, the reward calculation unit 44 calculates a reward in response to a difference between the score and the passing point in such a manner that the calculated reward becomes greater positively as the difference becomes larger (step S422). Meanwhile, if the score is lower than the passing point, the control unit 12 compensates for the laser machining condition in real time (step S423). Then, the reward calculation unit 44 calculates a reward in response to the difference between the score and the passing point in such a manner that the calculated reward becomes greater negatively as the difference becomes larger (step S424).

After the reward is calculated, the value function update unit 45 updates value functions sequentially on the basis of the calculated reward (step S425). If the control unit 12 compensates for the laser machining condition temporarily, image data corresponding to a machining zone in which laser machining has been performed under the laser machining condition compensated for by the control unit 12 is desirably excluded from a subject of reward calculation.

Next, it is determined whether a moving average of rewards as an average of the most recent rewards of a predetermined number calculated by the reward calculation unit 44 is greater than an intended value set in advance (step S426). If the moving average of the rewards is determined to be greater than the intended value, the learning by the second learning unit 42 is determined to have been pursued sufficiently. Then, the machining condition setting control unit 19 switches the learned flag stored in the machining condition setting control unit 19 to ON (step S427). Next, the control unit 12 determines whether the commanded laser machining is finished (step S428). If the laser machining is determined not to be finished, the flow returns to step S414 and the laser machining is continued. Meanwhile, if the laser machining is determined to be finished, the control unit 12 determines whether a motion stop command has been issued for the 3D laser machining system 400 (step S429). If the motion stop command is determined to have been issued, the motion is stopped. If the motion stop command is determined not to have been issued, the flow returns to step S401 and waits for input of a new laser machining implementation command to the command input unit 20.

As described above, the motions from step S401 to step S429 are repeated until the learned flag is turned ON. By doing so, the second learning unit 42 associates the laser machining condition output from the decision making unit 43 with the state data input from the second state observation unit 40 and the determination data input from the determination data acquisition unit 41, and learns an optimum laser machining condition in each state in a trial-and-error method on the basis of the determination data.

As the second learning unit pursues learning through machine learning, it becomes possible to output a laser machining condition under which time-series image data generated by imaging by the in-line image monitoring device conforms to sample image data given a high score directly related to a favorable laser machining result. Further, by observing state data containing a laser machining condition and shape data about the workpiece corresponding to image data as a simulation result obtained under this laser machining condition, it becomes possible to give a hint from a simulation result indicating which condition of the laser machining condition is to be changed and how a workpiece shape during laser machining or immediately after the laser machining is to be changed by the change in the condition. In this way, learning of an optimum laser machining condition in each state can be pursued efficiently.

If the learned flag is determined to be ON in step S418, the flow may go to step S428 directly to stop acquisition of determination data by the determination data acquisition unit 41 or calculation of a reward by the reward calculation unit 44. Alternatively, even after the learning is finished, the function of compensating for a laser machining condition on the basis of time-series image data obtained by the in-line image monitoring device 38 may still be continued.

In this case, if the learned flag is determined to be ON in step S418, the machining condition setting control unit 19 determines whether a command to continue the function of compensating for the laser machining condition on the basis of image data has been issued (step S430). If the command to continue the function of compensation is determined to have been issued, the determination data acquisition unit 41 continues acquiring time-series image data obtained by the in-line image monitoring device 38 during laser machining, evaluating the acquired image data by comparing the acquired image data with sample image data given a score stored in advance (step S431), and outputting scores given to the time-series image data in such a manner that these scores are eventually input to the control unit 12 (step S432). Next, the control unit 12 determines whether the score of the image data is lower than a passing point (step S433). If the score is determined to be lower than the passing point, the laser machining condition is compensated for in real time (step S434). Then, the flow may go to step S428. If the score of the image data is determined to be higher than the passing point in step S433, the flow goes to step S428 directly.

In the fifth embodiment, a score of image data is compared with a passing point and the magnitudes of the score and the passing point relative to each other are used as a basis for determining whether a laser machining condition is to be compensated for using this score. However, the point to be compared in its magnitude with the score in order to determine whether the laser machining condition should be compensated does not necessarily have to be the same as the passing point used to determine whether learning is finished, but, for example, can be lower than the passing point used for determining whether learning is finished.

The function of compensating for a laser machining condition may be continued on the basis of image data. If learning by the second learning unit 42 is insufficient, or if a peripheral state around the laser device 2 or the driver 3 changes during laser machining or if a surface state of the workpiece 8 is nonuniform while the learning by the second learning unit 42 has been pursued sufficiently, it is likely that image data will deviate slightly from sample image data given a high score during machining under a laser machining condition output from the second machine learning device 39. In this regard, by compensating for the laser machining condition, the occurrence of a defective part can be reduced.

Upon compensation of laser machining conditions, in order to enable determination as to whether laser beam output should be increased or reduced, a learning result from the second learning unit 42 may be referred to, or alternatively, temperature detection means may be provided and a detection result obtained by the temperature detection means may be referred to. As another example, plasma beam detection means may be provided additionally, and a laser machining condition may be compensated for by referring to the intensity of detected plasma.

In the fifth embodiment, in the process of determining an optimum laser machining condition, the non-stationary thermal fluid simulation is conducted less frequently than in the 3D laser machining system 200 of the third embodiment. The reason for this is as follows. If a temperature at the workpiece 8 increases, the phase of the workpiece 8 is changed from solid to liquid or gas, or further to plasma as ionized gas. Meanwhile, conducting the non-stationary thermal fluid simulation strictly by giving consideration to a flow of a liquid phase in a molten part, the occurrence of plasma, etc. involves a huge amount of calculation load.

Sixth Embodiment

Figure 20:
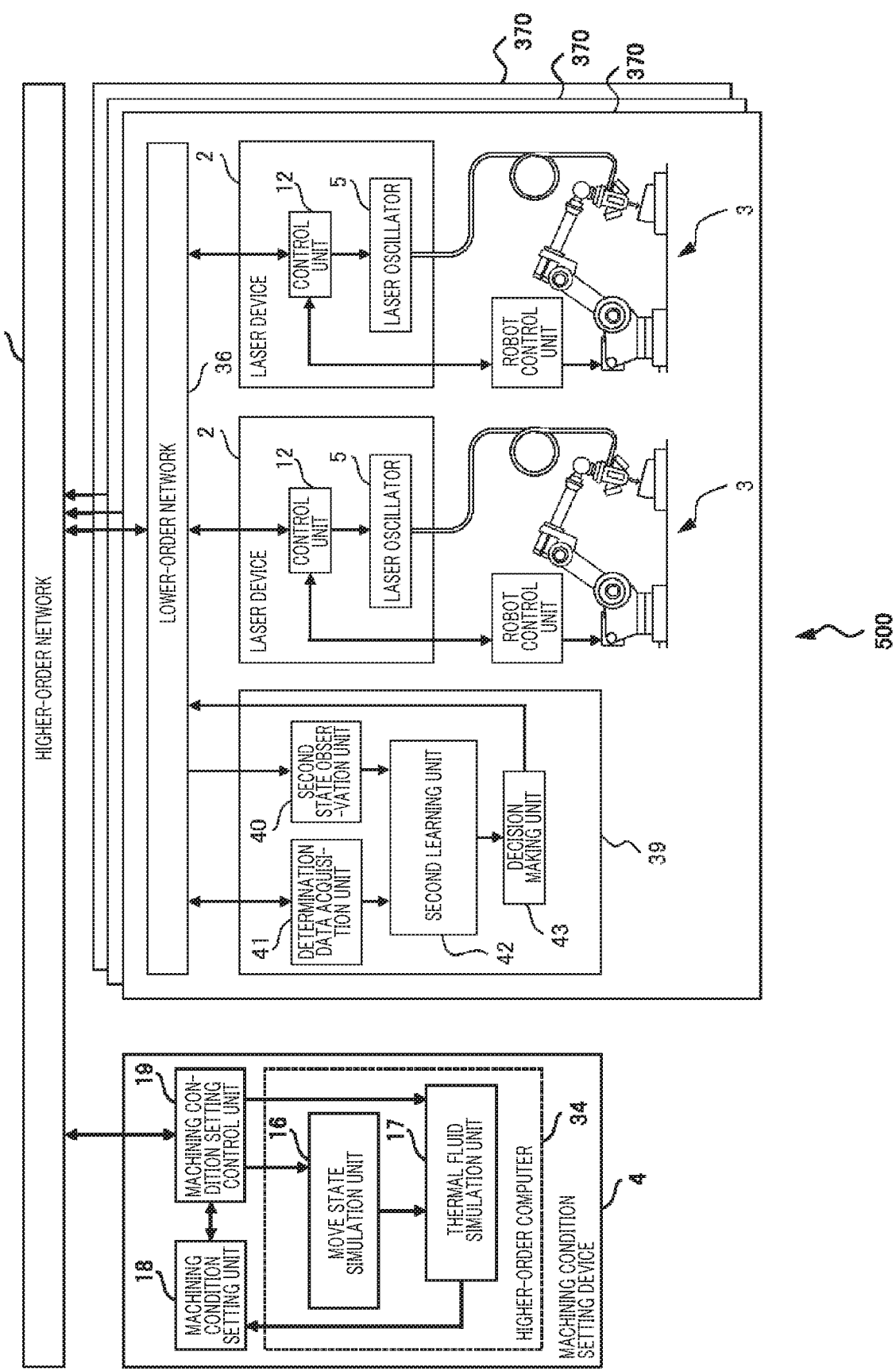
FIG. 20 is a block diagram showing a conceptual configuration of a 3D laser machining system according to a sixth embodiment of the present invention.

FIG. 20 is a block diagram showing a conceptual configuration of a 3D laser machining system according to a sixth embodiment of the present invention. In comparison to the 3D laser machining system 400 of the fifth embodiment, a 3D laser machining system 500 of the sixth embodiment further includes a higher-order computer 34, a higher-order network 35, and a lower-order network 36. A plurality of the laser devices 2, a plurality of the drivers 3, and a plurality of the second machine learning devices 39 are provided. One second machine learning device 39 and a plurality of the laser devices 2 are connected through the lower-order network 36 to form one manufacturing cell 370. Each of the laser devices 2 includes at least one laser oscillator 5, the control unit 12, and at least one machining head for providing laser output from the laser oscillator 5.

A plurality of the manufacturing cells 370 and the higher-order computer 34 are connected through the higher-order network 35. The higher-order computer 34 functions at least as the thermal fluid simulation unit 17 of the machining condition setting device 4. The second state observation unit 40 of the second machine learning device 39 receives at least a laser machining condition as a simulation condition for the non-stationary thermal fluid simulation by the thermal fluid simulation unit 17 and at least shape data about the workpiece 8 corresponding to image data as a part of a simulation result of the non-stationary thermal fluid simulation input through the higher-order network 35 and the lower-order network 36. In the sixth embodiment, the higher-order computer 34 is configured to fulfill the functions of the thermal fluid simulation unit 17 and the move state simulation unit 16.

Image data generated by imaging by the in-line image monitoring device is input to the determination data acquisition unit 41 of the second machine learning device 39 through the lower-order network 36. In this way, a value function is shared between a plurality of the second learning units 42 through the higher-order network 35 and the lower-order network 36.

To avoid complication of FIG. 20, functional blocks of the laser device 2 other than the control unit 12 and the laser oscillator 5 are omitted from FIG. 20. Regarding the machining condition setting device 4, functional blocks other than the machining condition setting control unit 19, the move state simulation unit 16, the thermal fluid simulation unit 17, and the machining condition setting unit 18 are also omitted.

In the 3D laser machining system of the sixth embodiment, time-series image data generated by imaging by the in-line image monitoring device is processed into determination data in real time, a laser machining condition is compensated for, if necessary, and the reward calculation unit calculates a reward. The second machine learning device 39, which is required to update a value function in response to a reward, is connected to the lower-order network 36 also called a fog network to which several to several tens of laser devices 2 are connected. The non-stationary thermal fluid simulation is simulation involving a huge amount of calculation load while real-time performance required for this simulation is not very high. This non-stationary thermal fluid simulation is conducted at the higher-order computer 34 such as a cloud server connected to the higher-order network 35. By doing so, the 3D laser machining system of the sixth embodiment is allowed to achieve both of required real-time performance of processing and required large-scale processing power.

EXPLANATION OF REFERENCE NUMERALS

1, 100, 200, 300, 400, 500 3D laser machining system
2 Laser device
3 Driver
4 Machining condition setting device
5 Laser oscillator
6 Power supply unit
7 Optical fiber
8 Workpiece
9 Machining head
10 Laser optical system
11 Photodetection means
12 Control unit
13 Robot
14 Robot control unit
15 Holding mechanism unit
16 Move state simulation unit
17 Thermal fluid simulation unit
18 Machining condition setting unit
19 Machining condition setting control unit
20 Command input unit
21 Data acquisition unit
22 CAD data storage unit
23 Display unit
24 Machining condition storage unit
25 Ranging means
26 Temperature detection means
28 First machine learning device
29 First state observation unit
30 Label acquisition unit
31 First learning unit
32 Error calculation unit
33 Learning model update unit
34 Higher-order computer
35 Higher-order network
36 Lower-order network
37, 370 Manufacturing cell
38 In-line image monitoring device
39 Second machine learning device
40 Second state observation unit
41 Determination data acquisition unit
42 Second learning unit
43 Decision making unit
44 Reward calculation unit
45 Value function update unit

What is claimed is:

1. A machining condition setting device comprising: a move state simulation unit that simulates a move state of a machining head containing at least a relative position or a state of temporal change in a relative move speed of the machining head relative to a workpiece using 3D CAD data about the workpiece containing material information defining thermophysical properties including at least heat conductivity, specific heat, and density, and 3D CAD data about the machining head containing information at least about an outer shape of the machining head and about a relative position of the optical axis of a laser beam output from the machining head relative to the outer shape of the machining head, with an intersection point of a machining surface of the workpiece defined by the 3D CAD data about the workpiece and the optical axis of the machining head determined to be a machining point in virtual space, the simulation being conducted under a condition of moving the machining head relative to the workpiece along a machining line set as a path of the machining point determined when the machining head moves relative to the workpiece in the virtual space while the optical axis of the machining head is maintained at a predetermined angle from each of a normal vertical to the machining surface on which the machining point passes through and the machining line, and while a distance between an end surface of the machining head on a laser beam output side and the machining point is maintained at a predetermined distance;

a thermal fluid simulation unit that conducts non-stationary thermal fluid simulation for obtaining a temperature distribution in a region covering at least a part of the workpiece to be changed by the move of the machining head outputting a laser beam; and a machining condition setting unit that sets a laser machining condition in advance containing at least a relative move condition for the machining head and a laser beam output condition before implementation of actual laser machining on the basis of simulation results obtained by the move state simulation unit and the thermal fluid simulation unit.

2. A 3D laser machining system comprising: the machining condition setting device according to claim 1;

a laser device comprising at least one laser oscillator, a power supply unit that supplies the laser oscillator with power for laser oscillation, a laser optical system for propagation of a laser beam output from the laser oscillator to the machining head, at least one photodetection means capable of detecting at least one of a laser output beam from the laser oscillator propagated in the laser optical system and a returning beam propagated in the laser optical system in an opposite direction to the laser output beam, and a control unit that receives output signals from at least the machining condition setting unit and the photodetection means and outputs a control signal containing at least a power output command to the power supply unit; and a driver that receives the control signal from the control unit and moves the machining head relative to the workpiece.

3. The 3D laser machining system according to claim 2, comprising the at least one photodetection means capable of detecting the returning beam, wherein if the control unit determines that the quantity of the returning beam is required to be reduced on the basis of a result of detection of the returning beam obtained by the photodetection means, the control unit outputs the control signal to the power supply unit and the driver so as to satisfy a condition allowing a temperature at the machining point or a temperature at the workpiece in the vicinity of the machining point to be maintained at a temperature close to an intended temperature by changing the laser machining condition set in advance by the machining condition setting unit at least temporarily and changing the laser machining condition containing both the laser beam output condition and the relative move speed of the machining head relative to the workpiece.

4. The 3D laser machining system according to claim 2, further comprising ranging means capable of measuring a distance between the end surface of the machining head on the laser beam output side and the machining point, wherein on the basis of a measurement result obtained by the ranging means during implementation of actual laser machining, the control unit fulfills a function of compensating for at least the relative move condition for the machining head of the laser machining condition set in advance on the basis of a result of the machining head move simulation.

5. The 3D laser machining system according to claim 2, further comprising temperature detection means capable of detecting at least one of a temperature at the machining point moving along the machining line during laser machining and a surface temperature of the workpiece in the vicinity of the machining point, wherein if a temperature difference occurs between a detected temperature detected by the temperature detection means at a certain time point in laser machining on the workpiece performed under the laser machining condition set by the machining condition setting device and a predicted temperature predicted at a position of a time point corresponding to the certain time point contained in the simulation result obtained under the laser machining condition set by the machining condition setting device, the control unit fulfills a function of compensating for at least a part of the laser machining condition set by the machining condition setting device in response to the temperature difference, and the laser device continues laser machining under the compensated laser machining condition.

6. The 3D laser machining system according to claim 2, wherein the thermal fluid simulation unit limits effect of irradiation of the workpiece with a laser beam from the machining head to temperature increase at the workpiece achieved by heat input to the workpiece, and conducts the non-stationary thermal fluid simulation on the assumption that a phase transition of the workpiece does not occur.

7. The 3D laser machining system according to claim 6, wherein, for at least a part of a machining zone along the machining line, the machining condition setting device sets a laser machining condition to obtain a simulation result that at least one of a temperature at the machining point and a temperature in the vicinity of the machining point is at a predetermined temperature at any relative move speed of the machining head moving relative to the workpiece.

8. The 3D laser machining system according to claim 7, wherein the thermal fluid simulation unit contains correlation data indicating correlation between the temperature at the machining point or in the vicinity of the machining point contained in the simulation result obtained under the laser machining condition set by the machining condition setting unit and a temperature at a corresponding position measured during implementation of actual laser machining under the laser machining condition, and the thermal fluid simulation unit makes reference to the correlation data to determine a predetermined replacement temperature intended in the non-stationary thermal fluid simulation as a replacement for the predetermined temperature intended during implementation of actual laser machining, and then conducts the non-stationary thermal fluid simulation.

9. The 3D laser machining system according to claim 7, wherein the machining condition setting device further comprises a machining condition storage unit, the machining condition storage unit contains a substantially optimum acquired laser machining condition for a workpiece condition prepared for each type of laser machining and containing at least a material and a thickness about the workpiece having a plate-like shape, the substantially optimum acquired laser machining condition containing laser machining conditions including at least laser beam output, the relative move speed of the machining point relative to the plate-like workpiece, and a distance between the end surface of the machining head on the laser beam output side and the machining point, and regarding at least a partial particular zone of a zone in which the machining line set at the workpiece has a linear shape and the workpiece has a constant thickness along the machining line, the machining condition setting unit sets, from among the optimum laser machining conditions stored in the machining condition storage unit, an approximately optimum laser machining condition with conforming or approximately conforming to a workpiece condition, and regarding at least a partial zone of the zone along the machining line other than the particular zone and at least adjacent to the particular zone, the machining condition setting unit sets a laser machining condition under which, with a temperature at the machining point or in the vicinity of the machining point obtained as the simulation result conducted under the approximately optimum laser machining condition set for the particular zone determined to be the predetermined temperature, a temperature at the machining point or in the vicinity of the machining point obtained by the non-stationary thermal fluid simulation becomes the same predetermined temperature as in the particular zone.

10. The 3D laser machining system according to claim 6, further comprising temperature detection means capable of detecting at least one of a temperature at the machining point moving along the machining line during laser machining and a surface temperature of the workpiece in the vicinity of the machining point, wherein if a temperature difference occurs between a detected temperature detected by the temperature detection means at a certain time point in laser machining on the workpiece performed under the laser machining condition set by the machining condition setting device and a predicted temperature predicted at a position of a time point corresponding to the certain time point contained in the simulation result obtained under the laser machining condition set by the machining condition setting device, the control unit fulfills a function of compensating for at least a part of the laser machining condition set by the machining condition setting device in response to the temperature difference, and the laser device continues laser machining under the compensated laser machining condition.

11. The 3D laser machining system according to claim 6, further comprising temperature detection means and a first machine learning device, wherein the temperature detection means is capable of detecting at least one of a temperature at the machining point moving along the machining line during laser machining and a surface temperature of the workpiece in the vicinity of the machining point, the first machine learning device comprises:

a first state observation unit that receives state data about the 3D laser machining system as input data containing at least the laser machining condition set by the machining condition setting unit and the simulation result obtained under the set laser machining condition;

a label acquisition unit that acquires temporal change data about the temperature detected by the temperature detection means as a label corresponding to answer data; and a first learning unit that receives a large number of pairs of the input data and the label to learn a relationship between the input data and the label, the first learning unit predicts the temporal change data about the temperature detected by the temperature detection means relative to input data newly input using a result of the learning, and the machining condition setting device refers to the temporal change data about the temperature predicted by the first learning unit to adjust the laser machining condition.

12. The 3D laser machining system according to claim 11, wherein if a temperature difference between a detected temperature detected by the temperature detection means at a certain time point in laser machining on the workpiece performed under the laser machining condition adjusted with reference to the temporal change date about the temperature predicted the first learning unit by the machining condition setting device and a predicted temperature predicted at a position of a time point corresponding to the certain time point contained in the simulation result obtained under the adjusted laser machining condition exceeds than a predetermined temperature difference, the control unit fulfills a function of compensating for at least a part of the laser machining condition adjusted by the machining condition setting device in response to the temperature difference, and the laser device continues laser machining under the compensated laser machining condition.

13. The 3D laser machining system according to claim 11, further comprising a higher-order computer, a higher-order network, and a lower-order network, wherein the first machine learning device and a plurality of the laser devices are connected through the lower-order network to form a manufacturing cell, a plurality of the manufacturing cells and the higher-order computer are connected through the higher-order network, the higher-order computer functions at least as the thermal fluid simulation unit of the machining condition setting device, the first state observation unit of the first machine learning device receives at least the laser machining condition as a simulation condition for the non-stationary thermal fluid simulation by the thermal fluid simulation unit and at least temporal change data about a temperature expected to be detected by the temperature detection means as a part of a simulation result of the non-stationary thermal fluid simulation input through the higher-order network and the lower-order network, the temporal change data about the temperature detected by the temperature detection means is input to the label acquisition unit of the first machine learning device through the lower-order network, and a learning model is shared between a plurality of the first learning units through the higher-order network and the lower-order network.

14. The 3D laser machining system according to claim 2, further comprising at least one in-line image monitoring device and a second machine learning device, wherein the in-line image monitoring device is capable of acquiring image data indicating a 2D shape or a 3D shape at a surface of the workpiece or inside the workpiece in at least either a part of the workpiece being subjected to laser machining or a part of the workpiece immediately after the laser machining;

the second machine learning device comprises:

a second state observation unit that observes a state inside the 3D laser machining system and a state outside the 3D laser machining system containing at least the laser machining condition set by the machining condition setting unit and shape data about the workpiece corresponding to the image data as the simulation result obtained under the set laser machining condition, and outputs the observed states as state data;

a determination data acquisition unit that acquires time-series image data obtained by the in-line image monitoring device, and outputs a result of comparison between the acquired image data and sample image data given a score stored in advance as determination data;

a second learning unit that receives the outputs from the second state observation unit and the determination data acquisition unit; and a decision making unit that determines a laser machining condition to be output from the second learning unit on the basis of a value function as a result of learning by the second learning unit, the second learning unit comprises:

a reward calculation unit that calculates a reward from the determination data; and a value function update unit that updates the value functions sequentially on the basis of the calculated reward, and the second learning unit associates the laser machining condition output from the decision making unit with the state data input from the second state observation unit and the determination data input from the determination data acquisition unit, and learns an optimum laser machining condition in each state in a trial-and-error method on the basis of the determination data.

15. The 3D laser machining system according to claim 14, wherein, when the determination data acquisition unit compares the image data obtained by imaging by the in-line image monitoring device with the sample image data given a score and outputs determination data indicating that the score of the image data obtained by imaging by the in-line image monitoring device is lower than a predetermined point during laser machining on the workpiece under the laser machining condition output from the second machine learning device, the control unit fulfills a function of compensating for at least a part of the laser machining condition originally output from the second machine learning device, and the laser device continues laser machining under the compensated laser machining condition.

16. The 3D laser machining system according to claim 14, further comprising a higher-order computer, a higher-order network, and a lower-order network, wherein the second machine learning device and a plurality of the laser devices are connected through the lower-order network to form a manufacturing cell, a plurality of the manufacturing cells and the higher-order computer are connected through the higher-order network, the higher-order computer functions at least as the thermal fluid simulation unit of the machining condition setting device, the second state observation unit of the second machine learning device receives at least the laser machining condition as a simulation condition for the non-stationary thermal fluid simulation by the thermal fluid simulation unit and at least the shape data about the workpiece corresponding to the image data as a part of a simulation result of the non-stationary thermal fluid simulation input through the higher-order network and the lower-order network, the image data obtained by imaging by the in-line image monitoring device is input to the determination data acquisition unit of the second machine learning device through the lower-order network, and the value function is shared between a plurality of the second learning units through the higher-order network and the lower-order network.

\* \* \* \* \*